United States Patent [19]

Masumoto et al.

[11] Patent Number: 4,871,239

[45] Date of Patent: Oct. 3, 1989

[54] ZOOM LENS SYSTEM FOR MINIMAL LENS SYSTEM LENGTH AND MINIMAL ABERRATIONS

[75] Inventors: Hisayuki Masumoto, Sakai; Akira Fukushima, Osaka, both of Japan

[73] Assignee: Minolta Camera Kabushiki Kaisha, Osaka, Japan

[21] Appl. No.: 95,168

[22] Filed: Sep. 9, 1987

[30] Foreign Application Priority Data

Sep. 9, 1986 [JP] Japan ............................... 61-212965
Sep. 9, 1986 [JP] Japan ............................... 61-212966
Oct. 29, 1986 [JP] Japan ............................... 61-258769

[51] Int. Cl.$^4$ ..................... G02B 15/14; G02B 13/18
[52] U.S. Cl. .................................... 350/427; 350/432
[58] Field of Search ......... 350/423, 427, 428, 432–435

[56] References Cited

U.S. PATENT DOCUMENTS

| | | | |
|---|---|---|---|
| 4,494,828 | 1/1985 | Masumoto et al. | 350/427 |
| 4,629,294 | 12/1986 | Tanaka et al. | 350/427 |
| 4,636,040 | 1/1987 | Tokumaru | 350/427 |
| 4,639,096 | 1/1987 | Kitagishi et al. | 350/427 |
| 4,666,257 | 5/1987 | Tanaka et al. | 350/427 |
| 4,712,883 | 12/1987 | Kato et al. | 350/427 |

*Primary Examiner*—Scott J. Sugarman
*Attorney, Agent, or Firm*—Price, Gess & Ubell

[57] ABSTRACT

The present invention provides a compact zoom lens system comprising; a first lens group having a positive refractive power; a second lens group having a negative refractive power located at the image side of the first lens group with a first variable air space between the first and second lens groups; and a third lens group having a positive refractive power, located at the image side of the second lens group with a second variable air space between the second and third lens groups, including a positive front lens unit and a positive rear lens located at the image side of the front lens unit with a third variable air space between the front and rear lens units, and having at least one aspheric surface; wherein the first lens group and the front and rear lens units of the third lens group are shiftable to the object side in the zooming operation from the shortest focal length to the longest focal length with changing the first, second and third variable air spaces.

32 Claims, 37 Drawing Sheets

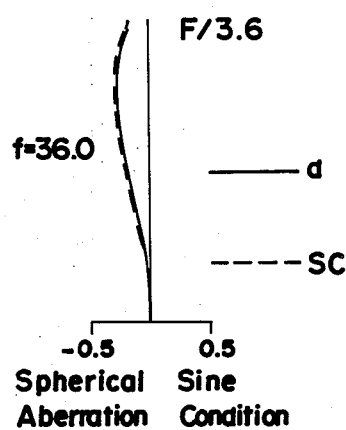
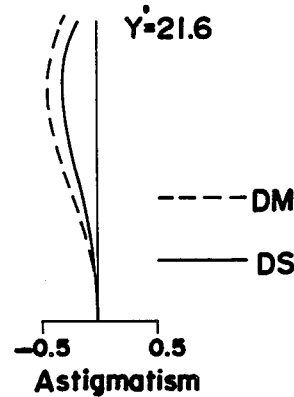
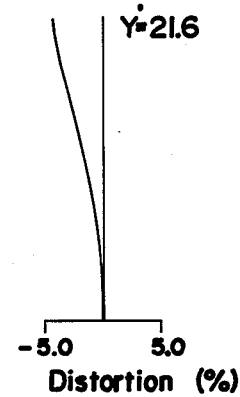
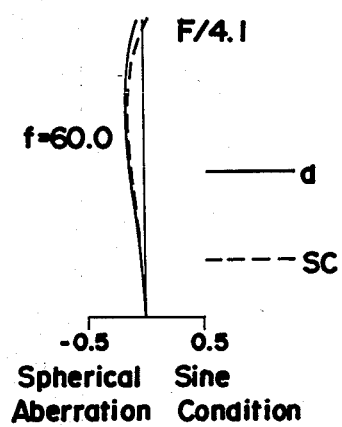
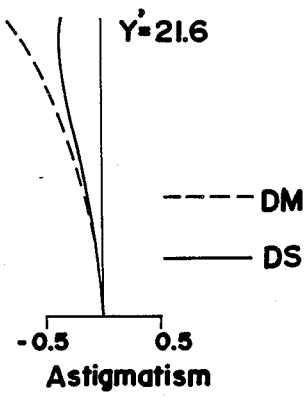
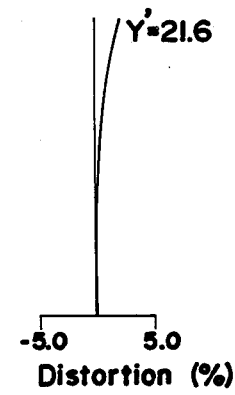
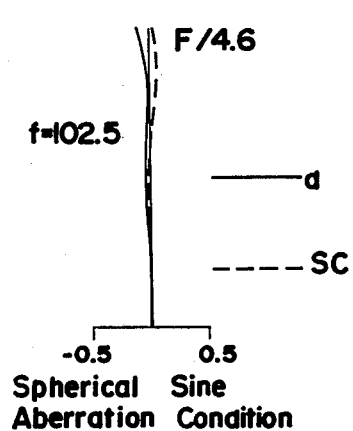
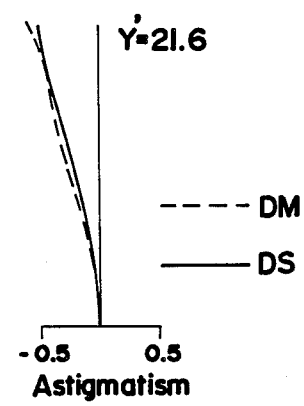
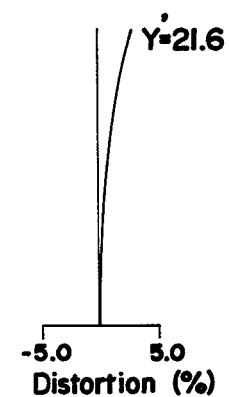

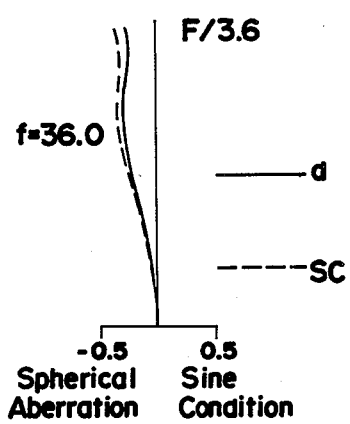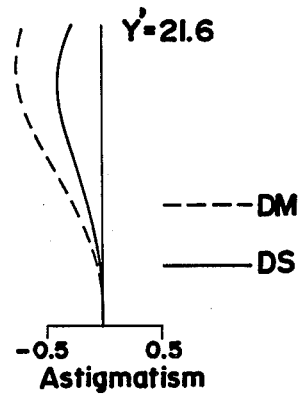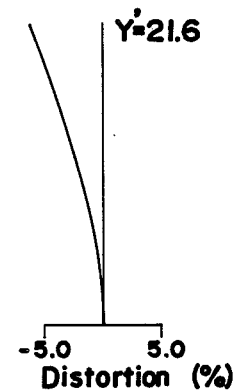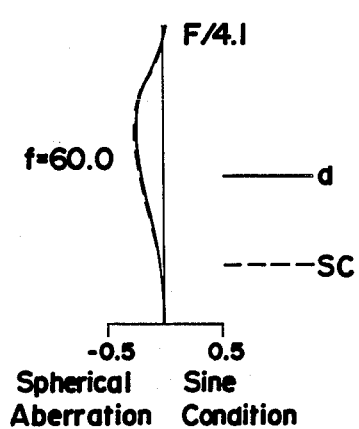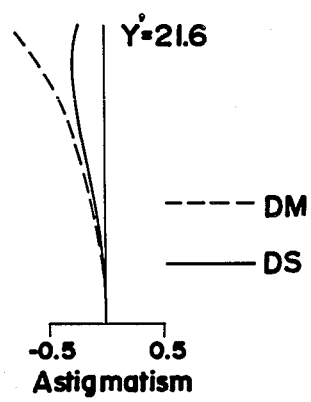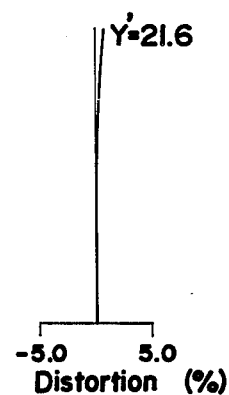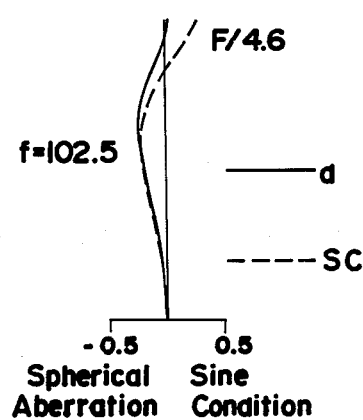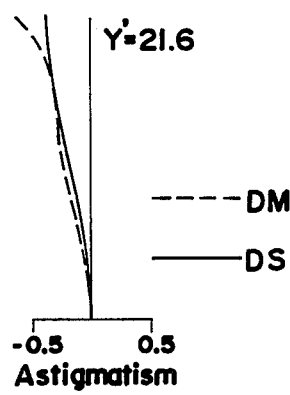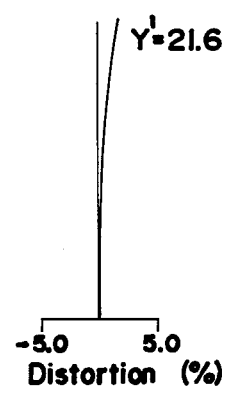

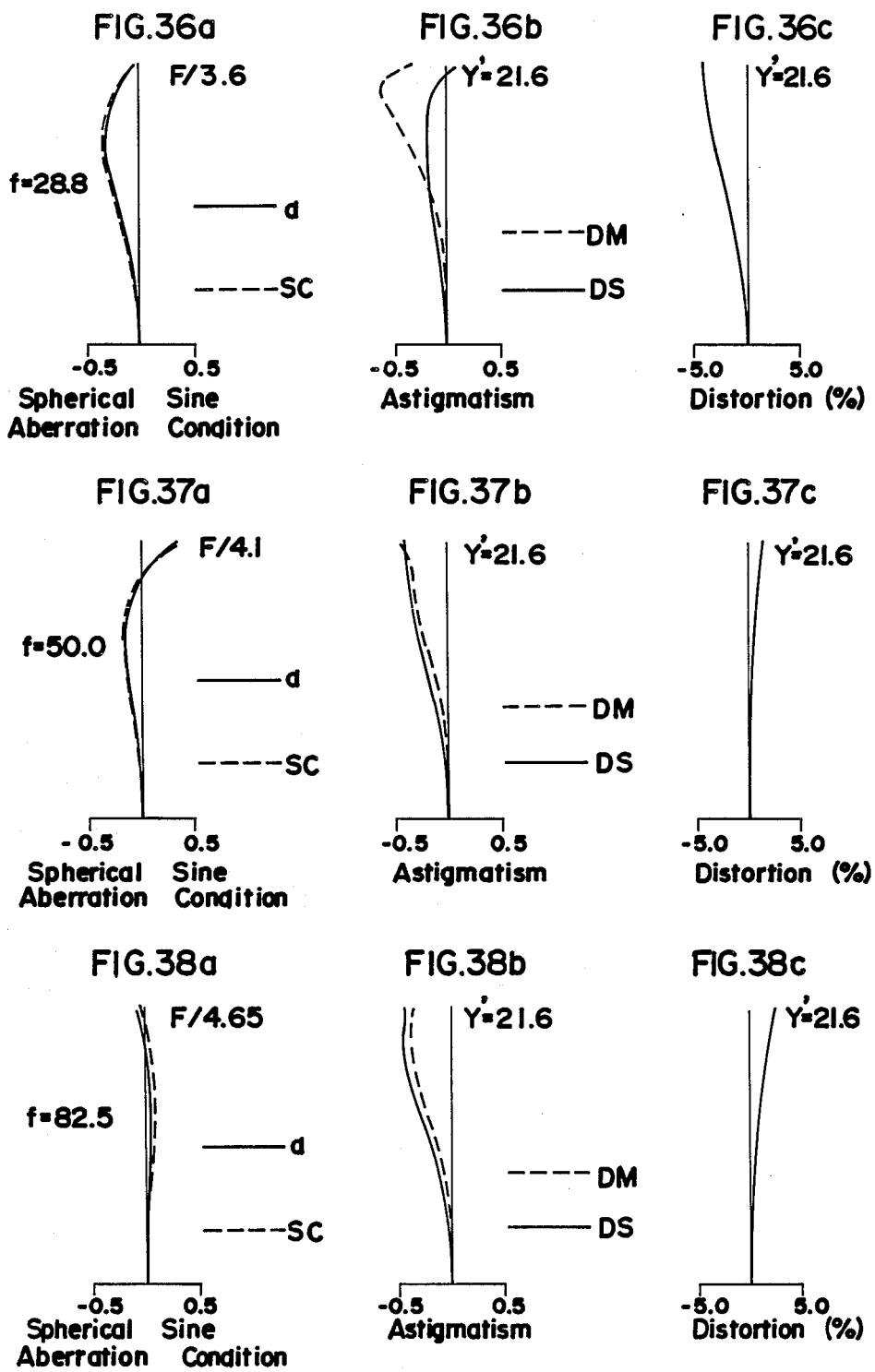

F/3.6
f=28.8
— d
---- SC
Spherical Aberration / Sine Condition

Y'=21.6
---- DM
— DS
Astigmatism

Y'=21.6
Distortion (%)

F/4.1
f=50.0
— d
---- SC
Spherical Aberration / Sine Condition

Y'=21.6
---- DM
— DS
Astigmatism

Y'=21.6
Distortion (%)

F/4.65
f=82.5
— d
---- SC
Spherical Aberration / Sine Condition

Y'=21.6
---- DM
— DS
Astigmatism

Y'=21.6
Distortion (%)

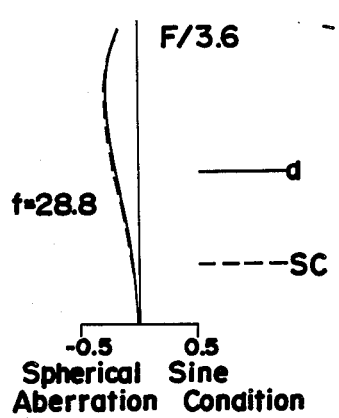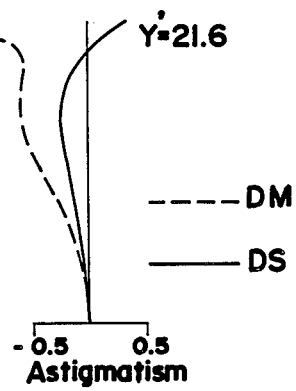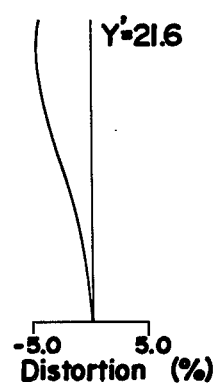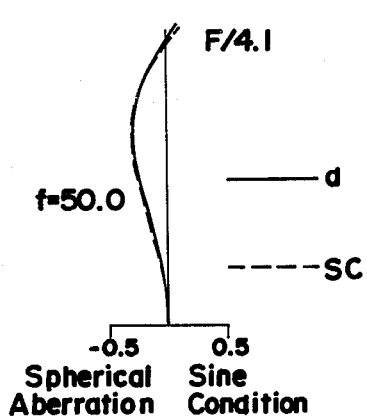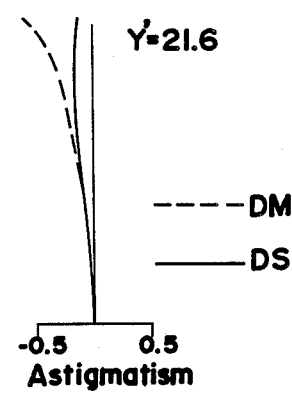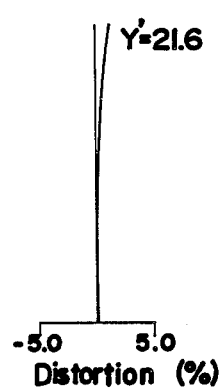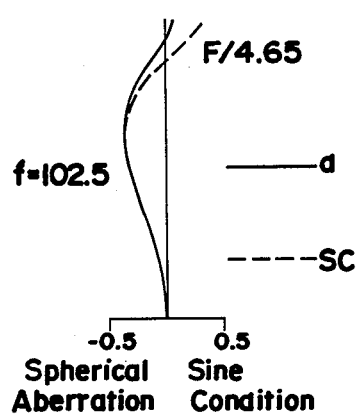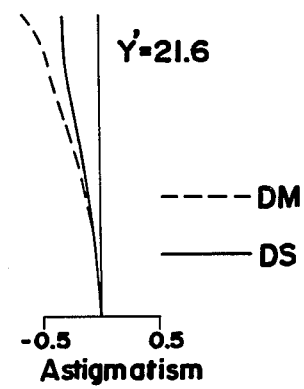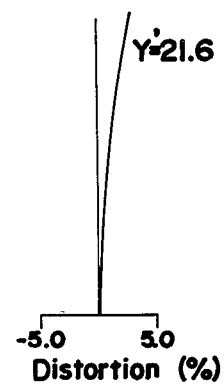

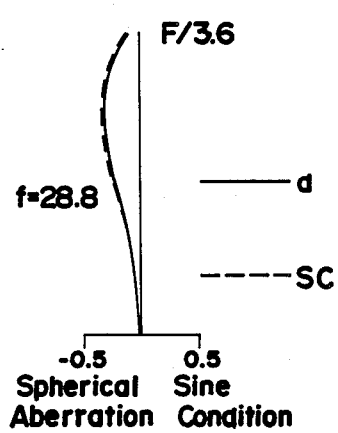
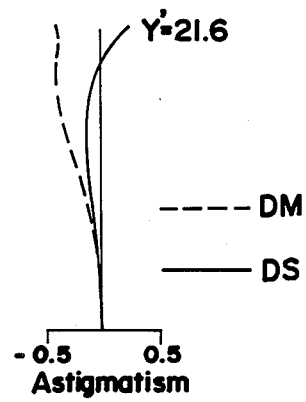
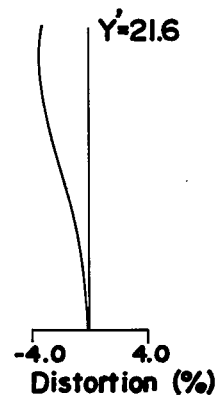
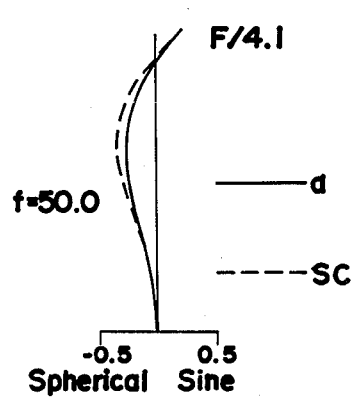
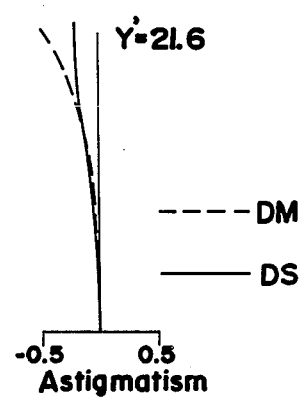
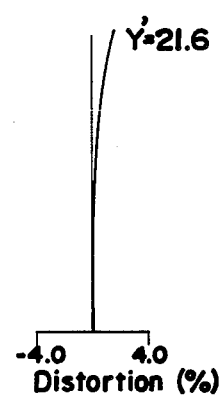
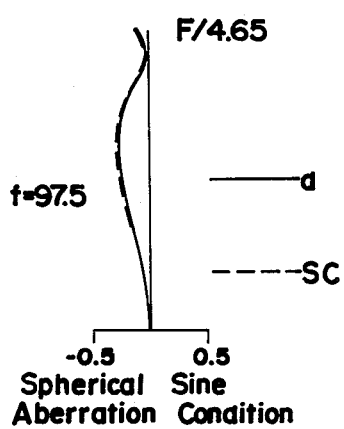
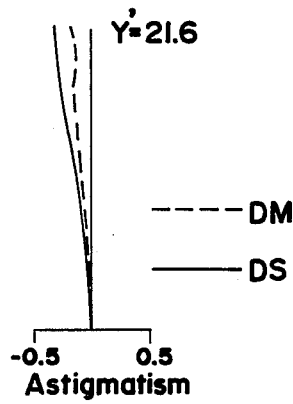
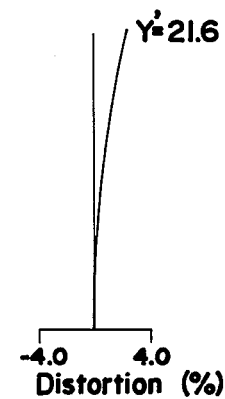

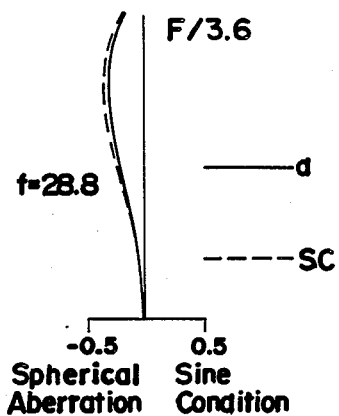
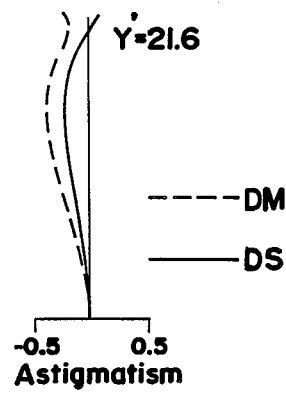
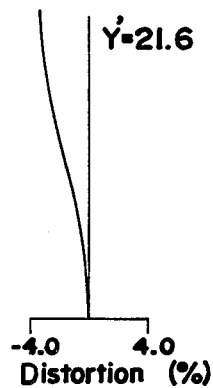
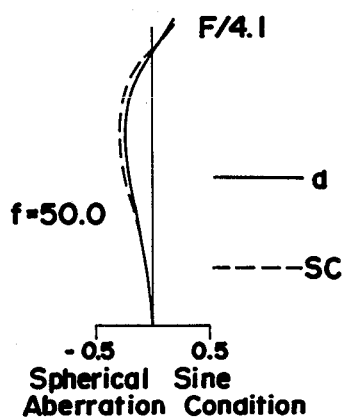
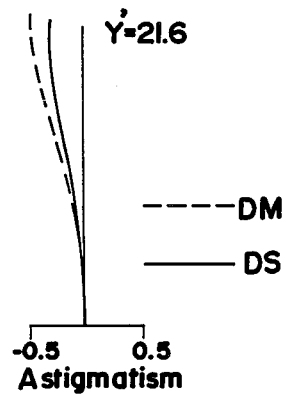
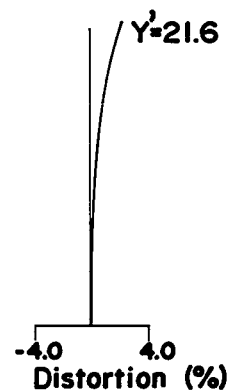
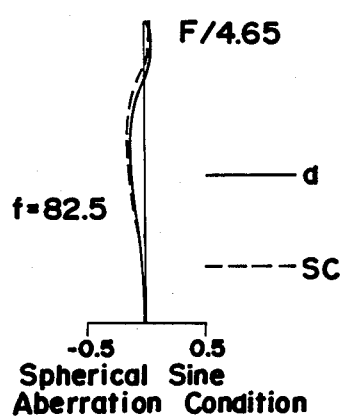
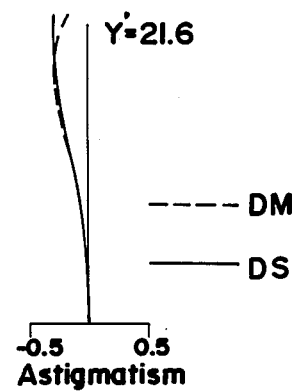
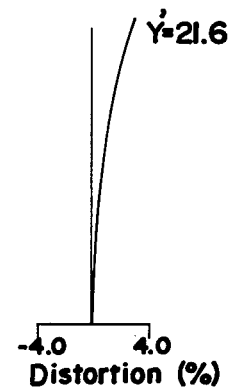

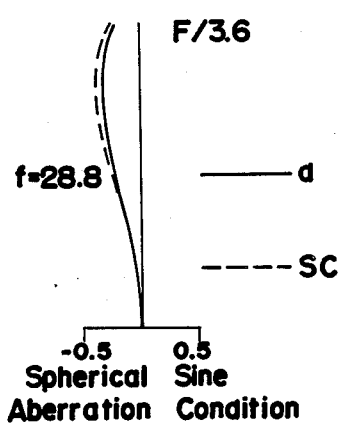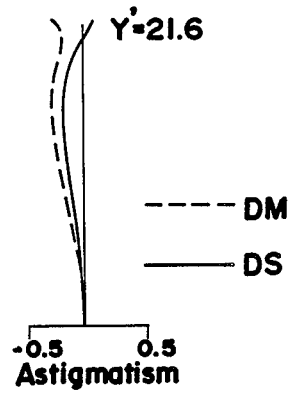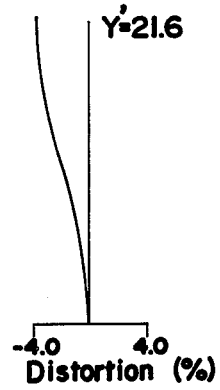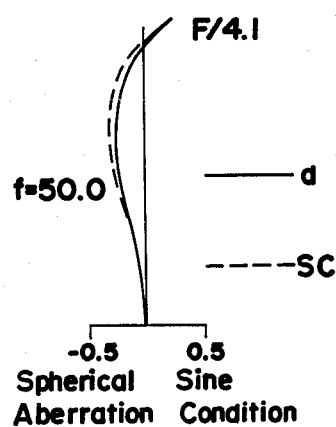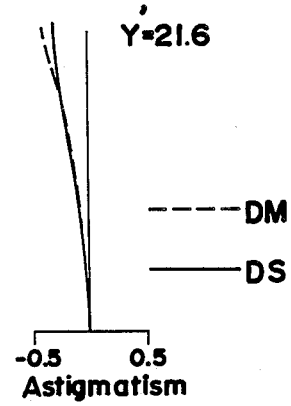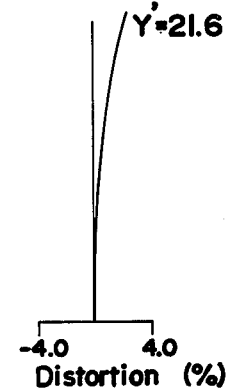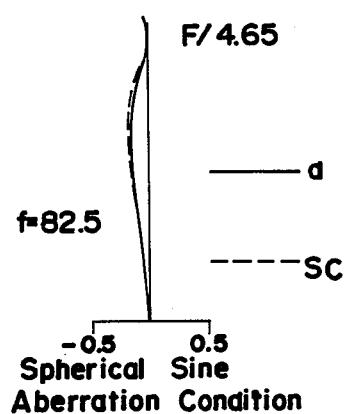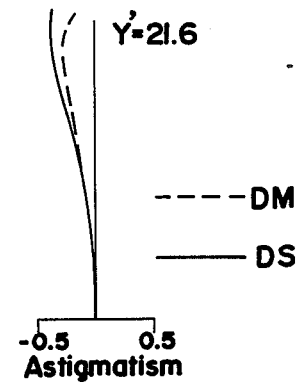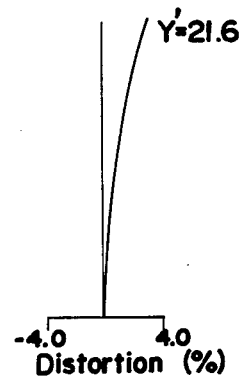

F/3.6  
f=28.8  
—— d  
---- SC  
-0.5  0.5  
Spherical Sine  
Aberration Condition Y'=21.6  
---- DM  
—— DS  
-0.5  0.5  
Astigmatism Y'=21.6  
-4.0  4.0  
Distortion (%)

F/4.1  
f=50.0  
—— d  
---- SC  
-0.5  0.5  
Spherical Sine  
Aberration Condition Y'=21.6  
---- DM  
—— DS  
-0.5  0.5  
Astigmatism Y'=21.6  
-4.0  4.0  
Distortion (%)

F/4.65  
f=82.5  
—— d  
---- SC  
-0.5  0.5  
Spherical Sine  
Aberration Condition Y'=21.6  
---- DM  
—— DS  
-0.5  0.5  
Astigmatism Y'=21.6  
-4.0  4.0  
Distortion (%)

F/3.6
f=28.8
——— d
----SC
-0.5  0.5
Spherical Sine
Aberration Condition

Y'=21.6
----DM
——DS
-0.5  0.5
Astigmatism

Y'=21.6
-4.0  4.0
Distortion (%)

F/4.1
f=50.0
——— d
----SC
-0.5  0.5
Spherical Sine
Aberration Condition

Y'=21.6
----DM
——DS
-0.5  0.5
Astigmatism

Y'=21.6
-4.0  4.0
Distortion (%)

F/4.65
f=82.5
——— d
----SC
-0.5  0.5
Spherical Sine
Aberration Condition

Y'=21.6
----DM
——DS
-0.5  0.5
Astigmatism

Y'=21.6
-4.0  4.0
Distortion (%)

F/3.6
f=28.8
—— d
---- SC
-0.5  0.5
Spherical Sine
Aberration Condition

Y'=21.6
---- DM
—— DS
-0.5  0.5
Astigmatism

Y'=21.6
-4.0  4.0
Distortion (%)

F/4.1
f=50.0
—— d
---- SC
-0.5  0.5
Spherical Sine
Aberration Condition

Y'=21.6
---- DM
—— DS
-0.5  0.5
Astigmatism

Y'=21.6
-4.0  4.0
Distortion (%)

F/4.65
f=82.5
—— d
---- SC
-0.5  0.5
Spherical Sine
Aberration Condition

Y'=21.6
---- DM
—— DS
-0.5  0.5
Astigmatism

Y'=21.6
-4.0  4.0
Distortion (%)

ZOOM LENS SYSTEM FOR MINIMAL LENS SYSTEM LENGTH AND MINIMAL ABERRATIONS

BACKGROUND OF THE INVENTION

1. Field of the Invention

The present invention relates to a compact zoom lens system having a high zoom ratio ranging to a considerably wide field angle, and to a focusing operation thereof.

2. Description of the Prior Art

In this field of art, there has been various attempts to provide a zoom lens system of a relatively high zoom ratio ranging to a wide field angle. Prior art zoom lens systems provided through such attempts can be roughly classified into two types, the first one having a positive front group, while the second one having a negative front group. Generally, in the zoom lens system having a zoom ratio ranging to a wide field angle, the first type is desirable for making the total length of the whole lens system more compact, and for making the diameter of the lens group located behind the front group small, even if the zoom ratio becomes relatively high. However, the second type has a disadvantage in that the total length of the whole lens system and the diameter of the lens group located behind the front group becomes undesirably large, if the zoom ratio is over 2.

Here, in the zoom lens system, the front group is conventionally shiftable in the focusing operation. However, if the positive front group is moved for the focusing operation in the zoom lens system having a zoom ratio ranging to the wide field angle, the diameter of the positive front group becomes relatively large for keeping the luminance at the periphery of the image plane, and the shortest object distance to be photographed can not be sufficiently shortened. Namely, in order to design the zoom lens system having a zoom ratio ranging to a wide field angle, a sufficient compactness, and a sufficient shortest object distance to be photographed, it is generally best to apply the first type of positive front group while performing the focusing operation by moving a lens group other than the front group.

However, in general, if the focusing operation is performed by moving the lens group other than the front group, the shifting distance of the lens group movable in the focusing operation is changed in accordance with the change of the focal length of the whole lens system. It is desirable not to change the shifting distance independently of the change of the focal length of the whole lens system.

U.S. Pat. No. 4,636,040 discloses a zoom lens system of the first type having a zoom ratio ranging to the wide field angle in which the change of the shifting distance of the focusing lens group shiftable in the focusing operation due to the change of the focal length of the whole lens system is controlled within a relatively small range. However, such a prior art zoom lens system disclosed in U.S. Pat. No. 4,636,040 has an insufficiently long total length of the whole lens system.

SUMMARY OF THE INVENTION

An object of the present invention is to provide a zoom lens system of a positive front group and having a relatively short total length of the whole lens system.

The other object of the present invention is to provide a zoom lens system having a higher zoom ratio ranging to wider field angle than conventional zoom lens systems.

The other object of the present invention is to provide a zoom lens system in which the change of the shifting distance of the focusing lens group shiftable in the focusing operation due to the change of the focal length of the whole lens system is controlled within a relatively small range.

Further another object of the present invention is to provide a zoom lens system in which various aberrations are well corrected across the entire zoom range.

According to the present invention, the zoom lens system comprises, a first lens group having a positive refractive power, a second lens group having a negative refractive power located at the image side of the first lens group with a first variable air space between the first and second lens groups, and a third lens group having a positive refractive power located at the image side of the second lens group with a second variable air space between the second and third lens groups, including a positive front lens unit and a positive rear lens unit located at the image side of the front lens unit with a third variable air space between the front and rear lens units, and having at least one aspheric surface, wherein the first lens group and the front and rear lens units of the third lens group are shiftable to the object side in the zooming operation from the shortest focal length to the longest focal length with a changing of the first, second and third variable air spaces, while the front and rear lens units of the third lens group are shiftable to the image side in a focusing operation to a close object position in any focal length condition, and wherein the lens system fulfills the following condition;

$$(|X| - |X_0|)/C_0(N' - N) < 0$$

wherein, $C_0$ represents the curvature of the basic spheric surface for the aspheric surface, N represents the refractive index of the material located at the object side of the aspheric surface, N' represents the refractive index of the material located at the image side of the aspheric surface, X represents the configuration of the aspheric surface in a coordinate system in a direction parallel to the optical axis of the lens system at the height Y measured from the optical axis as representing by;

$$X = X_0 + A_4 Y^4 + A_6 Y^6 + A_8 Y^8 + A_{10} Y^{10} + \cdots$$

wherein, $X_0$ represents the configuration of the basic spheric surface as representing by;

$$X_0 = C_0 Y^2 / \{1 + (1 - C_0^2 Y^2)^{\frac{1}{2}}\}$$

and, $A_i$ represents the aspheric coefficients, where $I = 1, 2, 3, \cdots$.

According to the other feature of the present invention, the zoom lens system comprises a first lens group having a positive refractive power; a second lens group having a negative refractive power located at the image side of the first lens group with a first variable air space between the first and second lens groups; and a third lens group having a positive refractive power located at the image side of the second lens group with a second variable air space between the second and third lens groups, including a front lens unit and a rear lens unit located at the image side of the front lens unit with a third variable air space between the front and rear lens units; wherein the first lens group and the rear lens unit of the third lens group are shiftable to the object side in the zooming operation from the shortest focal length to the longest focal length while changing the first, second and third variable air spaces, while the front and rear lens units of the third lens group are shiftable to the image side in the focusing operation to a close object position in any focal length condition; and wherein the lens system fulfills the following condition;

$$0.2 < (T_{3\text{-}B} + B_w\text{-}F_w)/f_w < 1.0$$

wherein; $T_3\text{-}B$ represents the axial thickness of the rear lens unit of the third lens group; $B_w$ represents the back focal length of the whole lens system in the shortest focal length condition; and $f_w$ represents the focal length of the whole lens system in the shortest focal length condition.

According to a further feature of the present invention, the zoom lens system comprises from the object side to the image side; a first lens group having a positive refractive power; a second lens group having a negative refractive power while having at least one aspheric surface; and a third lens group having a positive refractive power; wherein the zooming operation is achieved so that the air space formed between the first and second lens group is a minimum in the shortest focal length condition.

The features of the present invention which are believed to be novel are set forth with particularity in the appended claims. The present invention, both as to its organization and manner of operation, together with further objects and advantages thereof, may be understood by reference to the following description, taken in conjunction with the accompanying drawings.

BRIEF DESCRIPTION OF THE DRAWINGS

FIGS. 21a to 21c represent the aberration curves of the first embodiment for the shortest focal length in the infinity focusing condition;

FIGS. 22a to 22c represent the aberration curves of the first embodiment for a medium focal length condition in the infinity focusing condition;

FIGS. 23a to 23c represent the aberration curves of the first embodiment for the longest focal length in the infinity focusing condition;

FIGS. 27a to 21c represent the aberration curves of the third embodiment for the shortest focal length in the infinity focusing condition;

FIGS. 33a to 33c represent the aberration curves of the fourth embodiment for the shortest focal length in the focusing condition in which the lens system is focused to an object located at a distance of 35 times of the shortest focal length;

FIGS. 34a to 34c represent the aberration curves of the fourth embodiment for the medium focal length in the focusing condition in which the lens system is focused to an object located at a distance of 35 times of the shortest focal length;

FIGS. 35a to 35c represent the aberration curves of the fourth embodiment for the longest focal length in the focusing condition in which the lens system is focused to an object located at a distance of 35 times of the shortest focal length;

FIGS. 36a to 36c represent the aberration curves of the fifth embodiment for the shortest focal length in the infinity focusing condition;

FIGS. 37a to 37c represent the aberration curves of the fifth embodiment for a medium focal length condition in the infinity focusing condition;

FIGS. 38a to 38c represent the aberration curves of the fifth embodiment for the longest focal length in the infinity focusing condition;

FIGS. 63a to 63c represent the aberration curves of the ninth embodiment for the shortest focal length in the focusing condition in which the lens system is focused to an object located at a distance of 35 times of the shortest focal length;

FIGS. 64a to 64c represent the aberration curves of the ninth embodiment for the medium focal length in the focusing condition in which the lens system is focused to an object located at a distance of 35 times of the shortest focal length;

FIGS. 65a to 65c represent the aberration curves of the ninth embodiment for the longest focal length in the focusing condition in which the lens system is focused to an object located at a distance of 35 times of the shortest focal length.;

FIGS. 72a to 72c represent the aberration curves of the twelfth embodiment for the shortest focal length in the infinity focusing condition;

FIGS. 73a to 73c represent the aberration curves of the twelfth embodiment for a medium focal length condition in the infinity focusing condition;

FIGS. 74a to 74c represent the aberration curves of the twelfth embodiment for the longest focal length in the infinity focusing condition;

FIGS. 78a to 78c represent the aberration curves of the fourteenth embodiment for the shortest focal length in the infinity focusing condition;

FIGS. 79a to 79c represent the aberration curves of the fourteenth embodiment for a medium focal length condition in the infinity focusing condition;

FIGS. 80a to 80c represent the aberration curves of the fourteenth embodiment for the longest focal length in the infinity focusing condition;

FIGS. 81a to 81c represent the aberration curves of the fifteenth embodiment for the shortest focal length in the infinity focusing condition;

FIGS. 82a to 82c represent the aberration curves of the fifteenth embodiment for a medium focal length condition in the infinity focusing condition;

FIGS. 83a to 83c represent the aberration curves of the fifteenth embodiment for the longest focal length in the infinity focusing condition;

FIGS. 95a to 95c represent the aberration curves of the nineteenth embodiment for the longest focal length in the infinity focusing condition;

DETAILED DESCRIPTION OF THE PREFERRED EMBODIMENTS

Figure 1:
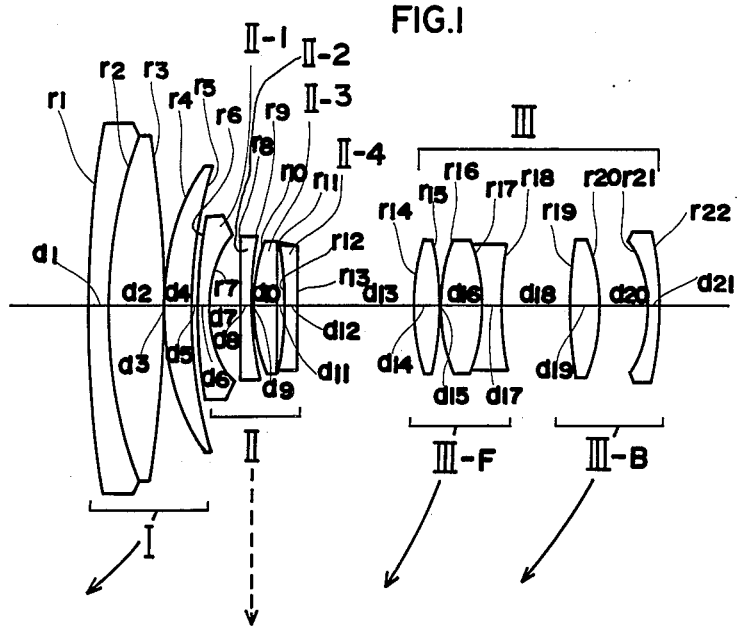
FIG. 1 represents a cross sectional view of the lens system according to a first embodiment of the present invention in the shortest focal length condition.

The following description is provided to enable any person skilled in the optical and camera field to make and use the invention and sets forth the best modes contemplated by the inventor for carrying out his invention. Various modifications, however, will remain readily apparent to those skilled in the art, since the generic principles of the present invention have been defined herein specifically to provide a relatively economical and easily manufactured compact zoom lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with a 35 mm SLR camera.

In the drawings, the schematic cross sectional views disclose the position of the lens groups and lens elements for the shortest focal length with lines below the lens groups representing the movements for zooming toward the longest focal length. The schematic cross sectional views of the respective embodiments follow the normal conventions of an object at the left-hand side of the drawing and the image plane at the right-hand side.

As disclosed in FIGS. 1 to 20, the present invention provides a zoom lens system comprising, a first lens group (I) having a positive refractive power, a second lens group (II) having a negative refractive power located at the image side of the first lens group (I) with a first variable air space between the first and second lens groups, and a third lens group (III) having a positive refractive power located at the image side of the second lens group (II) with a second variable air space between the second and third lens groups, including a positive front lens unit (III-F) and a positive rear lens unit (III-B) located at the image side of the front lens unit (III-F) with a third variable air space between the front and rear lens units, wherein the first lens group (I) and the front and rear lens units of the third lens group (III) are shiftable to the object side in the zooming operation from the shortest focal length to the longest focal length while changing the first, second and third variable air spaces, and wherein the lens system fulfills the following condition;

$$(|X|-|X_0|)/C_0(N'-N)<0 \qquad (2)$$

wherein; $C_0$ represents the curvature of the basic spheric surface of the aspheric surface; N represents the refractive index of a material located at the object side of the aspheric surface; N' represents the refractive index of a material located at the image side of the aspheric surface; and X represents the configuration of the aspheric surface in a coordinate system in a direction parallel to the optical axis of the lens system at the height Y measured from the optical axis as represented by;

$$X = X_0 + A_4Y^4 + A_6Y^6 + A_8Y^8 + A_{10}Y^{10} +$$

wherein; $X_0$ represents the configuration of the basic spheric surface as represented by;

$$X_0 = C_0Y^2/\{1+(1-C_0^2Y^2)^{\frac{1}{2}}\}$$

and, $A_i$ represent the aspheric coefficients, where $i=1,2,3,---$.

Condition (1) defines the configuration of the aspheric surface introduced to the third lens group (III) suitable for making the lens system compact while maintaining high optical performance. Condition (1) limits, that the positive refractive power of the aspheric surface becomes weak in accordance with the increase of distance from the optical axis of the lens system if the aspheric surface is introduced to a lens surface having a positive refractive power, or that the negative refractive power of the aspheric surface becomes strong in accordance with the increase of distance from the optical axis of the lens system if the aspheric surface is introduced to a lens surface having a negative refractive power. Thus, although the third lens group (III) has a positive refractive power as a whole, the aspheric surface provided in the third lens group has a relatively weak refractive power in a region far from the optical axis while fulfilling the condition (1). It is effective for correcting the spherical aberration and the flare of high degree in the lateral aberrations in the sagittal direction in all of the variations of the focal length with good balance. If the condition (1) is violated, it becomes difficult to well correct the spherical aberration, or to control the flare of high degree in the lateral aberrations in the sagittal direction, while keeping the compactness of the lens system. Here, it is desirable to introduce the aspheric surface to a lens surface of the rear lens unit (III-B) in the third lens group (III), if the flare of high degree in the lateral aberrations in the sagittal direction is required to be more corrected. The aspheric surface, however, may be introduced to a lens surface at a relatively image side in the front lens group (III-F) in the third lens group (III).

Additionally, in the present invention, the field curvature, which is difficult to be corrected well especially in a high zoom ratio zoom lens system having a focal length range including a wide angle, can be corrected well, by decreasing the third variable air space formed between the front and rear lens units in the third lens group (III) in the zooming operation from the shortest focal length condition to the longest focal length condition.

In the present invention, it is desirable that the front lens unit (III-F) of the third lens group (III) consists of, from the object side, two positive lens components and one negative lens component, and that the rear lens unit (III-B) of the third lens group (III) consists of, from the object side, one positive lens component and one negative lens component having a stronger power at the object side surface.

Furthermore, it is desirable to fulfill the following condition in addition to the above-described condition (1);

$$0.4 < f_{3w}/f_w < 0.9 \qquad (2)$$

wherein; $f_{3w}$ represents the focal length of the third lens group in the shortest focal length condition; and $f_w$ represents the focal length of the whole lens system in the shortest focal length condition.

Condition (2) is effective for shortening the total length of the whole lens system to make the lens system compact. If the upper limit of condition (2) is violated, the total length of the whole lens becomes undesirably long, and the shifting amount of the third lens group (III) in the focusing operation due to the zooming operation is increased undesirably. On the other hand, if the lower limit of condition (2) is violated, it becomes difficult to maintain a sufficient back focal length for the interchangeable lens in the 35 mm SLR camera system.

Furthermore, if the shortest focal length of the whole lens system is shorter than 32 mm, it is desirable to fulfill the following condition instead of the above-described condition (2);

$$0.5 < f_{3w}/f_w < 0.9 \qquad (3)$$

If the upper limit of condition (3) is violated, the total length of the whole lens becomes undesirably long, and the shifting amount of the third lens group (III) in the focusing operation due to the zooming operation is increased undesirably. On the other hand, if the lower limit of condition (3) is violated, it becomes difficult to maintain a sufficient back focal length for the interchangeable lens in the 35 mm SLR camera system.

Here, if the shortest focal length of the zoom lens system is over 32 mm, it is desirable to fulfill the following condition instead of the above-descried condition (2);

$$0.4 < f_{3w}/f_w < 0.75 \qquad (4)$$

If the upper limit of condition (4) is violated, the total length of the whole lens becomes undesirably long, and the shifting amount of the third lens group (III) in the focusing operation due to the zooming operation is increased undesirably. On the other hand, if the lower limit of condition (4) is violated, it becomes difficult to maintain a sufficient back focal length for the interchangeable lens in the 35 mm SLR camera system.

Furthermore, in the present invention, it is desirable to fulfill the following condition;

$$0.01 < \Delta d_3 / f_w < 0.3 \qquad (5)$$

wherein; $\Delta d_3$ represents the amount obtained by subtracting the axial thickness of the third lens group in the longest focal length condition from that in the shortest focal length condition.

Condition (5) is effective for correcting the field curvature well across the entire focal length range. If the lower limit of condition (5) is violated, the positive deviation of the field curvature is undesirably generated in accordance with the zooming operation from the shortest focal length condition to the longest focal length condition. Contrary, if the upper limit of condition (5) is violated, the negative deviation of the field curvature is undesirably generated in accordance with the zooming operation from the shortest focal length condition to the longest focal length condition, and the distance between the front and rear lens units in the third lens group (III) is excessively large in the shortest focal length condition to maintain the axial thickness of the third lens group (III).

Here, it is desirable to fulfill the following condition in addition to the above-described condition (5);

$$0.02 < f_w / f_{3B} < 2.0 \qquad (6)$$

wherein; $f_{3B}$ represents the focal length of the rear lens unit (III-B) of the third lens group (III).

Condition (6) defines the relation between the focal length of the rear lens unit (III-B) of the third lens group (III) and the focal length of the whole lens system in the shortest focal length condition. It is effective for making the lens system compact and for correcting the field curvature well with maintaining a sufficient back focal length. If the upper limit of condition (6) is violated, it becomes difficult to maintain a sufficient back focal length. Contrary, if the lower limit of condition (6) is violated, the back focal length becomes undesirably long to deteriorate the compactness of the lens system, and the field curvature changes excessively in accordance with the zooming operation. To correct the field curvature, it becomes necessary to increase the value $d_3$ in the condition (6), causing the deterioration of the compactness.

Furthermore, it is desirable to fulfill the following condition, in order to design an ultra compact zoom lens system having a sufficient back focal length for an interchangeable lens of a 35 mm SLR camera system.

$$0.2 < (T_{3-B} + B_w - f_w)/f_w < 1.0 \qquad (7)$$

wherein, $T_{3-B}$ represents the axial thickness of the rear lens unit (III-B) of the third lens group (III), $B_w$ represents the back focal length of the whole lens system in the shortest focal length condition.

Condition (7) defines the relation between, the distance from the object side surface of the rear lens unit (III-B) to the image plane in the shortest focal length condition, and the focal length of the whole lens system in the shortest focal length condition. It is effective for making the lens system compact and for keeping a sufficient back focal length. If the lower limit of condition (7) is violated, it becomes difficult to keep a sufficient back focal length. On the other hand, if the upper limit of condition (77) is violated, the total length of the whole lens system becomes undesirably long.

Here, the explanation of the focusing operation will be described. In the present invention, the front lens unit (III-F) and the rear lens unit (III-B) are shiftable to the image side in the focusing operation on a close object in any focal length condition. Additionally, it is desirable to fulfill the following condition;

$$\beta_F < -1 \qquad (8)$$

wherein; $\beta_F$ represents the lateral magnification of the third lens group (III) in any focal length condition.

In the zoom lens system comprising from the object side, a first positive lens group (I), a second negative lens group (II), and a third positive lens group (III) including a front lens unit (III-F) and a rear lens unit (III-B), such as the present invention, two focusing methods have been proposed for focusing the lens system by the movement of the front and rear lens units of the third lens group (III). One of them is to shift the front and rear lens units of the third lens group (III) toward the object side in a focusing operation on a close object. Another of them is to shift the front and rear lens units of the third lens group (III) toward the image side in the focusing operation on a close object. However, if the former focusing method is adopted, it is considered to be difficult to enlarge the zoom ratio with controlling the change of shifting amount due to the change of the focal length within a proper range. Therefore, the latter focusing method is considered to be favorable for enlarging the zoom ratio as disclosed in the U.S. Pat. No. 4,636,040. Such consideration is applied to any focal length within a predetermined focal length range. Here, another focusing method in which the shifting direction of the front and rear lens unit is reversed in a predetermined focal length is out of question, if considered as actual products. Therefore, it is desirable to shift the front and rear lens units to the image side in the focusing operation to a close object, within all of the focal length range. It is represented by the condition (8). Thus, if the condition (8) is violated, the shifting direction of the front and rear lens units is undesirably reversed at a predetermined focal length condition, or the front and rear lens units are shifted to the object side in the focusing operation on a close object.

Here, in the present invention, the rear lens unit (III-B) of the third lens group (III) is shifted in a same direction in which the front lens unit (III-F) is shifted. The reason is that it becomes difficult to control the change of the shifting distance of the front and rear lens units due to the change of the focal length within a proper range, if both lens units are shifted in different direction from each other.

The zoom lens system which comprises, from the object side, a first positive lens group, a second negative lens group, and a third positive lens group including a front lens unit and a rear lens unit, and in which the front and rear lens units are shiftable in the focusing operation to the closer object, as the present invention, is favorable for making the total length of the lens system more compact and for decreasing the diameter of the lens compenents located at the image side of the lens system. Additionally, a extremely compact zoom lens system with a sufficient length of the back focal length for an interchangeable lens of a SLR camera system can be obtained by satisfying the condition (7) in addition to the above-described condition (8).

Here, it is desirable to shift the rear lens unit (III-B) of the third lens group (III) integrally with the shifting of the front lens unit (III-F) thereof in the focusing operation, in order to make the mechanical construction of the lens barrels simple.

In the present invention, in order to correct the distortion well, it is desirable that the axial air space formed between the first lens group (I) and the second lens group (II) becomes a minimum in the shortest focal length condition, and that at least one aspheric surface is applied to the second lens group (II).

Additionally, in the present invention, if a high zoom ratio over 2 is required, it is effective for introducing an aspheric surface to the second lens group and for fulfilling the following condition within a range of $0.7y_{max} < y < 1.0y_{max}$;

$$0 < (N' - N)\frac{d}{dy}\{x(y) - x_0(y)\} < 0.3 \qquad (9)$$

wherein; $y_{max}$ represents the maximum effective diameter of a lens element having the aspheric surface; y represents the height measured from the optical axis; $x(y)$ represents the position of the aspheric surface at the hight y; and $x_0$ represents the position of the basic spherical surface of the aspheric surface.

Here, if the radius of curvature of the basic spherical surface is assumed to be r, $x(y)$ and $x_0(y)$ are represented as follows;

$$x_0(y) = r\{1 - (1 - y^2/r^2)^{\frac{1}{2}}\} \qquad (A)$$

$$x(y) = r\{1 - (1 - \epsilon y^2/r^2)^{\frac{1}{2}}\} + \sum_{n=2}^{\infty} A_n y^n \qquad (B)$$

wherein; $\epsilon$ represents the parameter representing the configuration of the curved surface; $A_n$ represents the aspheric coefficients of n order, where n=1, 2, 3, .... Here, the paraxial radius of curvature, $\bar{r}$ is defined as follows;

$$1/\bar{r} = (1/r) + 2A_2 \qquad (C)$$

Condition (9) defines the deviation of the aspheric surface from the basic spherical surface. If the lower limit of condition (9) is violated, it becomes difficult to well correct the negative distortion in the shortest focal length condition. On the other hand, if the upper limit of condition (9) is violated, it becomes difficult to correct the negative distortion and the field curvature with good balance in the shortest focal length condition. The lower limit of condition (9) means that the aspheric surface defined by the equation (B) has a stronger positive refractive power or a weaker negative refractive power in comparison with that of the basic spherical surface defined by the equation (A), within the range of $0.7y_{max} < y < 1.0y_{max}$.

Accordingly, to apply the aspheric surface having above-described configuration to the second lens group (II), the excessive negative refractive power of the second lens group (II) can be diminished to correct the negative distortion. Namely, though the strong correcting effect of the distortion is required to the light passed through the off-axial region, such light will pass through the region defined by $0.7y_{max} < y < 1.0y_{max}$ of the second lens group (II) in the shortest focal length condition. Thus, it becomes necessary to fulfill the lower limit of condition (9). If the lower limit of condition (9) is violated, it is difficult to correct the negative distortion in the shortest focal length condition.

The aspheric surface defined by condition (9) is effective for deviate the field curvature in the negative direction, in addition to correct the negaive distortion. Although the negative distortion correcting effect in the shortest focal length condition is necessary for the light passing through the off-axial region, it becomes difficult to balance the negative distortion correcting effect and the negative deviation effect of the field curvature, if the latter becomes too conspicuous. Thus, it is desirable, for balancing both of the negative distortion correcting effect and the negative deviation effect of the field curvature, to fulfill condition (9). If the upper limit of condition (9) is violated, the negative deviation effect of the field curvature becomes conspicuous to give a bad influence to the image reproducing performance of the lens system.

Here, since the light having a relatively small field angle will pass through a region relatively closer to the optical axis, the strong negative distortion correcting effect is not required. Thus, it is desirable to fulfill the following condition within a range of $y < 0.7y_{max}$;

$$-0.02 < (N' - N)\frac{d}{dy}\{x(y) - x_0(y)\} < 0.06 \qquad (10)$$

Condition (10) is effective for correcting, in the shortest focal lengt condition, the distortion and the field curvature in a region closer to the optical axis and in the middle region of the image plane, with good balance. If the lower limit of condition (10) is violated, the negative distortion becomes generated in a region closer to the optical axis or in the middle region of the image plane, in the shortest focal length condition. At the same time, the image formed in the middle of the image plane deviates in the positive direction in the focal length range from the shortest focal length to the medium focal length. Contrary, if the upper limit of condition (10) is violated, the distortion correcting effect of the aspheric surface influences the light having a relatively small field angle too much, the distortion curve becomes irregular in shape in the shortest focal length condition.

In the other aspect of the present invention, as shwon in FIGS. 1 to 20, the zoom lens system comprises: a first lens group (I) having a positive refractive power; a second lens group (II) having a negative refractive power located at the image side of the first lens group with a first variable air space between the first and second lens groups; and a third lens group (III) having a positive refractive power located at the image side of the second lens group with a second variable air space betweenethe second and third lens groups, including a front lens unit (III-F) and a rear lens unit (III-B) located at the image side of the front lens unit (III-F) with a third variable air space between the front and rear lens units; wherein the first lens group (I) and the rear lens unit (III-B) of the third lens group (III) are shiftable to the object side in the zooming operation from the shortest focal length to the longest focal length with changing the first, second and third variable air spaces, while the front and rear lens units of the third lens group (III) are shiftable to the image side in the focusing operation to a close object in any focal length condition; and wherein the lens system fulfills the following conditions:

$$0.2 < (T_{3\text{-}B} + B_w - f_w)/f_w < 1.0 \quad (7)$$

$$\beta_F < -1 \quad (8)$$

The explanation of the conditions (7) and (8) is omitted here, since it has been described above.

In addition to the conditions (7) and (8), the above-described conditions (1) and (2) are also effective for making the lens system compact while keeping a high optical performance.

Here, as clear from the condition (7), it is important to decrease the axial distance from the object side surface of the rear lens unit (III-B) of the third lens group (III) to the image plane for making the total length of the whole lens system. To achieve, this, it is effective for applying a known telephoto type refractive power arrangement, in which a front positive refractive power and a rear negative refractive power, to the rear lens unit (III-B) of the third lens group (III). Thus, it is desirable that the rear lens unit (III-B) consists of, from the object side, a first lens component (III-B-1) having a positive refractive power and a second lens component (III-B-2) having a negative refractive power, and the lens system fulfills the following condition;

$$0.3 < f_{3B\text{-}1}/f_{3B} < 0.75 \quad (11)$$

wherein; $f_{3B\text{-}1}$ represents the focal length of the first lens component (III-B-1) of the rear lens unit (III-B) of the third lens group (III); and $f_{3B}$ represents the focal length of the rear lens unit (III-B) of the third lens group (III).

If the upper limit of condition (11) is violated, the telephoto type refractive power arrangement can not be kept. It causes the increase of the total length of the whole lens system, and the positive deviation of the image plane when the rear lens unit (III-B) is shifted to the image side in the focusing operation. Contrary, if the lower limit of condition (11) is violated, the distortion deviates in the negative direction and the image plane also deviates in the negative direction when the rear lens unit (III-B) is shifted to the image side in the focusing operation.

In the present invention, the third lens group (III) is shiftable in the focusing operation. Thus, if the aberrations are not corrected well in the third lens group (III), the change of aberrations due to the focusing operation is undesirable increased. Especially, the rear lens unit (III-B) of the third lens group (III) plays an important part in controlling the change of aberrations due to the focusing operation, since the off-axial light passes through a relatively high position in the rear lens unit (III-B). Here, it is effective, for controlling the change of aberrations due to the focusing operation, to provide a negative meniscus lens element convex to the image side in the rear lens unit (III-B). Thus, the rear lens unit (III-B) of the third lens group (III) may be consisting of, from the object side, a positive lens element and a negative meniscus lens element convex to the image side. Since the negative refractive power provided by the negative meniscus lens element becomes almost uniform in the off-axial light, it is possible to control the coma aberration when the rear lens unit (III-B) of the third lens group (III) is shifted in the focusing operation.

Additionally, the condition (5) is also effective for correcting the field curvature across the entire focal length range, in addition to the conditions (1), (7) and (8).

As a further aspect of the present invention, the zoom lens system comprises, as shown in FIGS. 6 to 20, from the object side to the image side; a first lens group (I) having a positive refractive power; a second lens group (II) having a negative refractive power with having at least one aspheric surface; and a third lens group (III) having a positive refractive power; wherein the zooming operation is achieved so that the air space formed between the first and second lens groups is minimum in the shortest focal length condition.

In this case, the above-describd condition (9) and (10) are effective for correcting, in the shortest focal length condition, the distortion and the field curvature in a region closer to the optical axis and in the middle region of the image plane while having a good balance, and achieving a high zoom ratio.

In the present invention, in order to correcting the astigmatism or the field curvature in the middle of the image plane in the focal length range from the shortest focal length to the medium focal length, it is effective for fulfilling the following condition within the range of $y < 0.7 y_{max}$;

$$0 < (N' - N)\frac{d^2}{dy^2}\{x(y) - x_0(y)\} \quad (12)$$

Condition (12) defines that the aspheric surface applied to the second lens group (II) has a stronger positive refractive power or a weaker negative refractive power in the range of $y < 0.7 y_{max}$. If the condition (12) is violated, the astigmatism curve becomes uniform such as a wave shape, causing the deterioration of the image forming performance.

In the present invention, the aspheric surface is applied to the second lens group (II) for correcting the negative distortion in the shortest focal length condition. In other words, the aspheric surface produces the positive distortion. The zoom lens system having a positive first lens group (I), however, tends to produce positive distortion in the longest focal length condition. Thus, it is effective for decreasing the positive distortion produced by the aspheric surface in the longest focal length condition. To achieve this, the following condition is effective;

$$0.1 < h_t/h_w < 0.6 \quad (13)$$

wherein; $h_t$ represents the farthest position from the optical axis through which the axial ray passes on the aspheric surface in the longest focal length condition; and $h_w$ represents the farthest position from the optical axis through which the axial ray passes on the aspheric surface in the shortest focal length condition. Here, the axial ray means a ray passes through the center of the pupil of the lens system.

If the upper limit of condition (13) is violated, it becomes difficult to correct the positive distortion in the longest focal length condition, since the aspheric surface applied to the second lens group (II) produces the undesirable positive distortion in the longest focal length condition. If the lower limit of condition (13) is violated, the distance between the aspheric surface of the second lens group (II) and the pupil plane of the lens system is excessively decreased, causing the deterioration of the spherical aberration.

Here, in order to make the third lens group (III) more compact, it is desirable to arrange the pupil plane of the whole lens system at the image side of the second lens group (II) in any focal length condition. Thus, it is desirable to apply the aspheric surface to a lens surface located at the comparatively object side in the second lens group (II), and it is most favorable to apply the aspheric surface to the object side surface in the second lens group (II). Namely, the aspheric surface applied to the second lens group (II) should be located at a position far from the pupil plane, for correcting the distortion without deteriorating the spherical aberration.

Furthermore, it is desirable to fulfill the following conditions;

$$0 < f_w/r_{2-I} < 1.0 \tag{14}$$

$$0.3 < |f_{2-I}|/f_w < 1.0 \tag{15}$$

wherein; $r_{2-I}$ represents the paraxial radius of curvature of the lens surface located at the object side in the second lens group; and $f_{2-I}$ represents the paraxial focal length of the lens surface located at the object side in the second lens group.

Condition (14) defines the deviation of the aspheric surface from the basis spherical surface. If the lower limit of condition (14) is violated, since the deviation necessary for correcting the negative distortion in the shortest focal length condition becomes too large, it becomes difficult to manufacture the lens element having the aspheric surface. If the upper limit of condition (14) is violated, the positive coma aberration may be generated in the medium focal length condition.

Condition (15) defines the paraxial focal length of the lens element located at the object side in the second lens group, effective for keeping a sufficient back focal length necessary for the interchangeable lens in the 35 mm SLR camera system, and for correcting the sagittal flare in the longest focal length condition. If the lower limit of condition (15) is violated, it becomes difficult to keep a sufficient back focal length necessary for the interchangeable lens in the 35 mm SLR camera system. If the upper limit of condition (15) is violated, it becomes difficult to correct the sagittal flare in the longest focal length condition.

In the present invention, it is easy to design a zoom lens system having the same optical characteristics as the present invention has, by arranging a positive or negative/fixed or movable/lens element or lens group having a focal length, which is equal to or longer than 5 times of the shortest focal length of the whole lens system, at the object side of the first lens group (I), at the image side of the third lens group (III), or at a space formed between the successive two lens groups.

The following Tables 1 to 20 disclose, respectively, the first through third embodiments of the present invention. In the Tables, f equals to the focal length, $2\omega$ equals to the field angle, $F_{NO}$ equals the F-number, r is the radius of curvature with respective sub number indicating the surfaces from the object to image side along the optical axis, d represents the axial distance and includes both air spaces and the actual thickness of the lens elements along the optical axis, N equals the refractive index and again, the sub numbers refer to the particular optical element from the object to the image side, and finally, $\nu$ equals the Abbe number and the sub numbers refer to the specific lens elements from the object to the image side. The asterisk (*) represents the aspheric surface, and its coefficients are shown at the bottom of the respective Tables.

Here, the aspheric coefficients $A_1, A_2, \ldots$ are defined by the following equation;

$$X = A_0 Y^2 / \{1 + (1 - A_0^2 Y^2)^{\frac{1}{2}}\} + \sum_{i=1}^{n} A_i Y^i$$

wherein $A_0$ represents the paraxial radius of curvature of the basic spheric surface, X represents the coordinate along the optical surface measured from the top of the basic surface, and Y represents the coordinate perpendicular to the optical axis measured from the optical axis.

Table 21 represents the parameter of;

$$(|X| - |X_0|)/i\; C_0(N'-N)$$

with respect to the first to ninth embodiments. Table 22 represents the parameter of;

$$(N' - N)\frac{d}{dy}\{x(y) - x_0(y)\}$$

with respect to the tenth to twentieth embodiments. And Table 23 represents the parameter of;

$$(N' - N)\frac{d^2}{dy^2}\{x(y) - x_0(y)\}$$

with respect to the tenth to twentieth embodiments.

TABLE 1

[Embodiment 1]

f = 36.0–60.0–102.5  $F_{NO}$ = 3.6–4.1–4.6  $2\omega$ = 61.93°–39.60°–23.80°

| | Radius of curvature | | Axial distance | | Refractive index (Nd) | | Abbe number (νd) |
|---|---|---|---|---|---|---|---|
| $r_1$ | 151.288 | | | | | | |
| | | $d_1$ | 2.200 | $N_1$ | 1.84666 | $\nu_1$ | 23.64 |
| $r_2$ | 55.893 | | | | | | |
| | | $d_2$ | 7.200 | $N_2$ | 1.58913 | $\nu_2$ | 61.11 |
| $r_3$ | −161.551 | | | | | | |
| | | $d_3$ | 0.100 | | | | |
| $r_4$ | 33.216 | | | | | | |
| | | $d_4$ | 3.750 | $N_3$ | 1.69680 | $\nu_3$ | 56.47 |
| $r_5$ | 62.721 | | | | | | |
| | | $d_5$ | 0.600–11.647–20.643 | | | | |
| $r_6$ | 69.672 | | | | | | |
| | | $d_6$ | 1.300 | $N_4$ | 1.77250 | $\nu_4$ | 49.77 |
| $r_7$ | 15.014 | | | | | | |
| | | $d_7$ | 4.400 | | | | |
| $r_8$ | −96.491 | | | | | | |
| | | $d_8$ | 1.200 | $N_5$ | 1.69680 | $\nu_5$ | 56.47 |
| $r_9$ | 34.250 | | | | | | |
| | | $d_9$ | 0.300 | | | | |
| $r_{10}$ | 23.484 | | | | | | |
| | | $d_{10}$ | 3.000 | $N_6$ | 1.84666 | $\nu_6$ | 23.83 |
| $r_{11}$ | 14682.120 | | | | | | |
| | | $d_{11}$ | 1.550 | | | | |
| $r_{12}$ | −25.908 | | | | | | |
| | | $d_{12}$ | 1.200 | $N_7$ | 1.61800 | $\nu_7$ | 63.45 |
| $r_{13}$ | −1134.120 | | | | | | |
| | | $d_{13}$ | 14.922–8.935–2.500 | | | | |
| $r_{14}$ | 35.480 | | | | | | |
| | | $d_{14}$ | 3.000 | $N_8$ | 1.51728 | $\nu_8$ | 69.43 |
| $r_{15}$ | −41.335 | | | | | | |
| | | $d_{15}$ | 0.150 | | | | |
| $r_{16}$ | 20.133 | | | | | | |
| | | $d_{16}$ | 5.700 | $N_9$ | 1.51742 | $\nu_9$ | 52.15 |
| $r_{17}$ | −20.017 | | | | | | |
| | | $d_{17}$ | 2.200 | $N_{10}$ | 1.80741 | $\nu_{10}$ | 31.59 |
| $r_{18}$ | 44.333 | | | | | | |
| | | $d_{18}$ | 9.011–7.331–6.091 | | | | |
| $r_{19}$ | 55.092 | | | | | | |
| | | $d_{19}$ | 3.600 | $N_{11}$ | 1.67100 | $\nu_{11}$ | 51.73 |
| $r_{20}$ | −24.639 | | | | | | |
| | | $d_{20}$ | 6.205 | | | | |

TABLE 1-continued

[Embodiment 1]

| | | | | | | | |
|---|---|---|---|---|---|---|---|
| $r_{21}*$ | −16.689 | | | | | | |
| | | $d_{21}$ | 1.500 | $N_{12}$ | 1.80500 | $\nu_{12}$ | 40.97 |
| $r_{22}$ | −43.034 | | | | | | |
| | | $d = 73.488\text{-}76.668\text{-}78.189$ | | | | | |

Aspheric coefficients ($r_{21}$):

$A_4 = -0.14214 \times 10^{-4}$  $A_6 = -0.55768 \times 10^{-7}$
$A_8 = -0.29653 \times 10^{-10}$  $A_{10} = -0.82958 \times 10^{-13}$
$A_{12} = -0.55388 \times 10^{-16}$
$f_{3w}/f_w = 0.702$  $\Delta d_3/f_w = 0.081$  $f_w/f_{3B} = 0.611$
$(T_{3-B} + B_w - f_w)/f_w = 0.353$
Total length in the shortest focal length condition: 109.50

TABLE 2

[Embodiment 2]

$f = 36.0\text{-}60.0\text{-}102.5$  $F_{NO} = 3.6\text{-}4.1\text{-}4.6$  $2\omega = 61.93°\text{-}39.60°\text{-}23.80°$

| Radius of curvature | | Axial distance | | Refractive index (Nd) | | Abbe number ($\nu d$) | |
|---|---|---|---|---|---|---|---|
| $r_1$ | 142.261 | | | | | | |
| | | $d_1$ | 2.200 | $N_1$ | 1.84666 | $\nu_1$ | 23.83 |
| $r_2$ | 54.151 | | | | | | |
| | | $d_2$ | 7.284 | $N_2$ | 1.58913 | $\nu_2$ | 61.11 |
| $r_3$ | −153.458 | | | | | | |
| | | $d_3$ | 0.100 | | | | |
| $r_4$ | 33.439 | | | | | | |
| | | $d_4$ | 3.750 | $N_3$ | 1.69680 | $\nu_3$ | 56.47 |
| $r_5$ | 61.255 | | | | | | |
| | | $d_5$ | 0.600-11.614-20.749 | | | | |
| $r_6$ | 69.783 | | | | | | |
| | | $d_6$ | 1.300 | $N_4$ | 1.77250 | $\nu_4$ | 49.77 |
| $r_7$ | 15.036 | | | | | | |
| | | $d_7$ | 4.400 | | | | |
| $r_8$ | −96.027 | | | | | | |
| | | $d_8$ | 1.200 | $N_5$ | 1.69680 | $\nu_5$ | 56.47 |
| $r_9$ | 34.333 | | | | | | |
| | | $d_9$ | 0.300 | | | | |
| $r_{10}$ | 23.349 | | | | | | |
| | | $d_{10}$ | 3.000 | $N_6$ | 1.84666 | $\nu_6$ | 23.83 |
| $r_{11}$ | 12856.760 | | | | | | |
| | | $d_{11}$ | 1.550 | | | | |
| $r_{12}$ | −25.916 | | | | | | |
| | | $d_{12}$ | 1.200 | $N_7$ | 1.61800 | $\nu_7$ | 63.45 |
| $r_{13}$ | −1105.570 | | | | | | |
| | | $d_{13}$ | 15.322-9.138-2.500 | | | | |
| $r_{14}$ | 29.346 | | | | | | |
| | | $d_{14}$ | 3.079 | $N_8$ | 1.51728 | $\nu_8$ | 69.43 |
| $r_{15}$ | −50.406 | | | | | | |
| | | $d_{15}$ | 0.150 | | | | |
| $r_{16}$ | 23.837 | | | | | | |
| | | $d_{16}$ | 5.700 | $N_9$ | 1.51742 | $\nu_9$ | 52.15 |
| $r_{17}$ | −19.337 | | | | | | |
| | | $d_{17}$ | 2.200 | $N_{10}$ | 1.80741 | $\nu_{10}$ | 31.59 |
| $r_{18}$ | 75.457 | | | | | | |
| | | $d_{18}$ | 9.095-7.415-6.175 | | | | |
| $r_{19}*$ | 156.148 | | | | | | |
| | | $d_{19}$ | 3.600 | $N_{11}$ | 1.67790 | $\nu_{11}$ | 55.38 |
| $r_{20}$ | −21.719 | | | | | | |
| | | $d_{20}$ | 6.230 | | | | |
| $r_{21}$ | −16.522 | | | | | | |
| | | $d_{21}$ | 1.500 | $N_{12}$ | 1.60500 | $\nu_{12}$ | 40.97 |
| $r_{22}$ | −39.152 | | | | | | |
| | | $d = 74.160\text{-}77.109\text{-}76.367$ | | | | | |

Aspheric coefficients ($r_{19}$):

$A_4 = -0.14228 \times 10^{-4}$  $A_6 = -0.13423 \times 10^{-7}$
$A_8 = -0.14560 \times 10^{-10}$  $A_{10} = -0.25478 \times 10^{-14}$
$A_{12} = -0.14573 \times 10^{-17}$
$f_{3w}/f_w = 0.711$  $\Delta d_3/f_w = 0.081$  $f_w/f_{3B} = 0.489$
$(T_{3-B} + B_w - f_w)/f_w = 0.356$
Total length in the shortest focal length condition: 110.24

TABLE 3

[Embodiment 3]

$f = 36.0\text{-}60.0\text{-}102.0$  $F_{NO} = 3.6\text{-}4.2\text{-}4.65$  $2\omega = 61.93°\text{-}39.60°\text{-}23.91°$

| Radius of curvature | | Axial distance | | Refractive index (Nd) | | Abbe number ($\nu d$) | |
|---|---|---|---|---|---|---|---|
| $r_1$ | 120.926 | | | | | | |
| | | $d_1$ | 2.200 | $N_1$ | 1.84666 | $\nu_1$ | 23.83 |
| $r_2$ | 44.896 | | | | | | |
| | | $d_2$ | 7.150 | $N_2$ | 1.67000 | $\nu_2$ | 57.07 |
| $r_3$ | −326.540 | | | | | | |
| | | $d_3$ | 0.100 | | | | |
| $r_4$ | 29.132 | | | | | | |
| | | $d_4$ | 3.250 | $N_3$ | 1.69680 | $\nu_3$ | 56.47 |
| $r_5$ | 50.276 | | | | | | |
| | | $d_5$ | 0.900-9.586-17.809 | | | | |
| $r_6$ | 66.325 | | | | | | |
| | | $d_6$ | 1.200 | $N_4$ | 1.77250 | $\nu_4$ | 49.77 |
| $r_7$ | 14.430 | | | | | | |
| | | $d_7$ | 3.950 | | | | |
| $r_8$ | −1357.755 | | | | | | |
| | | $d_8$ | 1.150 | $N_5$ | 1.67000 | $\nu_5$ | 57.07 |
| $r_9$ | 34.737 | | | | | | |
| | | $d_9$ | 0.300 | | | | |
| $r_{10}$ | 19.885 | | | | | | |
| | | $d_{10}$ | 2.680 | $N_6$ | 1.84666 | $\nu_6$ | 23.83 |
| $r_{11}$ | 114.785 | | | | | | |
| | | $d_{11}$ | 1.620 | | | | |
| $r_{12}$ | −29.666 | | | | | | |
| | | $d_{12}$ | 1.150 | $N_7$ | 1.61800 | $\nu_7$ | 63.39 |
| $r_{13}$ | 79.294 | | | | | | |
| | | $d_{13}$ | 5.505-8.926-2.360 | | | | |
| $r_{14}$ | 24.547 | | | | | | |
| | | $d_{14}$ | 3.150 | $N_8$ | 1.67000 | $\nu_8$ | 57.07 |
| $r_{15}$ | −71.330 | | | | | | |
| | | $d_{15}$ | 0.150 | | | | |
| $r_{16}$ | 36.161 | | | | | | |
| | | $d_{16}$ | 6.000 | $N_9$ | 1.51680 | $\nu_9$ | 64.20 |
| $r_{17}$ | −15.061 | | | | | | |
| | | $d_{17}$ | 2.500 | $N_{10}$ | 1.80741 | $\nu_{10}$ | 31.59 |
| $r_{18}$ | 87.398 | | | | | | |
| | | $d_{18}$ | 4.673-2.566-0.909 | | | | |
| $r_{19}$ | 59.168 | | | | | | |
| | | $d_{19}$ | 3.000 | $N_{11}$ | 1.72000 | $\nu_{11}$ | 42.02 |
| $r_{20}$ | −22.059 | | | | | | |
| | | $d_{20}$ | 3.605 | | | | |
| $r_{21}*$ | −25.806 | | | | | | |
| | | $d_{21}$ | 0.035 | $N_{12}$ | 1.51790 | $\nu_{12}$ | 52.31 |
| $r_{22}$ | −22.822 | | | | | | |
| | | $d_{22}$ | 1.800 | $N_{13}$ | 1.80500 | $\nu_{13}$ | 40.97 |
| $r_{23}$ | 503.492 | | | | | | |
| | | $d = 66.067\text{-}66.067\text{-}66.067$ | | | | | |

Aspheric coefficients ($r_{21}$):

$A_4 = -0.66020 \times 10^{-4}$  $A_6 = -0.52200 \times 10^{-7}$
$A_8 = -0.64384 \times 10^{-8}$  $A_{10} = -0.11612 \times 10^{-9}$
$A_{12} = -0.84797 \times 10^{-12}$
$f_{3w}/f_w = 0.671$  $\Delta d_3/f_w = 0.105$  $f_w/f_{3B} = 0.579$
$(T_{3-B} + B_w - f_w)/f_w = 0.256$

TABLE 4

[Embodiment 4]

$f = 36.0\text{-}60.0\text{-}102.5$  $F_{NO} = 3.6\text{-}4.1\text{-}4.6$  $2\omega = 61.93°\text{-}19.80°\text{-}23.80°$

| Radius of curvature | | Axial distance | | Refractive index (Nd) | | Abbe number ($\nu d$) | |
|---|---|---|---|---|---|---|---|
| $r_1$ | 130.190 | | | | | | |
| | | $d_1$ | 2.200 | $N_1$ | 1.84666 | $\nu_1$ | 23.66 |
| $r_2$ | 53.042 | | | | | | |
| | | $d_2$ | 7.400 | $N_2$ | 1.58913 | $\nu_2$ | 61.11 |
| $r_3$ | −166.185 | | | | | | |
| | | $d_3$ | 0.100 | | | | |
| $r_4$ | 32.168 | | | | | | |
| | | $d_4$ | 3.750 | $N_3$ | 1.69680 | $\nu_3$ | 56.47 |
| $r_5$ | 57.123 | | | | | | |
| | | $d_5$ | 0.800-11.684-20.737 | | | | |
| $r_6$ | 71.699 | | | | | | |
| | | $d_6$ | 1.200 | $N_4$ | 1.77250 | $\nu_4$ | 49.77 |
| $r_7$ | 14.435 | | | | | | |
| | | $d_7$ | 4.100 | | | | |
| $r_8$ | −82.403 | | | | | | |
| | | $d_8$ | 1.150 | $N_5$ | 1.69680 | $\nu_5$ | 56.47 |
| $r_9$ | 30.330 | | | | | | |

TABLE 4-continued

[Embodiment 4]

| | | | | | | |
|---|---|---|---|---|---|---|
| | | $d_9$ 0.300 | | | | |
| $r_{10}$ | 22.475 | | | | | |
| | | $d_{10}$ 2.800 | $N_6$ | 1.84666 | $\nu_6$ | 23.63 |
| $r_{11}$ | −1435.358 | | | | | |
| | | $d_{11}$ 1.550 | | | | |
| $r_{12}$ | −24.888 | | | | | |
| | | $d_{12}$ 1.150 | $N_7$ | 1.61800 | $\nu_7$ | 63.45 |
| $r_{13}$ | −146.023 | | | | | |
| | | $d_{13}$ 14.815-8.907-2.500 | | | | |
| $r_{14}$ | 26.795 | | | | | |
| | | $d_{14}$ 3.200 | $N_8$ | 1.51728 | $\nu_8$ | 69.43 |
| $r_{15}$ | −44.107 | | | | | |
| | | $d_{15}$ 0.150 | | | | |
| $r_{16}$ | 21.193 | | | | | |
| | | $d_{16}$ 5.700 | $N_9$ | 1.51742 | $\nu_9$ | 52.15 |
| $r_{17}$ | −17.996 | | | | | |
| | | $d_{17}$ 2.200 | $N_{10}$ | 1.60741 | $\nu_{10}$ | 31.59 |
| $r_{18}$ | 36.972 | | | | | |
| | | $d_{18}$ 8.616-6.966-5.666 | | | | |
| $r_{19}$ | 53.263 | | | | | |
| | | $d_{19}$ 3.600 | $N_{11}$ | 1.67880 | $\nu_{11}$ | 48.97 |
| $r_{20}$ | −22.605 | | | | | |
| | | $d_{20}$ 5.636 | | | | |
| $r_{21}$* | −16.502 | | | | | |
| | | $d_{21}$ 2.070 | $N_{12}$ | 1.60500 | $\nu_{12}$ | 40.97 |
| $r_{22}$ | −39.810 | | | | | |
| | | $d = 72.687-76.013-77.359$ | | | | |

Aspheric coefficients ($r_{21}$):
$A_4 = -0.12623 \times 10^{-4}$   $A_6 = -0.65251 \times 10^{-7}$
$A_8 = -0.82718 \times 10^{-10}$   $A_{10} = -0.17132 \times 10^{-12}$
$A_{12} = -0.17476 \times 10^{-15}$
$(T_{3-B} + B_w - f_w)/f_w = 0.398$   $\beta_F = -1.950 - -1.285$
$f_{3w}/f_w = 0.730$   $\Delta d_3/f_w = 0.082$

TABLE 5

[Embodiment 5]

$f = 28.6-50.0-82.5$   $F_{NO} = 3.6-4.1-4.65$   $2\omega = 73.34°-46.73°-29.34°$

| Radius of curvature | | Axial distance | Refractive index (Nd) | | Abbe number ($\nu d$) | |
|---|---|---|---|---|---|---|
| $r_1$ | 130.497 | | | | | |
| | | $d_1$ 1.700 | $N_1$ | 1.84666 | $\nu_1$ | 23.83 |
| $r_2$ | 54.609 | | | | | |
| | | $d_2$ 7.400 | $N_2$ | 1.65830 | $\nu_2$ | 58.52 |
| $r_3$ | 971.553 | | | | | |
| | | $d_3$ 0.100 | | | | |
| $r_4$ | 39.743 | | | | | |
| | | $d_4$ 5.000 | $N_3$ | 1.65830 | $\nu_3$ | 58.52 |
| $r_5$ | 99.220 | | | | | |
| | | $d_5$ 0.890-13.931-26.799 | | | | |
| $r_6$ | 49.459 | | | | | |
| | | $d_6$ 1.300 | $N_4$ | 1.78831 | $\nu_4$ | 47.32 |
| $r_7$ | 13.055 | | | | | |
| | | $d_7$ 6.400 | | | | |
| $r_8$ | −310.756 | | | | | |
| | | $d_8$ 1.000 | $N_5$ | 1.77250 | $\nu_5$ | 49.77 |
| $r_9$ | 24.102 | | | | | |
| | | $d_9$ 0.500 | | | | |
| $r_{10}$ | 19.251 | | | | | |
| | | $d_{10}$ 3.500 | $N_6$ | 1.84666 | $\nu_6$ | 23.83 |
| $r_{11}$ | −158.796 | | | | | |
| | | $d_{11}$ 2.000 | | | | |
| $r_{12}$ | −35.957 | | | | | |
| | | $d_{12}$ 1.000 | $N_7$ | 1.69680 | $\nu_7$ | 56.47 |
| $r_{13}$ | 79.170 | | | | | |
| | | $d_{13}$ 12.506-6.405-2.000 | | | | |
| $r_{14}$ | 22.942 | | | | | |
| | | $d_{14}$ 3.000 | $N_8$ | 1.65890 | $\nu_8$ | 56.41 |
| $r_{15}$ | −79.106 | | | | | |
| | | $d_{15}$ 0.221 | | | | |
| $r_{16}$ | 16.541 | | | | | |
| | | $d_{16}$ 4.500 | $N_9$ | 1.56883 | $\nu_9$ | 56.04 |
| $r_{17}$ | −20.474 | | | | | |
| | | $d_{17}$ 1.500 | $N_{10}$ | 1.60741 | $\nu_{10}$ | 31.59 |
| $r_{18}$ | 16.607 | | | | | |
| | | $d_{18}$ 7.000-5.200-4.200 | | | | |
| $r_{19}$ | 56.285 | | | | | |
| | | $d_{19}$ 4.500 | $N_{11}$ | 1.66998 | $\nu_{11}$ | 39.23 |

TABLE 5-continued

[Embodiment 5]

| | | | | | | |
|---|---|---|---|---|---|---|
| $r_{20}$ | −17.198 | | | | | |
| | | $d_{20}$ 1.748 | | | | |
| $r_{21}$* | −14.966 | | | | | |
| | | $d_{21}$ 1.500 | $N_{12}$ | 1.84666 | $\nu_{12}$ | 23.83 |
| $r_{22}$ | −26.671 | | | | | |
| | | $d = 67.266-72.405-79.868$ | | | | |

Aspheric coefficients ($r_{21}$):
$A_4 = -0.10791 \times 10^{-4}$   $A_6 = 0.54737 \times 10^{-7}$
$A_8 = -0.19619 \times 10^{-8}$   $A_{10} = 0.21636 \times 10^{-10}$
$A_{12} = -0.10765 \times 10^{-12}$
$(T_{3-B} + B_w - f_w)/f_w = 0.563$   $\beta_F = -1.785 - -1.117$
$f_{3w}/f_w = 0.863$   $\Delta d_3/f_w = 0.097$

TABLE 6

[Embodiment 6]

$f = 28.8-50.0-82.5$   $F_{NO} = 3.6-4.1-4.65$   $2\omega = 73.34°-46.73°-29.34°$

| Radius of curvature | | Axial distance | Refractive index (Nd) | | Abbe number ($\nu d$) | |
|---|---|---|---|---|---|---|
| $r_1$ | 124.045 | | | | | |
| | | $d_1$ 1.700 | $N_1$ | 1.84666 | $\nu_1$ | 23.83 |
| $r_2$ | 56.361 | | | | | |
| | | $d_2$ 6.200 | $N_2$ | 1.65830 | $\nu_2$ | 58.52 |
| $r_3$ | 500.000 | | | | | |
| | | $d_3$ 0.100 | | | | |
| $r_4$ | 39.173 | | | | | |
| | | $d_4$ 6.000 | $N_3$ | 1.65830 | $\nu_3$ | 58.52 |
| $r_5$ | 115.778 | | | | | |
| | | $d_5$ 0.690-11.164-21.484 | | | | |
| $r_6$* | 89.321 | | | | | |
| | | $d_6$ 1.300 | $N_4$ | 1.80700 | $\nu_4$ | 39.71 |
| $r_7$ | 14.253 | | | | | |
| | | $d_7$ 6.350 | | | | |
| $r_8$ | −60.952 | | | | | |
| | | $d_8$ 1.000 | $N_5$ | 1.78831 | $\nu_5$ | 47.32 |
| $r_9$ | 30.172 | | | | | |
| | | $d_9$ 0.467 | | | | |
| $r_{10}$ | 23.472 | | | | | |
| | | $d_{10}$ 5.000 | $N_6$ | 1.78472 | $\nu_6$ | 25.75 |
| $r_{11}$ | −36.296 | | | | | |
| | | $d_{11}$ 1.940 | | | | |
| $r_{12}$ | −22.046 | | | | | |
| | | $d_{12}$ 1.000 | $N_7$ | 1.71300 | $\nu_7$ | 53.93 |
| $r_{13}$ | −535.920 | | | | | |
| | | $d_{13}$ 12.210-6.165-2.000 | | | | |
| $r_{14}$ | 26.368 | | | | | |
| | | $d_{14}$ 2.983 | $N_8$ | 1.72000 | $\nu_8$ | 50.31 |
| $r_{15}$ | −102.090 | | | | | |
| | | $d_{15}$ 0.221 | | | | |
| $r_{16}$ | 20.663 | | | | | |
| | | $d_{16}$ 4.700 | $N_9$ | 1.56883 | $\nu_9$ | 56.04 |
| $r_{17}$ | −23.553 | | | | | |
| | | $d_{17}$ 0.200 | | | | |
| $r_{18}$ | −21.846 | | | | | |
| | | $d_{18}$ 1.970 | $N_{10}$ | 1.60741 | $\nu_{10}$ | 31.59 |
| $r_{19}$ | 22.563 | | | | | |
| | | $d_{19}$ 7.200-5.400-4.400 | | | | |
| $r_{20}$ | 35.905 | | | | | |
| | | $d_{20}$ 6.000 | $N_{11}$ | 1.66998 | $\nu_{11}$ | 39.23 |
| $r_{21}$ | −19.499 | | | | | |
| | | $d_{21}$ 1.646 | | | | |
| $r_{22}$* | −22.610 | | | | | |
| | | $d_{22}$ 1.287 | $N_{12}$ | 1.84666 | $\nu_{12}$ | 23.83 |
| $r_{23}$ | −87.958 | | | | | |
| | | $d = 70.365-72.794-77.949$ | | | | |

Aspheric coefficients ($r_6$):
$A_4 = 0.43342 \times 10^{-5}$

Aspheric coefficients ($r_{22}$):
$A_4 = -0.29567 \times 10^{-4}$   $A_6 = -0.10459 \times 10^{-6}$
$A_8 = -0.30056 \times 10^{-9}$   $A_{10} = 0.34265 \times 10^{-11}$
$A_{12} = -0.19968 \times 10^{-13}$
$(T_{3-B} + B_w - f_w)/f_w = 0.676$   $\beta_F = -2.150 - -1.240$
$f_{3w}/f_w = 0.870$   $\Delta d_3/f_w = 0.097$

TABLE 7

[Embodiment 7]

$f = 28.6–50.0–82.5$  $F_{NO} = 3.6–4.1–4.65$  $2\omega = 73.34°–46.73°–29.34°$

| | Radius of curvature | | Axial distance | Refractive index (Nd) | | Abbe number ($\nu$d) |
|---|---|---|---|---|---|---|
| $r_1$ | 77.273 | | | | | |
| | | $d_1$ | 1.700 | $N_1$ | 1.84666 | $\nu_1$ 23.83 |
| $r_2$ | 48.137 | | | | | |
| | | $d_2$ | 6.200 | $N_2$ | 1.51680 | $\nu_2$ 64.12 |
| $r_3$ | 500.000 | | | | | |
| | | $d_3$ | 0.100 | | | |
| $r_4$ | 37.980 | | | | | |
| | | $d_4$ | 6.000 | $N_3$ | 1.51680 | $\nu_3$ 64.12 |
| $r_5$ | 161.674 | | | | | |
| | | $d_5$ | 0.890–11.142–21.363 | | | |
| $r_6$* | 96.239 | | | | | |
| | | $d_6$ | 1.300 | $N_4$ | 1.80500 | $\nu_4$ 40.97 |
| $r_7$ | 14.088 | | | | | |
| | | $d_7$ | 6.350 | | | |
| $r_8$ | −80.902 | | | | | |
| | | $d_8$ | 1.000 | $N_5$ | 1.78831 | $\nu_5$ 47.32 |
| $r_9$ | 33.519 | | | | | |
| | | $d_9$ | 0.467 | | | |
| $r_{10}$ | 22.975 | | | | | |
| | | $d_{10}$ | 5.000 | $N_6$ | 1.78472 | $\nu_6$ 25.75 |
| $r_{11}$ | −50.724 | | | | | |
| | | $d_{11}$ | 1.940 | | | |
| $r_{12}$ | −26.660 | | | | | |
| | | $d_{12}$ | 1.000 | $N_7$ | 1.69680 | $\nu_7$ 56.47 |
| $r_{13}$ | 183.104 | | | | | |
| | | $d_{13}$ | 12.340–6.205–2.000 | | | |
| $r_{14}$ | 36.616 | | | | | |
| | | $d_{14}$ | 2.983 | $N_8$ | 1.72000 | $\nu_8$ 50.31 |
| $r_{15}$ | −62.296 | | | | | |
| | | $d_{15}$ | 0.221 | | | |
| $r_{16}$ | 15.266 | | | | | |
| | | $d_{16}$ | 4.700 | $N_9$ | 1.56883 | $\nu_9$ 56.04 |
| $r_{17}$ | −27.407 | | | | | |
| | | $d_{17}$ | 0.200 | | | |
| $r_{18}$ | −24.825 | | | | | |
| | | $d_{18}$ | 1.970 | $N_{10}$ | 1.80741 | $\nu_{10}$ 31.59 |
| $r_{19}$ | 18.679 | | | | | |
| | | $d_{19}$ | 7.200–5.400–4.400 | | | |
| $r_{20}$ | 66.181 | | | | | |
| | | $d_{20}$ | 6.000 | $N_{11}$ | 1.66998 | $\nu_{11}$ 39.23 |
| $r_{21}$* | −15.020 | | | | | |
| | | $d_{21}$ | 1.646 | | | |
| $r_{22}$ | −13.402 | | | | | |
| | | $d_{22}$ | 1.287 | $N_{12}$ | 1.60518 | $\nu_{12}$ 25.43 |
| $r_{23}$ | −27.760 | | | | | |
| | | $d$ = 70.496–72.813–77.848 | | | | |

Aspheric coefficients ($r_6$):
$A_4 = 0.22494 \times 10^{-5}$

Aspheric coefficients ($r_{21}$):
$A_4 = -0.73537 \times 10^{-5}$  $A_6 = 0.47385 \times 10^{-7}$
$A_8 = 0.93074 \times 10^{-10}$  $A_{10} = -0.83512 \times 10^{-12}$
$A_{12} = -0.67479 \times 10^{-14}$
$(T_3 - B + B_w - f_w)/f_w = 0.678$  $\beta F = -2.145 - -1.241$
$f_{3w}/f_w = 0.877$  $\Delta d_3/f_w = 0.097$

TABLE 8

[Embodiment 8]

$f = 28.6–50.0–97.5$  $F_{NO} = 3.6–4.1–4.65$  $2\omega = 73.34°–46.73°–24.98°$

| | Radius of curvature | | Axial distance | Refractive index (Nd) | | Abbe number ($\nu$d) |
|---|---|---|---|---|---|---|
| $r_1$ | 222.369 | | | | | |
| | | $d_1$ | 1.700 | $N_1$ | 1.84666 | $\nu_1$ 23.83 |
| $r_2$ | 74.136 | | | | | |
| | | $d_2$ | 6.200 | $N_2$ | 1.65830 | $\nu_2$ 58.52 |
| $r_3$ | −368.794 | | | | | |
| | | $d_3$ | 0.100 | | | |
| $r_4$ | 37.209 | | | | | |
| | | $d_4$ | 6.000 | $N_3$ | 1.65830 | $\nu_3$ 58.52 |
| $r_5$ | 91.995 | | | | | |
| | | $d_5$ | 0.690–10.492–23.859 | | | |
| $r_6$* | 123.272 | | | | | |
| | | $d_6$ | 1.300 | $N_4$ | 1.80700 | $\nu_4$ 39.71 |
| $r_7$ | 14.911 | | | | | |
| | | $d_7$ | 6.350 | | | |
| $r_8$ | −49.230 | | | | | |
| | | $d_8$ | 1.000 | $N_5$ | 1.78831 | $\nu_5$ 47.32 |
| $r_9$ | 33.484 | | | | | |
| | | $d_9$ | 0.467 | | | |
| $r_{10}$ | 26.342 | | | | | |
| | | $d_{10}$ | 5.000 | $N_6$ | 1.78472 | $\nu_6$ 25.75 |
| $r_{11}$ | −34.442 | | | | | |
| | | $d_{11}$ | 1.940 | | | |
| $r_{12}$ | −21.040 | | | | | |
| | | $d_{12}$ | 1.000 | $N_7$ | 1.71300 | $\nu_7$ 53.93 |
| $r_{13}$ | −133.711 | | | | | |
| | | $d_{13}$ | 14.318–7.866–2.000 | | | |
| $r_{14}$ | 25.672 | | | | | |
| | | $d_{14}$ | 2.983 | $N_8$ | 1.72000 | $\nu_8$ 50.31 |
| $r_{15}$ | −90.432 | | | | | |
| | | $d_{15}$ | 0.221 | | | |
| $r_{16}$ | 22.201 | | | | | |
| | | $d_{16}$ | 4.700 | $N_9$ | 1.56883 | $\nu_9$ 56.04 |
| $r_{17}$ | −24.258 | | | | | |
| | | $d_{17}$ | 0.200 | | | |
| $r_{18}$ | −22.310 | | | | | |
| | | $d_{18}$ | 1.970 | $N_{10}$ | 1.60741 | $\nu_{10}$ 31.59 |
| $r_{19}$ | 24.684 | | | | | |
| | | $d_{19}$ | 7.200–5.400–4.400 | | | |
| $r_{20}$ | 36.141 | | | | | |
| | | $d_{20}$ | 6.000 | $N_{11}$ | 1.61293 | $\nu_{11}$ 36.96 |
| $r_{21}$ | −18.253 | | | | | |
| | | $d_{21}$ | 1.646 | | | |
| $r_{22}$* | −20.472 | | | | | |
| | | $d_{22}$ | 1.287 | $N_{12}$ | 1.84666 | $\nu_{12}$ 23.83 |
| $r_{23}$ | −74.397 | | | | | |
| | | $d$ = 72.474–73.823–80.324 | | | | |

Aspheric coefficients ($r_6$):
$A_4 = 0.49419 \times 10^{-5}$

Aspheric coefficients ($r_{22}$):
$A_4 = -0.29735 \times 10^{-4}$  $A_6 = -0.11946 \times 10^{-6}$
$A_8 = -0.42523 \times 10^{-9}$  $A_{10} = 0.29324 \times 10^{-11}$
$A_{12} = -0.18909 \times 10^{-13}$
$(T_3 - B + B_w - f_w)/f_w = 0.684$  $\beta F = -2.242 - -1.241$
$f_{3w}/f_w = 0.885$  $\Delta d_3/f_w = 0.097$

TABLE 9

[Embodiment 9]

$f = 28.6–50.0–102.5$  $F_{NO} = 3.6–4.1–4.65$  $2\omega = 73.34°–46.73°–23.80°$

| | Radius of curvature | | Axial distance | Refractive index (Nd) | | Abbe number ($\nu$d) |
|---|---|---|---|---|---|---|
| $r_1$ | 108.001 | | | | | |
| | | $d_1$ | 1.700 | $N_1$ | 1.84666 | $\nu_1$ 23.63 |
| $r_2$ | 56.000 | | | | | |
| | | $d_2$ | 6.200 | $N_2$ | 1.58913 | $\nu_2$ 61.11 |
| $r_3$ | 2123.502 | | | | | |
| | | $d_3$ | 0.100 | | | |
| $r_4$ | 37.818 | | | | | |
| | | $d_4$ | 6.000 | $N_3$ | 1.58913 | $\nu_3$ 61.11 |
| $r_5$ | 125.842 | | | | | |
| | | $d_5$ | 0.890–10.327–24.529 | | | |
| $r_6$* | 91.484 | | | | | |
| | | $d_6$ | 1.300 | $N_4$ | 1.80700 | $\nu_4$ 39.71 |
| $r_7$ | 14.418 | | | | | |
| | | $d_7$ | 6.350 | | | |
| $r_8$ | −40.127 | | | | | |
| | | $d_8$ | 1.000 | $N_5$ | 1.78831 | $\nu_5$ 47.32 |
| $r_9$ | 53.786 | | | | | |
| | | $d_9$ | 0.467 | | | |
| $r_{10}$ | 27.857 | | | | | |
| | | $d_{10}$ | 5.000 | $N_6$ | 1.78472 | $\nu_6$ 25.75 |
| $r_{11}$ | −33.118 | | | | | |
| | | $d_{11}$ | 1.940 | | | |
| $r_{12}$ | −20.485 | | | | | |
| | | $d_{12}$ | 1.000 | $N_7$ | 1.71300 | $\nu_7$ 53.93 |
| $r_{13}$ | −621.427 | | | | | |
| | | $d_{13}$ | 14.637–8.245–2.000 | | | |
| $r_{14}$ | 29.605 | | | | | |
| | | $d_{14}$ | 2.983 | $N_8$ | 1.71300 | $\nu_8$ 53.93 |
| $r_{15}$ | −65.517 | | | | | |
| | | $d_{15}$ | 0.221 | | | |

TABLE 9-continued

[Embodiment 9]

| | | | | | | | |
|---|---|---|---|---|---|---|---|
| $r_{16}$ | 20.839 | | | | | | |
| | | $d_{16}$ | 4.700 | $N_9$ | 1.57250 | $\nu_9$ | 57.54 |
| $r_{17}$ | −25.013 | | | | | | |
| | | $d_{17}$ | 0.200 | | | | |
| $r_{18}$ | −23.111 | | | | | | |
| | | $d_{18}$ | 1.970 | $N_{10}$ | 1.80741 | $\nu_{10}$ | 31.59 |
| $r_{19}$ | 23.742 | | | | | | |
| | | $d_{19}$ | 7.200-5.400-4.400 | | | | |
| $r_{20}$ | 39.013 | | | | | | |
| | | $d_{20}$ | 6.000 | $N_{11}$ | 1.62588 | $\nu_{11}$ | 35.74 |
| $r_{21}$ | −18.744 | | | | | | |
| | | $d_{21}$ | 1.646 | | | | |
| $r_{22}*$ | −21.575 | | | | | | |
| | | $d_{22}$ | 1.287 | $N_{12}$ | 1.80518 | $\nu_{12}$ | 25.43 |
| $r_{23}$ | −103.778 | | | | | | |

$d = 72.793-74.037-80.994$

Aspheric coefficients ($r_6$):
$A_4 = 0.38765 \times 10^{-5}$

Aspheric coefficients ($r_{22}$):
$A_4 = -0.30018 \times 10^{-4}$   $A_6 = -0.96656 \times 10^{-7}$
$A_8 = -0.33133 \times 10^{-9}$   $A_{10} = 0.29618 \times 10^{-11}$
$A_{12} = -0.20786 \times 10^{-13}$
$(T_3 - B + B_w - f_w)/f_w = 0.669$  $\beta_F = -2.266 - -1.241$
$f_{3w}/f_w = 0.876$  $d_3/f_w = 0.097$

TABLE 10

[Emodiment 10]

$f = 28.8-50.0-82.5$  $F_{NO} = 3.6-4.1-4.65$  $2\omega = 73.74°-46.73°-29.34°$

| Radius of curvature | | Axial distance | | Refractive index (Nd) | | Abbe number ($\nu$d) |
|---|---|---|---|---|---|---|
| $r_1$ | 121.298 | | | | | |
| | | $d_1$ | 1.700 | $N_1$ | 1.84666 | $\nu_1$ 23.63 |
| $r_2$ | 55.528 | | | | | |
| | | $d_2$ | 6.200 | $N_2$ | 1.65830 | $\nu_2$ 58.52 |
| $r_3$ | 500.000 | | | | | |
| | | $d_3$ | 0.100 | | | |
| $r_4$ | 38.317 | | | | | |
| | | $d_4$ | 6.000 | $N_3$ | 165830. | $\nu_3$ 58.52 |
| $r_5$ | 106.024 | | | | | |
| | | $d_5$ | 0.890-11.140-21.431 | | | |
| $r_6*$ | 76.935 | | | | | |
| | | $d_6$ | 1.300 | $N_4$ | 1.80700 | $\nu_4$ 39.71 |
| $r_7$ | 13.898 | | | | | |
| | | $d_7$ | 6.350 | | | |
| $r_8$ | −57.915 | | | | | |
| | | $d_8$ | 1.000 | $N_5$ | 1.78831 | $\nu_5$ 47.32 |
| $r_9$ | 30.358 | | | | | |
| | | $d_9$ | 0.467 | | | |
| $r_{10}$ | 23.447 | | | | | |
| | | $d_{10}$ | 5.000 | $N_6$ | 1.78472 | $\nu_6$ 25.75 |
| $r_{11}$ | −36.021 | | | | | |
| | | $d_{11}$ | 1.940 | | | |
| $r_{12}$ | −21.986 | | | | | |
| | | $d_{12}$ | 1.000 | $N_7$ | 1.71300 | $\nu_7$ 53.93 |
| $r_{13}$ | −484.870 | | | | | |
| | | $d_{13}$ | 11.198-5.158-1.000 | | | |
| $r_{14}$ | aperture | | | | | |
| | | $d_{14}$ | 1.000 | | | |
| $r_{15}$ | 26.234 | | | | | |
| | | $d_{15}$ | 2.983 | $N_8$ | 1.72000 | $\nu_8$ 50.31 |
| $r_{16}$ | −106.279 | | | | | |
| | | $d_{16}$ | 0.221 | | | |
| $r_{17}$ | 20.726 | | | | | |
| | | $d_{17}$ | 4.700 | $N_9$ | 1.56883 | $\nu_9$ 56.04 |
| $r_{18}$ | −23.355 | | | | | |
| | | $d_{18}$ | 0.200 | | | |
| $r_{19}$ | −21.710 | | | | | |
| | | $d_{19}$ | 1.970 | $N_{10}$ | 1.80741 | $\nu_{10}$ 31.59 |
| $r_{20}$ | 22.781 | | | | | |
| | | $d_{20}$ | 7.200-5.400-4.400 | | | |
| $r_{21}$ | 36.200 | | | | | |
| | | $d_{21}$ | 6.000 | $N_{11}$ | 1.66998 | $\nu_{11}$ 39.23 |
| $r_{22}$ | −19.460 | | | | | |
| | | $d_{22}$ | 1.646 | | | |
| $r_{23}*$ | −22.391 | | | | | |
| | | $d_{23}$ | 1.287 | $N_{12}$ | 1.84666 | $\nu_{12}$ 23.83 |

TABLE 10-continued

[Emodiment 10]

| | | |
|---|---|---|
| $r_{24}$ | −83.384 | |
| | $d = 70.354-72.764-77.897$ | |

Aspheric coefficients ($r_6$): $\epsilon = 1.0$
$A_4 = 0.46188 \times 10^{-5}$

Aspheric coefficients ($r_{22}$): $\epsilon = 1.0$
$A_4 = -0.29601 \times 10^{-4}$   $A_6 = -0.10564 \times 10^{-6}$
$A_8 = -0.30510 \times 10^{-9}$   $A_{10} = 0.34132 \times 10^{-11}$
$A_{12} = -0.19976 \times 10^{-13}$

TABLE 11

[Embodiment 11]

$f = 28.8-50.0-92.5$  $F_{NO} = 3.6-4.1-4.65$  $2\omega = 73.74°-46.73°-29.25°$

| Radius of curvature | | Axial distance | | Refractive index (Nd) | | Abbe number ($\nu$d) |
|---|---|---|---|---|---|---|
| $r_1$ | 124.625 | | | | | |
| | | $d_1$ | 1.700 | $N_1$ | 1.84666 | $\nu_1$ 23.63 |
| $r_2$ | 57.996 | | | | | |
| | | $d_2$ | 6.200 | $N_2$ | 1.65830 | $\nu_2$ 58.52 |
| $r_3$ | 500.000 | | | | | |
| | | $d_3$ | 0.100 | | | |
| $r_4$ | 40.639 | | | | | |
| | | $d_4$ | 6.000 | $N_3$ | 1.65830 | $\nu_3$ 58.52 |
| $r_5$ | 116.830 | | | | | |
| | | $d_5$ | 0.890-11.865-25.491 | | | |
| $r_6*$ | 99.702 | | | | | |
| | | $d_6$ | 1.300 | $N_4$ | 1.80700 | $\nu_4$ 39.71 |
| $r_7$ | 14.410 | | | | | |
| | | $d_7$ | 6.350 | | | |
| $r_8$ | −56.294 | | | | | |
| | | $d_8$ | 1.000 | $N_5$ | 1.78831 | $\nu_5$ 47.32 |
| $r_9$ | 34.875 | | | | | |
| | | $d_9$ | 0.467 | | | |
| $r_{10}$ | 25.387 | | | | | |
| | | $d_{10}$ | 5.000 | $N_6$ | 1.78472 | $\nu_6$ 25.75 |
| $r_{11}$ | −36.650 | | | | | |
| | | $d_{11}$ | 1.940 | | | |
| $r_{12}$ | −22.029 | | | | | |
| | | $d_{12}$ | 1.000 | $N_7$ | 1.71300 | $\nu_7$ 53.93 |
| $r_{13}$ | −272.972 | | | | | |
| | | $d_{13}$ | 13.389-6.197-1.000 | | | |
| $r_{14}$ | aperture | | | | | |
| | | $d_{14}$ | 1.000 | | | |
| $r_{15}$ | 25.405 | | | | | |
| | | $d_{15}$ | 2.983 | $N_8$ | 1.72000 | $\nu_8$ 50.31 |
| $r_{16}$ | −97.843 | | | | | |
| | | $d_{16}$ | 0.221 | | | |
| $r_{17}$ | 21.611 | | | | | |
| | | $d_{17}$ | 4.700 | $N_9$ | 1.56883 | $\nu_9$ 56.04 |
| $r_{18}$ | −23.000 | | | | | |
| | | $d_{18}$ | 0.200 | | | |
| $r_{19}$ | −21.351 | | | | | |
| | | $d_{19}$ | 1.970 | $N_{10}$ | 1.80741 | $\nu_{10}$ 31.59 |
| $r_{20}$ | 24.028 | | | | | |
| | | $d_{20}$ | 7.200-5.400-4.400 | | | |
| $r_{21}$ | 36.844 | | | | | |
| | | $d_{21}$ | 6.000 | $N_{11}$ | 1.61293 | $\nu_{11}$ 36.96 |
| $r_{22}$ | −18.089 | | | | | |
| | | $d_{22}$ | 1.646 | | | |
| $r_{23}*$ | −20.134 | | | | | |
| | | $d_{23}$ | 1.287 | $N_{12}$ | 1.84666 | $\nu_{12}$ 23.83 |
| $r_{24}$ | −63.953 | | | | | |

$d = 71.544-74.527-81.956$

Aspheric coefficients ($r_6$): $\epsilon = 1.0$
$A_4 = 0.52096 \times 10^{-5}$

Aspheric coefficients ($r_{23}$): $\epsilon = 1.0$
$A_4 = -0.29699 \times 10^{-4}$   $A_6 = -0.11511 \times 10^{-6}$
$A_8 = -0.41365 \times 10^{-9}$   $A_{10} = 0.28535 \times 10^{-11}$
$A_{12} = -0.20266 \times 10^{-13}$

TABLE 12

[Embodiment 12]

$f = 28.8-50.0-97.5$  $F_{NO} = 3.6-4.1-4.65$  $2\omega = 73.74°-46.73°-27.80°$

| Radius of | Axial | Refractive | Abbe |

TABLE 12-continued

[Embodiment 12]

| curvature | | distance | index (Nd) | | number (νd) |
|---|---|---|---|---|---|
| $r_1$ 121.855 | | | | | |
| | $d_1$ | 1.700 | $N_1$ | 1.84666 | $\nu_1$ 23.83 |
| $r_2$ 58.753 | | | | | |
| | $d_2$ | 6.200 | $N_2$ | 1.65830 | $\nu_2$ 58.52 |
| $r_3$ 500.000 | | | | | |
| | $d_3$ | 0.100 | | | |
| $r_4$ 40.586 | | | | | |
| | $d_4$ | 6.000 | $N_3$ | 1.65830 | $\nu_3$ 58.52 |
| $r_5$ 112.184 | | | | | |
| | $d_5$ | 0.890–11.899–26.642 | | | |
| $r_6$* 98.794 | | | | | |
| | $d_6$ | 1.300 | $N_4$ | 1.80700 | $\nu_4$ 39.71 |
| $r_7$ 14.276 | | | | | |
| | $d_7$ | 6.350 | | | |
| $r_8$ −55.998 | | | | | |
| | $d_8$ | 1.000 | $N_5$ | 1.78831 | $\nu_5$ 47.32 |
| $r_9$ 38.465 | | | | | |
| | $d_9$ | 0.467 | | | |
| $r_{10}$ 25.625 | | | | | |
| | $d_{10}$ | 5.000 | $N_6$ | 1.78472 | $\nu_6$ 25.75 |
| $r_{11}$ −36.953 | | | | | |
| | $d_{11}$ | 1.940 | | | |
| $r_{12}$ −21.855 | | | | | |
| | $d_{12}$ | 1.000 | $N_7$ | 1.71300 | $\nu_7$ 53.93 |
| $r_{13}$ −418.489 | | | | | |
| | $d_{13}$ | 12.906–6.685–1.000 | | | |
| $r_{14}$ aperture | | | | | |
| | $d_{14}$ | 1.000 | | | |
| $r_{15}$ 25.617 | | | | | |
| | $d_{15}$ | 2.983 | $N_8$ | 1.72000 | $\nu_8$ 50.31 |
| $r_{16}$ −91.302 | | | | | |
| | $d_{16}$ | 0.221 | | | |
| $r_{17}$ 21.621 | | | | | |
| | $d_{17}$ | 4.700 | $N_9$ | 1.56883 | $\nu_9$ 56.04 |
| $r_{18}$ −23.202 | | | | | |
| | $d_{18}$ | 0.200 | | | |
| $r_{19}$ −21.501 | | | | | |
| | $d_{19}$ | 1.970 | $N_{10}$ | 1.80741 | $\nu_{10}$ 31.59 |
| $r_{20}$ 23.665 | | | | | |
| | $d_{20}$ | 7.200–5.400–4.400 | | | |
| $r_{21}$ 38.681 | | | | | |
| | $d_{21}$ | 6.000 | $N_{11}$ | 1.61293 | $\nu_{11}$ 36.96 |
| $r_{22}$ −17.716 | | | | | |
| | $d_{22}$ | 1.646 | | | |
| $r_{23}$* −18.951 | | | | | |
| | $d_{23}$ | 1.287 | $N_{12}$ | 1.84666 | $\nu_{12}$ 23.83 |
| $r_{24}$ −54.161 | | | | | |
| | $d = 72.061–75.049–83.107$ | | | | |

Aspheric coefficients ($r_6$): $\epsilon = 1.0$
$A_4 = 0.54115 \times 10^{-5}$

Aspheric coefficients ($r_{23}$): $\epsilon = 1.0$
$A_4 = -0.26702 \times 10^{-4}$  $A_6 = -0.10675 \times 10^{-6}$
$A_8 = -0.38834 \times 10^{-9}$  $A_{10} = 0.24813 \times 10^{-11}$
$A_{12} = -0.18198 \times 10^{-13}$

TABLE 13

[Embodiment 13]

$f = 28.8–50.0–102.5$  $F_{NO} = 3.6–4.1–4.65$  $2\omega = 73.74°–46.73°–23.80°$

| Radius of curvature | | Axial distance | Refractive index (Nd) | | Abbe number (νd) |
|---|---|---|---|---|---|
| $r_1$ 98.236 | | | | | |
| | $d_1$ | 1.700 | $N_1$ | 1.84666 | $\nu_1$ 23.83 |
| $r_2$ 51.279 | | | | | |
| | $d_2$ | 6.200 | $N_2$ | 1.65830 | $\nu_2$ 58.52 |
| $r_3$ 500.000 | | | | | |
| | $d_3$ | 0.100 | | | |
| $r_4$ 37.048 | | | | | |
| | $d_4$ | 6.000 | $N_3$ | 1.65830 | $\nu_3$ 58.52 |
| $r_5$ 123.228 | | | | | |
| | $d_5$ | 0.890–11.456–26.459 | | | |
| $r_6$* 146.142 | | | | | |
| | $d_6$ | 1.300 | $N_4$ | 1.83400 | $\nu_4$ 37.05 |
| $r_7$ 15.206 | | | | | |
| | $d_7$ | 6.350 | | | |
| $r_8$ −38.527 | | | | | |

TABLE 13-continued

[Embodiment 13]

| | $d_8$ | 1.000 | $N_5$ | 1.80100 | $\nu_5$ 46.54 |
|---|---|---|---|---|---|
| $r_9$ 36.720 | | | | | |
| | $d_9$ | 0.467 | | | |
| $r_{10}$ 28.814 | | | | | |
| | $d_{10}$ | 5.000 | $N_6$ | 1.78472 | $\nu_6$ 25.75 |
| $r_{11}$ −28.906 | | | | | |
| | $d_{11}$ | 1.940 | | | |
| $r_{12}$ −19.264 | | | | | |
| | $d_{12}$ | 1.000 | $N_7$ | 1.71300 | $\nu_7$ 53.93 |
| $r_{13}$ −71.360 | | | | | |
| | $d_{13}$ | 13.682–7.327–1.000 | | | |
| $r_{14}$ aperture | | | | | |
| | $d_{14}$ | 1.000 | | | |
| $r_{15}$ 25.639 | | | | | |
| | $d_{15}$ | 2.983 | $N_8$ | 1.72000 | $\nu_8$ 50.31 |
| $r_{16}$ −100.284 | | | | | |
| | $d_{16}$ | 0.221 | | | |
| $r_{17}$ 21.452 | | | | | |
| | $d_{17}$ | 4.700 | $N_9$ | 1.56883 | $\nu_9$ 56.04 |
| $r_{18}$ −25.563 | | | | | |
| | $d_{18}$ | 0.200 | | | |
| $r_{19}$ −23.373 | | | | | |
| | $d_{19}$ | 1.970 | $N_{10}$ | 1.80741 | $\nu_{10}$ 31.59 |
| $r_{20}$ 24.008 | | | | | |
| | $d_{20}$ | 7.200–5.400–4.400 | | | |
| $r_{21}$ 37.497 | | | | | |
| | $d_{21}$ | 6.000 | $N_{11}$ | 1.62588 | $\nu_{11}$ 35.74 |
| $r_{22}$ −18.415 | | | | | |
| | $d_{22}$ | 1.646 | | | |
| $r_{23}$* −20.305 | | | | | |
| | $d_{23}$ | 1.287 | $N_{12}$ | 1.84666 | $\nu_{12}$ 23.83 |
| $r_{24}$ −89.575 | | | | | |
| | $d = 72.837–75.248–82.924$ | | | | |

Aspheric coefficients ($r_6$): $\epsilon = 1.0$
$A_4 = 0.68075 \times 10^{-5}$

Aspheric coefficients ($r_{23}$): $\epsilon = 1.0$
$A_4 = -0.31148 \times 10^{-4}$  $A_6 = -0.13659 \times 10^{-6}$
$A_8 = -0.36911 \times 10^{-9}$  $A_{10} = 0.40143 \times 10^{-11}$
$A_{12} = -0.27477 \times 10^{-13}$

TABLE 14

[Embodiment 14]

$f = 28.8–50.0–82.5$  $F_{NO} = 3.6–4.1–4.65$  $2\omega = 73.74°–46.73°–29.34°$

| Radius of curvature | | Axial distance | Refractive index (Nd) | | Abbe number (νd) |
|---|---|---|---|---|---|
| $r_1$ 121.604 | | | | | |
| | $d_1$ | 1.700 | $N_1$ | 1.84666 | $\nu_1$ 23.83 |
| $r_2$ 57.807 | | | | | |
| | $d_2$ | 6.200 | $N_2$ | 1.65830 | $\nu_2$ 58.52 |
| $r_3$ 500.000 | | | | | |
| | $d_3$ | 0.100 | | | |
| $r_4$ 39.207 | | | | | |
| | $d_4$ | 6.000 | $N_3$ | 1.65830 | $\nu_3$ 58.52 |
| $r_5$ 111.486 | | | | | |
| | $d_5$ | 0.890–11.186–21.512 | | | |
| $r_6$ 64.645 | | | | | |
| | $d_6$ | 1.300 | $N_4$ | 1.80700 | $\nu_4$ 39.71 |
| $r_7$* 12.916 | | | | | |
| | $d_7$ | 6.350 | | | |
| $r_8$ −50.068 | | | | | |
| | $d_8$ | 1.000 | $N_5$ | 1.78831 | $\nu_5$ 47.32 |
| $r_9$ 40.574 | | | | | |
| | $d_9$ | 0.467 | | | |
| $r_{10}$ 24.641 | | | | | |
| | $d_{10}$ | 5.000 | $N_6$ | 1.78472 | $\nu_6$ 25.75 |
| $r_{11}$ −40.745 | | | | | |
| | $d_{11}$ | 1.940 | | | |
| $r_{12}$ −27.434 | | | | | |
| | $d_{12}$ | 1.000 | $N_7$ | 1.71300 | $\nu_7$ 53.93 |
| $r_{13}$ 241.009 | | | | | |
| | $d_{13}$ | 11.244–5.179–1.000 | | | |
| $r_{14}$ aperture | | | | | |
| | $d_{14}$ | 1.000 | | | |
| $r_{15}$ 26.078 | | | | | |
| | $d_{15}$ | 2.983 | $N_8$ | 1.72000 | $\nu_8$ 50.31 |
| $r_{16}$ −109.845 | | | | | |
| | $d_{16}$ | 0.221 | | | |

TABLE 14-continued

[Embodiment 14]

| | | | | | | | |
|---|---|---|---|---|---|---|---|
| $r_{17}$ | 20.239 | | | | | | |
| | | $d_{17}$ | 4.700 | $N_9$ | 1.56883 | $\nu_9$ | 56.04 |
| $r_{18}$ | −22.533 | | | | | | |
| | | $d_{18}$ | 0.200 | | | | |
| $r_{19}$ | −21.181 | | | | | | |
| | | $d_{19}$ | 1.970 | $N_{10}$ | 1.80741 | $\nu_{10}$ | 31.59 |
| $r_{20}$ | 22.286 | | | | | | |
| | | $d_{20}$ | 7.200-5.400-4.400 | | | | |
| $r_{21}$ | 36.777 | | | | | | |
| | | $d_{21}$ | 6.000 | $N_{11}$ | 1.66998 | $\nu_{11}$ | 39.23 |
| $r_{22}$ | −19.195 | | | | | | |
| | | $d_{22}$ | 1.646 | | | | |
| $r_{23}*$ | −21.176 | | | | | | |
| | | $d_{23}$ | 1.287 | $N_{12}$ | 1.80518 | $\nu_{12}$ | 25.43 |
| $r_{24}$ | −81.979 | | | | | | |
| | | d = 70.899-72.829-77.977 | | | | | |

Aspheric coefficients ($r_7$): $\epsilon = 1.0$
$A_4 = -0.27721 \times 10^{-5}$   $A_6 = -0.17312 \times 10^{-7}$ Aspheric coefficients ($r_{23}$): $\epsilon = 1.0$
$A_4 = -0.29691 \times 10^{-4}$   $A_6 = -0.10546 \times 10^{-6}$
$A_8 = -0.31610 \times 10^{-9}$   $A_{10} = 0.34406 \times 10^{-11}$
$A_{12} = -0.17036 \times 10^{-13}$

TABLE 15

[Embodiment 15]

$f = 28.8-50.0-82.5$  $F_{NO} = 3.6-4.1-4.65$  $2\omega = 73.74°-46.73°-29.34°$

| Radius of curvature | | Axial distance | | Refractive index (Nd) | | Abbe number ($\nu$d) | |
|---|---|---|---|---|---|---|---|
| $r_1$ | 124.412 | | | | | | |
| | | $d_1$ | 1.700 | $N_1$ | 1.84666 | $\nu_1$ | 23.83 |
| $r_2$ | 56.543 | | | | | | |
| | | $d_2$ | 6.200 | $N_2$ | 1.65830 | $\nu_2$ | 58.52 |
| $r_3$ | 500.000 | | | | | | |
| | | $d_3$ | 0.100 | | | | |
| $r_4$ | 39.704 | | | | | | |
| | | $d_4$ | 6.000 | $N_3$ | 1.65830 | $\nu_3$ | 58.52 |
| $r_5$ | 121.265 | | | | | | |
| | | $d_5$ | 0.890-11.170-21.510 | | | | |
| $r_6$ | 66.307 | | | | | | |
| | | $d_6$ | 1.300 | $N_4$ | 1.80700 | $\nu_4$ | 39.71 |
| $r_7$ | 13.397 | | | | | | |
| | | $d_7$ | 6.191 | | | | |
| $r_8*$ | −55.029 | | | | | | |
| | | $d_8$ | 1.000 | $N_5$ | 1.78831 | $\nu_5$ | 47.32 |
| $r_9$ | 30.996 | | | | | | |
| | | $d_9$ | 0.422 | | | | |
| $r_{10}$ | 23.183 | | | | | | |
| | | $d_{10}$ | 5.000 | $N_6$ | 1.78472 | $\nu_6$ | 25.75 |
| $r_{11}$ | −36.546 | | | | | | |
| | | $d_{11}$ | 1.799 | | | | |
| $r_{12}$ | −24.042 | | | | | | |
| | | $d_{12}$ | 1.000 | $N_7$ | 1.71300 | $\nu_7$ | 53.93 |
| $r_{13}$ | 1055.330 | | | | | | |
| | | $d_{13}$ | 11.199-5.161-1.000 | | | | |
| $r_{14}$ | aperture | | | | | | |
| | | $d_{14}$ | 1.000 | | | | |
| $r_{15}$ | 26.071 | | | | | | |
| | | $d_{15}$ | 2.983 | $N_8$ | 1.72000 | $\nu_8$ | 50.31 |
| $r_{16}$ | −108.167 | | | | | | |
| | | $d_{16}$ | 0.221 | | | | |
| $r_{17}$ | 20.358 | | | | | | |
| | | $d_{17}$ | 4.700 | $N_9$ | 1.56883 | $\nu_9$ | 56.04 |
| $r_{18}$ | −23.232 | | | | | | |
| | | $d_{18}$ | 0.200 | | | | |
| $r_{19}$ | −21.721 | | | | | | |
| | | $d_{19}$ | 1.970 | $N_{10}$ | 1.80741 | $\nu_{10}$ | 31.59 |
| $r_{20}$ | 22.196 | | | | | | |
| | | $d_{20}$ | 7.148-5.348-4.348 | | | | |
| $r_{21}$ | 35.768 | | | | | | |
| | | $d_{21}$ | 6.000 | $N_{11}$ | 1.66998 | $\nu_{11}$ | 39.23 |
| $r_{22}$ | −19.696 | | | | | | |
| | | $d_{22}$ | 1.598 | | | | |
| $r_{23}*$ | −22.863 | | | | | | |
| | | $d_{23}$ | 1.287 | $N_{12}$ | 1.84666 | $\nu_{12}$ | 23.83 |
| $r_{24}$ | −86.324 | | | | | | |
| | | d = 69.909-72.351-77.530 | | | | | |

TABLE 15-continued

[Embodiment 15]

Aspheric coefficients ($r_8$): $\epsilon = 1.0$
$A_4 = 0.28349 \times 10^{-5}$

Aspheric coefficients ($r_{23}$): $\epsilon = 1.0$
$A_4 = -0.29400 \times 10^{-4}$   $A_6 = -0.10147 \times 10^{-6}$
$A_8 = -0.29796 \times 10^{-9}$   $A_{10} = 0.34122 \times 10^{-11}$
$A_{12} = -0.18454 \times 10^{-13}$

TABLE 16

[Embodiment 16]

$f = 28.8-50.0-82.5$  $F_{NO} = 3.6-4.1-4.65$  $2\omega = 73.74°-46.73°-29.34°$

| Radius of curvature | | Axial distance | | Refractive index (Nd) | | Abbe number ($\nu$d) | |
|---|---|---|---|---|---|---|---|
| $r_1$ | 122.265 | | | | | | |
| | | $d_1$ | 1.700 | $N_1$ | 1.84666 | $\nu_1$ | 23.83 |
| $r_2$ | 57.711 | | | | | | |
| | | $d_2$ | 6.200 | $N_2$ | 1.65830 | $\nu_2$ | 58.52 |
| $r_3$ | 500.000 | | | | | | |
| | | $d_3$ | 0.100 | | | | |
| $r_4$ | 39.414 | | | | | | |
| | | $d_4$ | 6.000 | $N_3$ | 1.65830 | $\nu_3$ | 58.52 |
| $r_5$ | 114.251 | | | | | | |
| | | $d_5$ | 0.890-11.178-21.498 | | | | |
| $r_6$ | 61.449 | | | | | | |
| | | $d_6$ | 1.300 | $N_4$ | 1.80700 | $\nu_4$ | 39.71 |
| $r_7$ | 13.165 | | | | | | |
| | | $d_7$ | 6.350 | | | | |
| $r_8$ | −49.803 | | | | | | |
| | | $d_8$ | 1.000 | $N_5$ | 1.78831 | $\nu_5$ | 47.32 |
| $r_9*$ | 34.408 | | | | | | |
| | | $d_9$ | 0.467 | | | | |
| $r_{10}$ | 24.295 | | | | | | |
| | | $d_{10}$ | 5.000 | $N_6$ | 1.78472 | $\nu_6$ | 25.75 |
| $r_{11}$ | −39.609 | | | | | | |
| | | $d_{11}$ | 1.940 | | | | |
| $r_{12}$ | −26.188 | | | | | | |
| | | $d_{12}$ | 1.000 | $N_7$ | 1.71300 | $\nu_7$ | 53.93 |
| $r_{13}$ | 774.359 | | | | | | |
| | | $d_{13}$ | 11.267-5.186-1.000 | | | | |
| $r_{14}$ | aperture | | | | | | |
| | | $d_{14}$ | 1.000 | | | | |
| $r_{15}$ | 26.037 | | | | | | |
| | | $d_{15}$ | 2.983 | $N_8$ | 1.72000 | $\nu_8$ | 50.31 |
| $r_{16}$ | −106.525 | | | | | | |
| | | $d_{16}$ | 0.221 | | | | |
| $r_{17}$ | 20.699 | | | | | | |
| | | $d_{17}$ | 4.700 | $N_9$ | 1.56883 | $\nu_9$ | 56.04 |
| $r_{18}$ | −22.164 | | | | | | |
| | | $d_{18}$ | 0.200 | | | | |
| $r_{19}$ | −20.827 | | | | | | |
| | | $d_{19}$ | 1.970 | $N_{10}$ | 1.80741 | $\nu_{10}$ | 31.59 |
| $r_{20}$ | 23.012 | | | | | | |
| | | $d_{20}$ | 7.200-5.400-4.400 | | | | |
| $r_{21}$ | 37.885 | | | | | | |
| | | $d_{21}$ | 6.000 | $N_{11}$ | 1.66998 | $\nu_{11}$ | 39.23 |
| $r_{22}$ | −19.024 | | | | | | |
| | | $d_{22}$ | 1.646 | | | | |
| $r_{23}*$ | −20.877 | | | | | | |
| | | $d_{23}$ | 1.287 | $N_{12}$ | 1.80518 | $\nu_{12}$ | 25.43 |
| $r_{24}$ | −78.598 | | | | | | |
| | | d = 70.422-72.829-77.963 | | | | | |

Aspheric coefficients ($r_9$): $\epsilon = 1.0$
$A_4 = -0.29402 \times 10^{-5}$   $A_6 = 0.15998 \times 10^{-7s}$ Aspheric coefficients ($r_{23}$): $\epsilon = 1.0$
$A_4 = -0.29608 \times 10^{-4}$   $A_6 = -0.10561 \times 10^{-6}$
$A_8 = -0.31618 \times 10^{-9}$   $A_{10} = 0.34007 \times 10^{-11}$
$A_{12} = -0.18600 \times 10^{-13}$

TABLE 17

[Embodiment 17]

$f = 28.8-50.0-82.5$  $F_{NO} = 3.6-4.1-4.65$  $2\omega = 73.74°-46.73°-29.34°$

| Radius of curvature | | Axial distance | | Refractive index (Nd) | | Abbe number ($\nu$d) | |
|---|---|---|---|---|---|---|---|
| $r_1$ | 122.332 | | | | | | |

TABLE 17-continued
[Embodiment 17]

| | | | | | | | |
|---|---|---|---|---|---|---|---|
| | | $d_1$ | 1.700 | $N_1$ | 1.84666 | $\nu_1$ | 23.83 |
| $r_2$ | 58.486 | | | | | | |
| | | $d_2$ | 6.200 | $N_2$ | 1.65830 | $\nu_2$ | 58.52 |
| $r_3$ | 500.000 | | | | | | |
| | | $d_3$ | 0.100 | | | | |
| $r_4$ | 39.454 | | | | | | |
| | | $d_4$ | 6.000 | $N_3$ | 1.65830 | $\nu_3$ | 58.52 |
| $r_5$ | 113.788 | | | | | | |
| | | $d_5$ | 0.890–11.198–21.533 | | | | |
| $r_6$ | 68.347 | | | | | | |
| | | $d_6$ | 1.300 | $N_4$ | 1.80700 | $\nu_4$ | 39.71 |
| $r_7$ | 13.216 | | | | | | |
| | | $d_7$ | 6.350 | | | | |
| $r_8$ | −54.963 | | | | | | |
| | | $d_8$ | 1.000 | $N_5$ | 1.78831 | $\nu_5$ | 47.32 |
| $r_9$ | 36.145 | | | | | | |
| | | $d_9$ | 0.467 | | | | |
| $r_{10}*$ | 25.428 | | | | | | |
| | | $d_{10}$ | 5.000 | $N_6$ | 1.78472 | $\nu_6$ | 25.75 |
| $r_{11}$ | −39.016 | | | | | | |
| | | $d_{11}$ | 1.940 | | | | |
| $r_{12}$ | −25.557 | | | | | | |
| | | $d_{12}$ | 1.000 | $N_7$ | 1.71300 | $\nu_7$ | 53.93 |
| $r_{13}$ | 1192.406 | | | | | | |
| | | $d_{13}$ | 11.302–5.201–1.000 | | | | |
| $r_{14}$ | aperture | | | | | | |
| | | $d_{14}$ | 1.000 | | | | |
| $r_{15}$ | 25.700 | | | | | | |
| | | $d_{15}$ | 2.983 | $N_8$ | 1.72000 | $\nu_8$ | 50.31 |
| $r_{16}$ | −106.164 | | | | | | |
| | | $d_{16}$ | 0.221 | | | | |
| $r_{17}$ | 21.207 | | | | | | |
| | | $d_{17}$ | 4.700 | $N_9$ | 1.56883 | $\nu_9$ | 56.04 |
| $r_{18}$ | −19.033 | | | | | | |
| | | $d_{18}$ | 0.200 | | | | |
| $r_{19}$ | −20.825 | | | | | | |
| | | $d_{19}$ | 1.970 | $N_{10}$ | 1.80741 | $\nu_{10}$ | 31.59 |
| $r_{20}$ | 23.476 | | | | | | |
| | | $d_{20}$ | 7.200–5.400–4.400 | | | | |
| $r_{21}$ | 38.321 | | | | | | |
| | | $d_{21}$ | 6.000 | $N_{11}$ | 1.66998 | $\nu_{11}$ | 39.23 |
| $r_{22}$ | −19.033 | | | | | | |
| | | $d_{22}$ | 1.646 | | | | |
| $r_{23}*$ | −20.921 | | | | | | |
| | | $d_{23}$ | 1.287 | $N_{12}$ | 1.80518 | $\nu_{12}$ | 25.43 |
| $r_{24}$ | −80.523 | | | | | | |
| | | $d = 70.458$–$72.864$–$77.998$ | | | | | |

Aspheric coefficients ($r_{10}$): $\epsilon = 1.0$
$A_4 = 0.51281 \times 10^{-5}$   $A_6 = -0.35690 \times 10^{-8}$ Aspheric coefficients ($r_{23}$): $\epsilon = 1.0$
$A_4 = -0.29836 \times 10^{-4}$   $A_6 = -0.10747 \times 10^{-6}$
$A_8 = -0.32572 \times 10^{-9}$   $A_{10} = 0.33635 \times 10^{-11}$
$A_{12} = -0.18681 \times 10^{-13}$

TABLE 18
[Embodiment 18]

$f = 28.8$–$50.0$–$82.5$   $F_{NO} = 3.6$–$4.1$–$4.65$   $2\omega = 73.74°$–$46.73°$–$29.34°$

| Radius of curvature | | Axial distance | | Refractive index (Nd) | | Abbe number ($\nu d$) | |
|---|---|---|---|---|---|---|---|
| $r_1$ | 124.364 | | | | | | |
| | | $d_1$ | 1.700 | $N_1$ | 1.84666 | $\nu_1$ | 23.83 |
| $r_2$ | 57.883 | | | | | | |
| | | $d_2$ | 6.200 | $N_2$ | 1.65830 | $\nu_2$ | 58.52 |
| $r_3$ | 500.000 | | | | | | |
| | | $d_3$ | 0.100 | | | | |
| $r_4$ | 39.913 | | | | | | |
| | | $d_4$ | 6.000 | $N_3$ | 1.65830 | $\nu_3$ | 58.52 |
| $r_5$ | 121.490 | | | | | | |
| | | $d_5$ | 0.890–11.120–21.415 | | | | |
| $r_6$ | 64.572 | | | | | | |
| | | $d_6$ | 1.300 | $N_4$ | 1.80700 | $\nu_4$ | 39.71 |
| $r_7$ | 13.511 | | | | | | |
| | | $d_7$ | 6.350 | | | | |
| $r_8$ | −62.147 | | | | | | |
| | | $d_8$ | 1.000 | $N_5$ | 1.78831 | $\nu_5$ | 47.32 |
| $r_9$ | 31.901 | | | | | | |
| | | $d_9$ | 0.467 | | | | |

TABLE 18-continued
[Embodiment 18]

| | | | | | | | |
|---|---|---|---|---|---|---|---|
| $r_{10}$ | 23.178 | | | | | | |
| | | $d_{10}$ | 5.000 | $N_6$ | 1.78472 | $\nu_6$ | 25.75 |
| $r_{11}*$ | −42.637 | | | | | | |
| | | $d_{11}$ | 1.940 | | | | |
| $r_{12}$ | −26.616 | | | | | | |
| | | $d_{12}$ | 1.000 | $N_7$ | 1.71300 | $\nu_7$ | 53.93 |
| $r_{13}$ | 220.456 | | | | | | |
| | | $d_{13}$ | 11.197–5.156–1.000 | | | | |
| $r_{14}$ | aperture | | | | | | |
| | | $d_{14}$ | 1.000 | | | | |
| $r_{15}$ | 25.405 | | | | | | |
| | | $d_{15}$ | 2.983 | $N_8$ | 1.72000 | $\nu_8$ | 50.31 |
| $r_{16}$ | −118.760 | | | | | | |
| | | $d_{16}$ | 0.221 | | | | |
| $r_{17}$ | 21.174 | | | | | | |
| | | $d_{17}$ | 4.700 | $N_9$ | 1.56883 | $\nu_9$ | 56.04 |
| $r_{18}$ | −21.794 | | | | | | |
| | | $d_{18}$ | 0.200 | | | | |
| $r_{19}$ | −20.402 | | | | | | |
| | | $d_{19}$ | 1.970 | $N_{10}$ | 1.80741 | $\nu_{10}$ | 31.59 |
| $r_{20}$ | 23.885 | | | | | | |
| | | $d_{20}$ | 7.200–5.400–4.400 | | | | |
| $r_{21}$ | 37.873 | | | | | | |
| | | $d_{21}$ | 6.000 | $N_{11}$ | 1.66998 | $\nu_{11}$ | 39.23 |
| $r_{22}$ | −18.743 | | | | | | |
| | | $d_{22}$ | 1.646 | | | | |
| $r_{23}*$ | −20.136 | | | | | | |
| | | $d_{23}$ | 1.287 | $N_{12}$ | 1.80518 | $\nu_{12}$ | 25.43 |
| $r_{24}$ | −68.920 | | | | | | |
| | | $d = 70.352$–$72.741$–$77.879$ | | | | | |

Aspheric coefficients ($r_{11}$): $\epsilon = 1.0$
$A_4 = 0.16379 \times 10^{-5}$   $A_6 = 0.26763 \times 10^{-8}$
$A_8 = 0.17684 \times 10^{-10}$ Aspheric coefficients ($r_{23}$): $\epsilon = 1.0$
$A_4 = -0.29095 \times 10^{-4}$   $A_6 = -0.10826 \times 10^{-6}$
$A_8 = -0.35103 \times 10^{-9}$   $A_{10} = 0.33120 \times 10^{-11}$
$A_{12} = -0.17227 \times 10^{-13}$

TABLE 19
[Embodiment 19]

$f = 28.8$–$50.0$–$82.5$   $F_{NO} = 3.6$–$4.1$–$4.65$   $2\omega = 73.74°$–$46.73°$–$29.34°$

| Radius of curvature | | Axial distance | | Refractive index (Nd) | | Abbe number ($\nu d$) | |
|---|---|---|---|---|---|---|---|
| $r_1$ | 124.882 | | | | | | |
| | | $d_1$ | 1.700 | $N_1$ | 1.84666 | $\nu_1$ | 23.83 |
| $r_2$ | 57.979 | | | | | | |
| | | $d_2$ | 6.200 | $N_2$ | 1.65830 | $\nu_2$ | 58.52 |
| $r_3$ | 500.000 | | | | | | |
| | | $d_3$ | 0.100 | | | | |
| $r_4$ | 40.050 | | | | | | |
| | | $d_4$ | 6.000 | $N_3$ | 1.65830 | $\nu_3$ | 58.52 |
| $r_5$ | 123.448 | | | | | | |
| | | $d_5$ | 0.890–11.088–21.361 | | | | |
| $r_6$ | 61.187 | | | | | | |
| | | $d_6$ | 1.300 | $N_4$ | 1.80700 | $\nu_4$ | 39.71 |
| $r_7$ | 13.501 | | | | | | |
| | | $d_7$ | 6.350 | | | | |
| $r_8$ | −60.770 | | | | | | |
| | | $d_8$ | 1.000 | $N_5$ | 1.78831 | $\nu_5$ | 47.32 |
| $r_9$ | 33.074 | | | | | | |
| | | $d_9$ | 0.467 | | | | |
| $r_{10}$ | 22.964 | | | | | | |
| | | $d_{10}$ | 5.000 | $N_6$ | 1.78472 | $\nu_6$ | 25.75 |
| $r_{11}$ | −43.908 | | | | | | |
| | | $d_{11}$ | 1.940 | | | | |
| $r_{12}*$ | −26.877 | | | | | | |
| | | $d_{12}$ | 1.000 | $N_7$ | 1.71300 | $\nu_7$ | 53.93 |
| $r_{13}$ | 162.807 | | | | | | |
| | | $d_{13}$ | 11.149–5.136–1.000 | | | | |
| $r_{14}$ | aperture | | | | | | |
| | | $d_{14}$ | 1.000 | | | | |
| $r_{15}$ | 25.590 | | | | | | |
| | | $d_{15}$ | 2.983 | $N_8$ | 1.72000 | $\nu_8$ | 50.31 |
| $r_{16}$ | −119.701 | | | | | | |
| | | $d_{16}$ | 0.221 | | | | |
| $r_{17}$ | 21.055 | | | | | | |
| | | $d_{17}$ | 4.700 | $N_9$ | 1.56883 | $\nu_9$ | 56.04 |

TABLE 19-continued

[Embodiment 19]

| | | | | | | | |
|---|---|---|---|---|---|---|---|
| $r_{18}$ | −21.854 | | | | | | |
| | | $d_{18}$ | 0.200 | | | | |
| $r_{19}$ | −20.449 | | | | | | |
| | | $d_{19}$ | 1.970 | $N_{10}$ 1.80741 | $\nu_{10}$ | 31.59 | |
| $r_{20}$ | 23.883 | | | | | | |
| | | $d_{20}$ | 7.200–5.400–4.400 | | | | |
| $r_{21}$ | 37.603 | | | | | | |
| | | $d_{21}$ | 6.000 | $N_{11}$ 1.66998 | $\nu_{11}$ | 39.23 | |
| $r_{22}$ | −18.790 | | | | | | |
| | | $d_{22}$ | 1.646 | | | | |
| $r_{23}^*$ | −20.206 | | | | | | |
| | | $d_{23}$ | 1.287 | $N_{12}$ 1.80518 | $\nu_{12}$ | 25.43 | |
| $r_{24}$ | −67.169 | | | | | | |
| | | $d = 70.305$–$72.689$–$77.826$ | | | | | |

Aspheric coefficients ($r_{12}$): $\epsilon = 1.0$
$A_4 = 0.5654 \times 10^{-6}$   $A_6 = -0.20767 \times 10^{-8}$
$A_8 = -0.19733 \times 10^{-10}$ Aspheric coefficients ($r_{23}$): $\epsilon = 1.0$
$A_4 = -0.28768 \times 10^{-4}$   $A_6 = -0.10685 \times 10^{-6}$
$A_8 = -0.34354 \times 10^{-9}$   $A_{10} = 0.33582 \times 10^{-11}$
$A_{12} = -0.17368 \times 10^{-13}$

TABLE 20

[Embodiment 20]

$f = 28.8$–$50.0$–$82.5$   $F_{NO} = 3.6$–$4.1$–$4.65$   $2\omega = 73.74°$–$46.73°$–$29.34°$

| | Radius of curvature | | Axial distance | Refractive index (Nd) | | Abbe number ($\nu$d) |
|---|---|---|---|---|---|---|
| $r_1$ | 123.723 | | | | | |
| | | $d_1$ | 1.700 | $N_1$ 1.84666 | $\nu_1$ | 23.83 |
| $r_2$ | 57.271 | | | | | |
| | | $d_2$ | 6.200 | $N_2$ 1.65830 | $\nu_2$ | 58.52 |
| $r_3$ | 500.000 | | | | | |
| | | $d_3$ | 0.100 | | | |
| $r_4$ | 39.787 | | | | | |
| | | $d_4$ | 6.000 | $N_3$ 1.65830 | $\nu_3$ | 58.52 |
| $r_5$ | 120.207 | | | | | |
| | | $d_5$ | 0.890–11.111–21.398 | | | |
| $r_6$ | 60.930 | | | | | |
| | | $d_6$ | 1.300 | $N_4$ 1.80700 | $\nu_4$ | 39.71 |
| $r_7$ | 13.457 | | | | | |
| | | $d_7$ | 6.350 | | | |
| $r_8$ | −58.659 | | | | | |
| | | $d_8$ | 1.000 | $N_5$ 1.78831 | $\nu_5$ | 47.32 |
| $r_9$ | 30.885 | | | | | |
| | | $d_9$ | 0.467 | | | |
| $r_{10}$ | 22.782 | | | | | |
| | | $d_{10}$ | 5.000 | $N_6$ 1.78472 | $\nu_6$ | 25.75 |
| $r_{11}$ | −42.156 | | | | | |
| | | $d_{11}$ | 1.940 | | | |
| $r_{12}$ | −26.304 | | | | | |
| | | $d_{12}$ | 1.000 | $N_7$ 1.71300 | $\nu_7$ | 53.93 |
| $r_{13}^*$ | 260.793 | | | | | |
| | | $d_{13}$ | 11.176–5.148–1.000 | | | |
| $r_{14}$ | aperture | | | | | |
| | | $d_{14}$ | 1.000 | | | |
| $r_{15}$ | 26.088 | | | | | |
| | | $d_{15}$ | 2.983 | $N_8$ 1.72000 | $\nu_8$ | 50.31 |
| $r_{16}$ | −112.075 | | | | | |
| | | $d_{16}$ | 0.221 | | | |
| $r_{17}$ | 20.640 | | | | | |
| | | $d_{17}$ | 4.700 | $N_9$ 1.56883 | $\nu_9$ | 56.04 |
| $r_{18}$ | −21.790 | | | | | |
| | | $d_{18}$ | 0.200 | | | |
| $r_{19}$ | −20.468 | | | | | |
| | | $d_{19}$ | 1.970 | $N_{10}$ 1.80741 | $\nu_{10}$ | 31.59 |
| $r_{20}$ | 23.360 | | | | | |
| | | $d_{20}$ | 7.200–5.400–4.400 | | | |
| $r_{21}$ | 37.419 | | | | | |
| | | $d_{21}$ | 6.000 | $N_{11}$ 1.66998 | $\nu_{11}$ | 39.23 |
| $r_{22}$ | −18.734 | | | | | |
| | | $d_{22}$ | 1.646 | | | |
| $r_{23}^*$ | −20.293 | | | | | |
| | | $d_{23}$ | 1.287 | $N_{12}$ 1.80518 | $\nu_{12}$ | 25.43 |
| $r_{24}$ | −70.965 | | | | | |
| | | $d = 70.331$–$72.724$–$77.863$ | | | | |

Aspheric coefficients ($r_{13}$): $\epsilon = 1.0$

TABLE 20-continued

[Embodiment 20]

$A_4 = -0.17921 \times 10^{-5}$   $A_6 = 0.19810 \times 10^{-7}$

Aspheric coefficients ($r_{23}$): $\epsilon = 1.0$
$A_4 = -0.29283 \times 10^{-4}$   $A_6 = -0.10581 \times 10^{-6}$
$A_8 = -0.32711 \times 10^{-9}$   $A_{10} = 0.34337 \times 10^{-11}$
$A_{12} = -0.18727 \times 10^{-13}$

TABLE 21

$$(|X| - |\overline{X}|)/C_0(N' - N)$$

| Height (mm) | Emb. 1 | Emb. 2 | Emb. 3 | Emb. 4 | Emb. 5 |
|---|---|---|---|---|---|
| 1 | −0.0003 | −0.0032 | 0.0033 | −0.0003 | −0.0002 |
| 2 | −0.0048 | −0.0527 | −0.0529 | −0.0042 | −0.0030 |
| 3 | −0.0247 | −0.2677 | −0.2702 | −0.0219 | −0.0662 |
| 4 | −0.0802 | −0.8518 | −0.8685 | −0.0716 | −0.0468 |
| 5 | −0.2025 | −2.0979 | −2.1758 | −0.1820 | −0.1144 |
| 6 | −0.4370 | −4.3974 | −4.6657 | −0.3951 | −0.2413 |
| 7 | −0.8476 | −8.2522 | −9.0043 | −0.7699 | −0.4624 |
| 8 | −1.5224 | −14.2915 | −16.2293 | −1.3861 | −0.8296 |
| 9 | −2.5807 | −23.2923 | −28.5338 | −2.3488 | −1.4340 |

| Height (mm) | Emb. 6 | Emb. 7 | Emb. 8 | Emb. 9 |
|---|---|---|---|---|
| 1 | −0.0008 | −0.0002 | −0.0007 | −0.0008 |
| 2 | −0.0128 | −0.0027 | −0.0117 | −0.0130 |
| 3 | −0.0662 | −0.0141 | −0.0604 | −0.0671 |
| 4 | −0.2146 | −0.0467 | −0.1965 | −0.2170 |
| 5 | −0.5410 | −0.1201 | −0.4979 | −0.5460 |
| 6 | −1.1659 | −0.2653 | −1.0805 | −1.1746 |
| 7 | −2.2580 | −0.5254 | −2.1117 | −2.2724 |
| 8 | −4.0492 | −0.9583 | −3.8300 | −4.0756 |
| 9 | −6.8577 | −1.6280 | −6.5769 | −6.9165 |

TABLE 22

$$(N' - N)\frac{d}{dy}\{x(y) - x_0(y)\}$$

| $y/y_{max}$ | Emb. 10 | Emb. 11 | Emb. 12 | Emb. 13 |
|---|---|---|---|---|
| 0.1 | $0.431 \times 10^{-4}$ | $0.471 \times 10^{-4}$ | $0.516 \times 10^{-4}$ | $0.603 \times 10^{-4}$ |
| 0.2 | $0.345 \times 10^{-3}$ | $0.377 \times 10^{-3}$ | $0.413 \times 10^{-3}$ | $0.483 \times 10^{-3}$ |
| 0.3 | $0.116 \times 10^{-2}$ | $0.127 \times 10^{-2}$ | $0.139 \times 10^{-2}$ | $0.163 \times 10^{-2}$ |
| 0.4 | $0.276 \times 10^{-2}$ | $0.302 \times 10^{-2}$ | $0.330 \times 10^{-2}$ | $0.386 \times 10^{-2}$ |
| 0.5 | $0.539 \times 10^{-2}$ | $0.589 \times 10^{-2}$ | $0.645 \times 10^{-2}$ | $0.754 \times 10^{-2}$ |
| 0.6 | $0.932 \times 10^{-2}$ | $0.102 \times 10^{-1}$ | $0.111 \times 10^{-1}$ | $0.130 \times 10^{-1}$ |
| 0.7 | $0.148 \times 10^{-1}$ | $0.162 \times 10^{-1}$ | $0.177 \times 10^{-1}$ | $0.207 \times 10^{-1}$ |
| 0.8 | $0.221 \times 10^{-1}$ | $0.241 \times 10^{-1}$ | $0.264 \times 10^{-1}$ | $0.309 \times 10^{-1}$ |
| 0.9 | $0.315 \times 10^{-1}$ | $0.344 \times 10^{-1}$ | $0.376 \times 10^{-1}$ | $0.440 \times 10^{-1}$ |
| 1.0 | $0.431 \times 10^{-1}$ | $0.471 \times 10^{-1}$ | $0.516 \times 10^{-1}$ | $0.603 \times 10^{-1}$ |

| $y/y_{max}$ | Emb. 14 | Emb. 15 | Emb. 16 | Emb. 17 |
|---|---|---|---|---|
| 0.1 | $0.102 \times 10^{-4}$ | $0.103 \times 10^{-4}$ | $0.920 \times 10^{-5}$ | $0.161 \times 10^{-4}$ |
| 0.2 | $0.838 \times 10^{-4}$ | $0.828 \times 10^{-4}$ | $0.717 \times 10^{-4}$ | $0.128 \times 10^{-3}$ |
| 0.3 | $0.297 \times 10^{-3}$ | $0.279 \times 10^{-3}$ | $0.232 \times 10^{-3}$ | $0.431 \times 10^{-3}$ |
| 0.4 | $0.749 \times 10^{-3}$ | $0.662 \times 10^{-3}$ | $0.516 \times 10^{-3}$ | $0.101 \times 10^{-2}$ |
| 0.5 | $0.158 \times 10^{-2}$ | $0.129 \times 10^{-2}$ | $0.922 \times 10^{-3}$ | $0.196 \times 10^{-2}$ |
| 0.6 | $0.297 \times 10^{-2}$ | $0.224 \times 10^{-2}$ | $0.141 \times 10^{-2}$ | $0.335 \times 10^{-2}$ |
| 0.7 | $0.517 \times 10^{-2}$ | $0.355 \times 10^{-2}$ | $0.191 \times 10^{-2}$ | $0.524 \times 10^{-2}$ |
| 0.8 | $0.850 \times 10^{-2}$ | $0.530 \times 10^{-2}$ | $0.227 \times 10^{-2}$ | $0.769 \times 10^{-2}$ |
| 0.9 | $0.134 \times 10^{-1}$ | $0.754 \times 10^{-2}$ | $0.229 \times 10^{-2}$ | $0.107 \times 10^{-1}$ |
| 1.0 | $0.203 \times 10^{-1}$ | $0.103 \times 10^{-1}$ | $0.170 \times 10^{-2}$ | $0.144 \times 10^{-1}$ |

| $y/y_{max}$ | Emb. 18 | Emb. 19 | Emb. 20 |
|---|---|---|---|
| 0.1 | $0.440 \times 10^{-5}$ | $0.117 \times 10^{-5}$ | $0.226 \times 10^{-5}$ |
| 0.2 | $0.349 \times 10^{-4}$ | $0.923 \times 10^{-5}$ | $0.175 \times 10^{-4}$ |
| 0.3 | $0.116 \times 10^{-3}$ | $0.303 \times 10^{-4}$ | $0.562 \times 10^{-4}$ |
| 0.4 | $0.271 \times 10^{-3}$ | $0.690 \times 10^{-4}$ | $0.123 \times 10^{-3}$ |
| 0.5 | $0.514 \times 10^{-3}$ | $0.126 \times 10^{-3}$ | $0.216 \times 10^{-3}$ |
| 0.6 | $0.855 \times 10^{-3}$ | $0.198 \times 10^{-3}$ | $0.321 \times 10^{-3}$ |
| 0.7 | $0.128 \times 10^{-2}$ | $0.271 \times 10^{-3}$ | $0.411 \times 10^{-3}$ |
| 0.8 | $0.177 \times 10^{-2}$ | $0.317 \times 10^{-3}$ | $0.444 \times 10^{-3}$ |
| 0.9 | $0.227 \times 10^{-2}$ | $0.290 \times 10^{-3}$ | $0.359 \times 10^{-3}$ |
| 1.0 | $0.266 \times 10^{-2}$ | $0.113 \times 10^{-3}$ | $0.733 \times 10^{-4}$ |

TABLE 23

$$(N' - N)\frac{d^2}{dy^2}\{x(y) - x_0(y)\}$$

| y/y_max | Emb. 10 | Emb. 11 | Emb. 12 | Emb. 13 |
|---|---|---|---|---|
| 0.1 | $0.908 \times 10^{-4}$ | $0.100 \times 10^{-3}$ | $0.108 \times 10^{-3}$ | $0.131 \times 10^{-3}$ |
| 0.2 | $0.363 \times 10^{-3}$ | $0.401 \times 10^{-3}$ | $0.432 \times 10^{-3}$ | $0.523 \times 10^{-3}$ |
| 0.3 | $0.817 \times 10^{-3}$ | $0.903 \times 10^{-3}$ | $0.971 \times 10^{-3}$ | $0.118 \times 10^{-3}$ |
| 0.4 | $0.145 \times 10^{-2}$ | $0.160 \times 10^{-2}$ | $0.173 \times 10^{-2}$ | $0.209 \times 10^{-2}$ |
| 0.5 | $0.227 \times 10^{-2}$ | $0.251 \times 10^{-2}$ | $0.270 \times 10^{-2}$ | $0.327 \times 10^{-2}$ |
| 0.6 | $0.327 \times 10^{-2}$ | $0.361 \times 10^{-2}$ | $0.388 \times 10^{-2}$ | $0.470 \times 10^{-2}$ |
| 0.7 | $0.445 \times 10^{-2}$ | $0.491 \times 10^{-2}$ | $0.529 \times 10^{-2}$ | $0.640 \times 10^{-2}$ |
| 0.8 | $0.581 \times 10^{-2}$ | $0.642 \times 10^{-2}$ | $0.691 \times 10^{-2}$ | $0.836 \times 10^{-2}$ |
| 0.9 | $0.736 \times 10^{-2}$ | $0.812 \times 10^{-2}$ | $0.874 \times 10^{-2}$ | $0.106 \times 10^{-2}$ |
| 1.0 | $0.908 \times 10^{-2}$ | $0.100 \times 10^{-1}$ | $0.108 \times 10^{-1}$ | $0.131 \times 10^{-1}$ |

| y/y_max | Emb. 14 | Emb. 15 | Emb. 16 | Emb. 17 |
|---|---|---|---|---|
| 0.1 | $0.295 \times 10^{-4}$ | $0.296 \times 10^{-4}$ | $0.274 \times 10^{-4}$ | $0.482 \times 10^{-4}$ |
| 0.2 | $0.124 \times 10^{-3}$ | $0.118 \times 10^{-3}$ | $0.105 \times 10^{-3}$ | $0.192 \times 10^{-3}$ |
| 0.3 | $0.301 \times 10^{-3}$ | $0.266 \times 10^{-3}$ | $0.220 \times 10^{-3}$ | $0.428 \times 10^{-3}$ |
| 0.4 | $0.590 \times 10^{-3}$ | $0.473 \times 10^{-3}$ | $0.348 \times 10^{-3}$ | $0.751 \times 10^{-3}$ |
| 0.5 | $0.103 \times 10^{-2}$ | $0.739 \times 10^{-3}$ | $0.459 \times 10^{-3}$ | $0.511 \times 10^{-2}$ |
| 0.6 | $0.168 \times 10^{-2}$ | $0.106 \times 10^{-2}$ | $0.511 \times 10^{-3}$ | $0.454 \times 10^{-2}$ |
| 0.7 | $0.260 \times 10^{-2}$ | $0.145 \times 10^{-2}$ | $0.454 \times 10^{-3}$ | $0.230 \times 10^{-2}$ |
| 0.8 | $0.387 \times 10^{-2}$ | $0.189 \times 10^{-2}$ | $0.230 \times 10^{-3}$ | $0.229 \times 10^{-2}$ |
| 0.9 | $0.557 \times 10^{-2}$ | $0.239 \times 10^{-2}$ | $-0.229 \times 10^{-3}$ | $-0.229 \times 10^{-2}$ |
| 1.0 | $0.781 \times 10^{-2}$ | $0.296 \times 10^{-2}$ | $-0.100 \times 10^{-2}$ | $-0.100 \times 10^{-2}$ |

| y/y_max | Emb. 18 | Emb. 19 | Emb. 20 |
|---|---|---|---|
| 0.1 | $0.134 \times 10^{-4}$ | $0.389 \times 10^{-5}$ | $0.881 \times 10^{-5}$ |
| 0.2 | $0.548 \times 10^{-4}$ | $0.152 \times 10^{-4}$ | $0.335 \times 10^{-4}$ |
| 0.3 | $0.121 \times 10^{-3}$ | $0.326 \times 10^{-4}$ | $0.689 \times 10^{-4}$ |
| 0.4 | $0.207 \times 10^{-3}$ | $0.535 \times 10^{-4}$ | $0.106 \times 10^{-3}$ |
| 0.5 | $0.307 \times 10^{-3}$ | $0.732 \times 10^{-4}$ | $0.134 \times 10^{-3}$ |
| 0.6 | $0.408 \times 10^{-3}$ | $0.838 \times 10^{-4}$ | $0.135 \times 10^{-3}$ |
| 0.7 | $0.492 \times 10^{-3}$ | $0.728 \times 10^{-4}$ | $0.919 \times 10^{-4}$ |
| 0.8 | $0.531 \times 10^{-3}$ | $0.216 \times 10^{-4}$ | $-0.185 \times 10^{-4}$ |
| 0.9 | $0.487 \times 10^{-3}$ | $-0.963 \times 10^{-4}$ | $-0.222 \times 10^{-3}$ |
| 1.0 | $0.308 \times 10^{-3}$ | $-0.318 \times 10^{-3}$ | $-0.549 \times 10^{-3}$ |

As can be readily appreciated, it is possible to deviate from the above embodiments of the present invention and, as will be readily understood by those skilled in the optical art, the invention is capable of many modifications and inprovements within the scope and spirit thereof. Accordingly, it will be understood that the invention is not to be limited by these specific embodiments, but only by the scope and spirit of the appended claims.

What is claimed is:

1. A zoom lens system comprising:

a first lens group having a positive refractive power;

a second lens group having a negative refractive power located at the image side of the first lens group with a first variable air space between the first and second lens groups; and a third lens group having a positive refractive power, located at the image side of the second lens group with a second variable air space between the second and third lens groups, including a positive front lens unit and a positive rear lens unit with at least one aspheric surface located at the image side of the front lens unit with a third variable air space between the front and rear lens units;

wherein the first lens group and the front and rear lens units of the third lens group are shiftable to the object side in the zooming operation from the shortest focal length to the longest focal length with changing of the first, second and third variable air spaces;

and wherein the lens system fulfills the following condition;

$$(|X| - |X_0|)/C_0(N'-N) < 0$$

wherein;

$C_0$ represents the curvature of the basic spheric surface of the aspheric surface;

N represents the refractive index of a material located at the object side of the aspheric surface;

N' represents the refractive index of a material located at the image side of the aspheric surface; and X represents the configuration of the aspheric surface in a coordinate system in a direction parallel to the optical axis of the lens system at the height Y measured from the optical axis as represented by;

$$X = X_0 + A_4 Y^4 + A_6 Y^6 + A_8 Y^8 + A_{10} Y^{10} + \cdots$$

wherein; $X_0$ represents the configuration of the based spheric surface as represented by;

$$X_0 = C_0 Y^2 / \{1 + (1 - C_0^2 Y^2)^{\frac{1}{2}}\}$$

and $A_i$ represents the aspheric coefficients, where $i = 1, 2, 3, \cdots$.

2. A zoom lens system as claimed in claim 1, wherein the lens system further fulfills the following condition;

$$0.4 < f_{3w}/f_w < 0.9$$

wherein;

$f_{3w}$ represents the focal length of the third lens group in the shortest focal length condition; and $f_w$ represents the focal length of the whole lens system in the shortest focal length condition.

3. A zoom lens system as claimed in claim 2, wherein the lens system further fulfills the following condition;

$$0.5 < f_{3W}/f_W < 0.9$$

4. A zoom lens system as claimed in claim 2, wherein the lens system further fulfills the following condition;

$$0.4 < f_{3W}/f_W < 0.75$$

5. A zoom lens system as claimed in claim 1, wherein the front lens unit of the third lens group consists of, from the object side, two positive lens components and a negative lens component, and the rear lens unit of the third lens group consists of, from the object side, a positive lens component and a negative lens component.

6. A zoom lens system as claimed in claim 1, wherein the lens system further fulfills the following condition;

$$0.01 < \Delta d_3/f_W < 0.3$$

wherein;
- $\Delta d_3$ represents the amount obtained by subtracting the axial thickness of the third lens group in the longest focal length condition from that in the shortest focal length condition; and
- $f_W$ represents the focal length of the whole lens system in the shortest focal length condition.

7. A zoom lens system as claimed in claim 6, wherein the lens system further fulfills the following condition;

$$0.02 < f_W/f_{3B} < 2.0$$

wherein;
- $f_{3B}$ represents the focal length of the rear lens unit of the third lens group.

8. A zoom lens system as claimed in claim 6, wherein the lens system further fulfills the following condition;

$$0.2 < (T_{3-B} + B_W \cdot f_W)/f_W < 1.0$$

wherein,
- $T_{3-B}$ represents the axial thickness of the rear lens unit of the third lens group; and
- $B_W$ represents the back focal length of the whole lens system in the shortest focal length condition.

9. A zoom lens system as claimed in claim 1, wherein the front and rear lens units of the third lens group are shiftable to the image side in the focusing operation to a close object, and wherein the lens system further fulfills the following condition;

$$\beta_F < -1$$

wherein;
- $\beta_F$ represents the lateral magnification of the third lens group in any focal length condition.

10. A zoom lens system as claimed in claim 9, wherein the third variable air space formed between the front and rear lens units of the third lens group is kept constant in the focusing operation.

11. A zoom lens system as claimed in claim 9, wherein the first variable air space formed between the first and second lens groups is minimum in the shortest focal length condition, and wherein the second lens group has at least one aspheric surface.

12. A zoom lens system as claimed in claim 11, wherein the lens system fulfills the following condition within a range of $0.7 y_{max} < y < 1.0 y_{max}$;

$$0 < (N' - N)\frac{d}{dy}\{x(y) - x_0(y)\} < 0.3$$

wherein;
- $y_{max}$ represents the maximum effective diameter of a lens element having the aspheric surface;
- $y$ represents the height measured from the optical axis;
- $x(y)$ represents the position of the aspheric surface at the height y; and
- $x_0$ represents the position of the basic spherical surface of the aspheric surface.

13. A zoom lens system as claimed in claim 12, wherein the lens system fulfills the following condition within a range of $y < 0.7 y_{max}$;

$$-0.02 < (N' - N)\frac{d}{dy}\{x(y) - x_0(y)\} < 0.06$$

14. A zoom lens system as claimed in claim 1, wherein the first variable air space formed between the first and second lens groups is minimum in the shortest focal length condition, and wherein the second lens group has at least one aspheric surface.

15. A zoom lens system comprising:
a first lens group having a positive refractive power;
a second lens group having a negative refractive power located at the image side of the first lens group with a first variable air space between the first and second lens groups; and
a third lens group having a positive refractive power located at the image side of the second lens group with a second variable air space between the second and third lens groups, including a front lens unit and a rear lens unit located at the image side of the front lens unit with a third variable air space between the front and rear lens units;
wherein the first lens group and the rear lens unit of the third lens group are shiftable to the object side in the zooming operation from the shortest focal length to the longest focal length with changing of the first, second and third variable air spaces, while the front and rear lens units of the third lens group are shiftable to the image side in the focusing operation to a close object in any focal length condition;
and wherein the lens system fulfills the following conditions:

$$\beta_F < -1$$

$$0.2 < (T_{3-B} + B_W - f_W)/f_W < 1.0$$

wherein,
- $\beta_F$ represents the lateral magnification of the third lens group in any focal length condition.
- $T_{3-B}$ represents the axial thickness of the rear lens unit of the third lens group;
- $B_W$ represents the back focal length of the whole lens system in the shortest focal length condition; and
- $f_W$ represents the focal length of the whole lens system in the shortest focal length condition.

16. A zoom lens system as claimed in claim 15, wherein the third variable air space formed between the front and rear lens units of the third lens group is kept constant in the focusing operation.

17. A zoom lens system as claimed in claim 15, wherein the third lens group includes at least one aspheric surface, and wherein the lens system fulfills the following condition;

$$(|X|-|X_0|)/C_0(N'-N)<0$$

wherein;

$C_0$ represents the curvature of the basic spheric surface of the aspheric surface, N represents the refractive index of a material located at the object side of the aspheric surface;

N' represents the refractive index of a material located at the image side of the aspheric surface;

X represents the configuration of the aspheric surface in a coordinate system in a direction parallel to the optical axis of the lens system at the height Y measured from the optical axis as represented by;

$$X=X_0+A_4Y^4+A_6Y^6+A_8Y^8+A_{10}Y^{10}+\cdots$$

wherein;

$X_0$ represents the configuration of the based spheric surface as represented by;

$$X_0 = C_0Y^2/\{1+(1-C_0^2Y^2)^{\frac{1}{2}}\}$$

and, $A_i$ represent the aspheric coefficients, where $i=1, 2, 3, \cdots$.

18. A zoom lens system as claimed in claim 17, wherein the lens system further fulfills the following condition;

$$0.01 < \Delta d_3/f_w < 0.3$$

wherein;

$\Delta d_3$ represents the amount obtained by subtracting the axial thickness of the third lens group in the longest focal length condition from that in the shortest focal length condition.

19. A zoom lens system as claimed in claim 15, wherein the lens system furhter fulfills the following condition;

$$0.5 < f_{3w}/f_w < 0.9$$

wherein;

$f_{3w}$ represents the focal length of the third lens group in the shortest focal length condition.

20. A zoom lens system as claimed in claim 15, wherein the rear lens unit of the third lens group has a positive refractive power with including, from the object side, a first lens component having a positive refractive power and a second lens component having a negative refractive power, and wherein the lens system further fulfills the following condition;

$$0.3 < f_{3B-1}/f_{3B} < 0.75$$

wherein;

$f_{3B-1}$ represents the focal length of the first lens component of the rear lens unit of the third lens group; and $f_{3B}$ represents the focal length of the rear lens unit of the third lens group.

21. A zoom lens system as claimed in claim 20, wherein the rear lens unit of the third lens group consists of, from the object side, a positive lens element and a negative meniscus lens element convex to the image side.

22. A zoom lens system comprising from the object side to the image side;

a first lens group having a positive refractive power;

a second lens group having a negative refractive power with having at least one aspheric surface; and a third lens group having a positive refractive power;

wherein the zooming operation is achieved so that the air space formed between the first and second lens groups is a minimum in the shortest focal length condition.

23. A zoom lens system as claimed in claim 22, wherein the lens system fulfills the following condition within a range of $0.7y_{max} < y < 1.0y_{max}$;

$$0 < (N' - N)\frac{d}{dy}\{x(y) - x_0(y)\} < 0.3$$

wherein;

$y_{max}$ represents the maximum effective diameter of a lens element having the aspheric surface;

y represents the height measured from the optical axis;

x(y) represents the position of the aspheric surface at the height y; and $x_0$ represents the position of the basic spherical surface of the aspheric surface.

24. A zoom lens system as claimed in claim 23, wherein the lens system fulfills the following condition within a range of $y < 0.7y_{max}$;

$$-0.02 < (N' - N)\frac{d}{dy}\{x(y) - x_0(y)\} < 0.06$$

25. A zoom lens system as claimed in claim 24, wherein the lens system fulfills the following condition within a range of $y < 0.7y_{max}$;

$$0 < (N' - N)\frac{d^2}{dy^2}\{x(y) - x_0(y)\}.$$

26. A zoom lens system as claimed in claim 23, wherein the lens system fulfills the following condition;

$$0.1 < h_t/h_w < 0.6$$

wherein;

$h_t$ represents the farthest position from the optical axis through which the axial ray passes on the aspheric surface in the longest focal length condition; and $h_w$ represents the farthest position from the optical axis through which the axial ray passes on the aspheric surface in the shortest focal length condition.

27. A zoom lens system as claimed in claim 23, wherein the aspheric surface is applied to a lens surface located at the object side in the second lens group.

28. A zoom lens system as claimed in claim 23, wherein the lens system fulfills the following conditions;

$$0 < f_w/r_{2\text{-}1} < 1.0$$

$$0.3 < |f_{2\text{-}1}|/f_w < 1.0$$

wherein;

$r_{2\text{-}I}$ represents the paraxial radius of curvature of the lens surface located at the object side in the second lens group;

$f_{2\text{-}I}$ represents the paraxial focal length of the lens surface located at the object side in the second lens group; and $f_w$ represent the focal length of the whole lens system in the shortest focal length condition.

29. A zoom lens system according to the following design parameters;

| $f = 36.0$–$60.0$–$102.0$ $F_{NO} = 3.6$–$4.2$–$4.65$ $2\omega = 61.93°$–$39.60°$–$23.91°$ | | | |
|---|---|---|---|
| Radius of curvature | Axial distance | Refractive index (Nd) | Abbe number ($\nu$d) |
| $r_1$ 120.926 | | | |
| | $d_1$ 2.200 | $N_1$ 1.84666 | $\nu_1$ 23.83 |
| $r_2$ 44.896 | | | |
| | $d_2$ 7.150 | $N_2$ 1.67000 | $\nu_2$ 57.07 |
| $r_3$ $-326.540$ | | | |
| | $d_3$ 0.100 | | |
| $r_4$ 29.132 | | | |
| | $d_4$ 3.250 | $N_3$ 1.69680 | $\nu_3$ 56.47 |
| $r_5$ 50.276 | | | |
| | $d_5$ 0.900–9.586–17.809 | | |
| $r_6$ 66.325 | | | |
| | $d_6$ 1.200 | $N_4$ 1.77250 | $\nu_4$ 49.77 |
| $r_7$ 14.430 | | | |
| | $d_7$ 3.950 | | |
| $r_8$ $-1357.755$ | | | |
| | $d_8$ 1.150 | $N_5$ 1.67000 | $\nu_5$ 57.07 |
| $r_9$ 34.737 | | | |
| | $d_9$ 0.300 | | |
| $r_{10}$ 19.885 | | | |
| | $d_{10}$ 2.680 | $N_6$ 1.84666 | $\nu_6$ 23.83 |
| | $d_{11}$ 1.620 | | |
| $r_{12}$ $-29.666$ | | | |
| | $d_{12}$ 1.150 | $N_7$ 1.61800 | $\nu_7$ 63.39 |
| $r_{13}$ 79.294 | | | |
| | $d_{13}$ 5.505–8.926–2.360 | | |
| $r_{14}$ 24.547 | | | |
| | $d_{14}$ 3.150 | $N_8$ 1.67000 | $\nu_8$ 57.07 |
| $r_{15}$ $-71.330$ | | | |
| | $d_{15}$ 0.150 | | |
| $r_{16}$ 36.161 | | | |
| | $d_{16}$ 6.000 | $N_9$ 1.51680 | $\nu_9$ 64.20 |
| $r_{17}$ $-15.061$ | | | |
| | $d_{17}$ 2.500 | $N_{10}$ 1.80741 | $\nu_{10}$ 31.59 |
| $r_{18}$ 87.398 | | | |
| | $d_{18}$ 4.673–2.566–0.909 | | |
| $r_{19}$ 59.168 | | | |
| | $d_{19}$ 3.000 | $N_{11}$ 1.72000 | $\nu_{11}$ 42.02 |
| $r_{20}$ $-22.059$ | | | |
| | $d_{20}$ 3.605 | | |
| $r_{21}$* $-25.806$ | | | |
| | $d_{21}$ 0.035 | $N_{12}$ 1.51790 | $\nu_{12}$ 52.31 |
| $r_{22}$ $-22.822$ | | | |
| | $d_{22}$ 1.800 | $N_{13}$ 1.80500 | $\nu_{13}$ 40.97 |
| $r_{23}$ 503.492 | | | |

| Aspheric coefficients ($r_{21}$): | |
|---|---|
| $A_4 = -0.66020 \times 10^{-4}$ | $A_6 = -0.52200 \times 10^{-7}$ |
| $A_8 = -0.64384 \times 10^{-8}$ | $A_{10} = -0.11612 \times 10^{-9}$ |
| $A_{12} = -0.84797 \times 10^{-12}$ | |

30. In an improved zoom lens system having a first positive lens group, a second negative lens group with a first variable air space between said first and second lens groups, and a third positive lens group with a second variable air space between said second and third lens groups, said third lens group having a front lens unit and rear lens unit with a third variable air space therebetween, wherein the improvement comprises:
   means for shifting said front and rear lens units together with said first lens group in a zooming operation, and for shifting said front and rear lens units in a focusing operation; and
   an aspheric surface on said rear lens unit.

31. The improvement according to claim 30 further including an aspheric surface on said second lens group.

32. The improvement according to claim 31 wherein said front and rear lens units can be shifted in the same direction.

* * * * *

UNITED STATES PATENT AND TRADEMARK OFFICE
CERTIFICATE OF CORRECTION

PATENT NO.    : 4,871,239
DATED         : October 3, 1989
INVENTOR(S)   : Hisayuki Masumoto et al.

It is certified that error appears in the above-identified patent and that said Letters Patent is hereby corrected as shown below:

Title page,
Item [57], ABSTRACT,
Line 2, after "comprising", delete ";".

Figure 2:
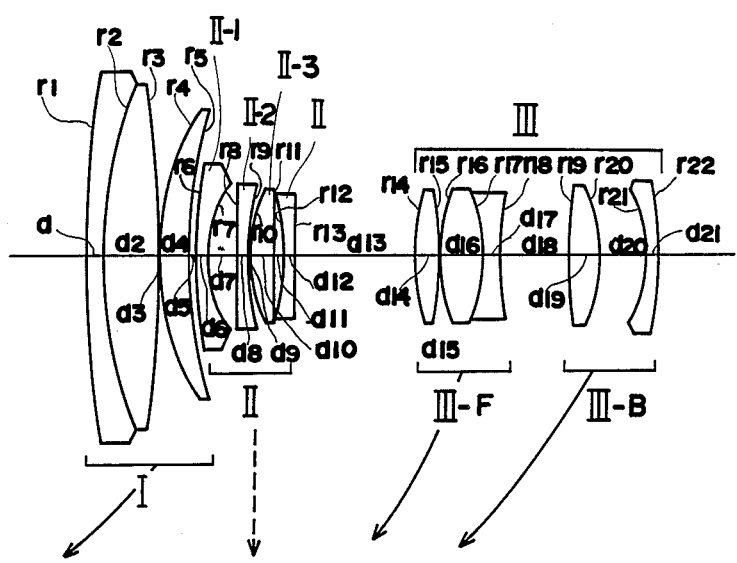
FIG. 2 represents a cross sectional view of the lens system according to a second embodiment of the present invention in the shortest focal length condition.
Figure 3:
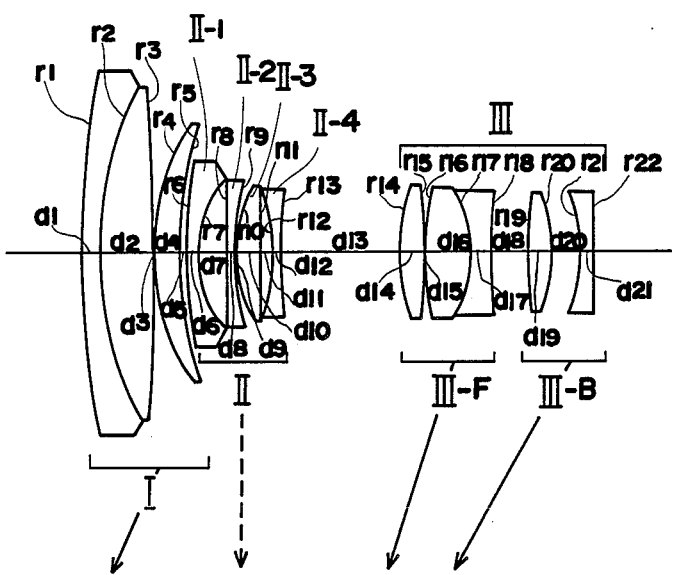
FIG. 3 represents a cross sectional view of the lens system according to a third embodiment of the present invention in the shortest focal length condition.

Drawings,
Sheet 1, delete FIG. 2 in its entirety.
Sheet 3, delete FIGS. 4 and 5 in their entirety.
Sheet 4, delete FIGS. 6 and 7 in their entirety.
Sheet 5, delete FIG. 8 in its entirety.
Sheet 7, delete FIG. 13 in its entirety.
Sheet 9, delete FIG. 17 in its entirety.
Sheet 10, delete FIG. 18 in its entirety.
Sheet 13, delete FIGS. 24a through 26c in their entirety.
Sheet 15, delete FIGS. 30a through 32c in their entirety.
Sheet 16, delete FIGS. 33a through 35c in their entirety.
Sheet 17, delete FIGS. 36a through 38c in their entirety.
Sheet 18, delete FIGS. 39a through 41c in their entirety.
Sheet 19, delete FIGS. 42a through 44c in their entirety.
Sheet 20, delete FIGS. 45a through 47c in their entirety.
Sheet 21, delete FIGS. 48a through 50c in their entirety.
Sheet 22, delete FIGS. 51a through 53c in their entirety.
Sheet 23, delete FIGS. 54a through 56c in their entirety.
Sheet 24, delete FIGS. 57a through 59c in their entirety.
Sheet 30, delete FIGS. 75a through 77c in their entirety.
Sheet 34, delete FIGS. 87a through 89c in their entirety.
Sheet 35, delete FIGS. 90a through 92c in their entirety.

Column 1,
Line 17, delete "has" and insert -- have --.
Line 37, delete "can not" and insert -- cannot --.

Column 2,
Line 9, after "Further", insert -- , --.
Line 13, after "comprises", delete ",".
Line 33, after "condition", delete ";" and insert -- : --.
Line 38, after "wherein", delete ",".
Line 46, after "by", delete ";", and insert -- : --.
Line 52, after "by", delete ";", and insert -- : --.

UNITED STATES PATENT AND TRADEMARK OFFICE
CERTIFICATE OF CORRECTION

PATENT NO. : 4,871,239
DATED : October 3, 1989
INVENTOR(S) : Hisayuki Masumoto et al.

Figure 4:
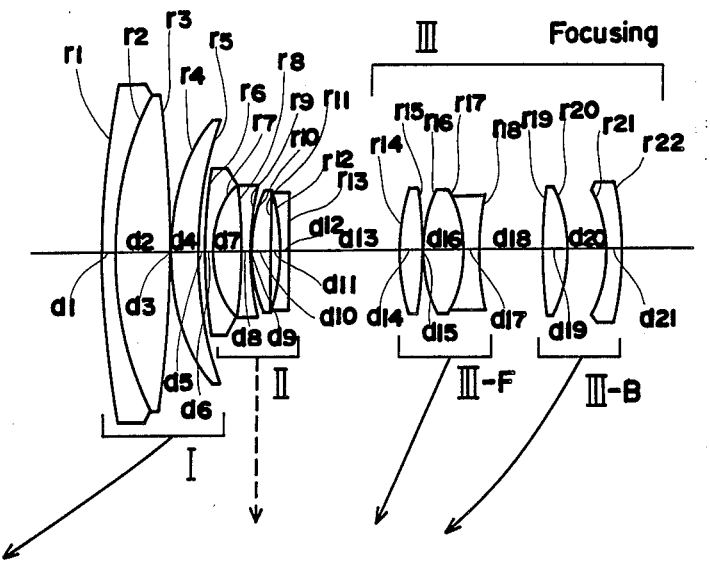
FIG. 4 represents a cross sectional view of the lens system according to a fourth embodiment of the present invention in the shortest focal length condition.
Figure 5:
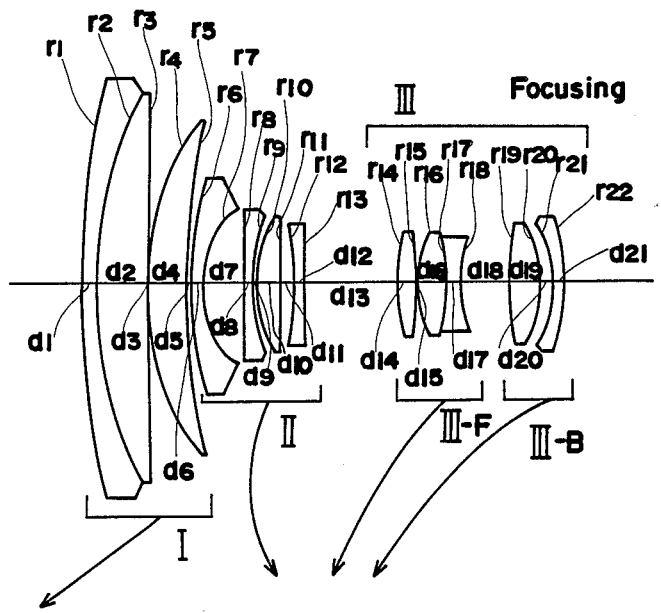
FIG. 5 represents a cross sectional view of the lens system according to a fifth embodiment of the present invention in the shortest focal length condition.
Figure 6:
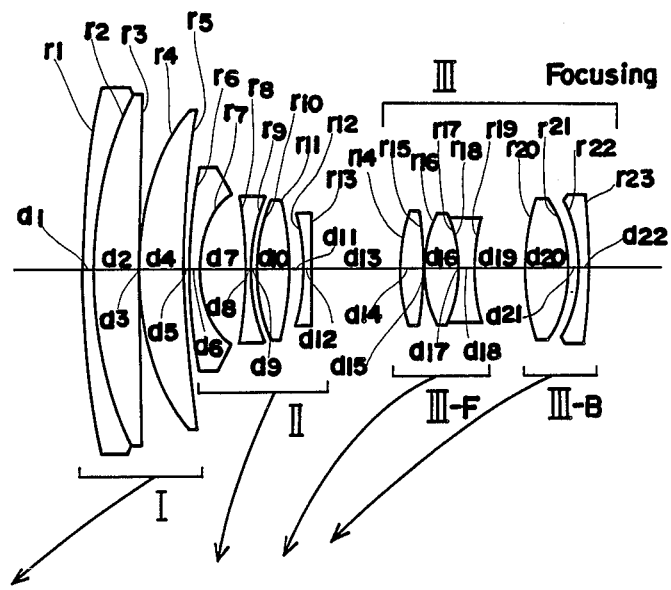
FIG. 6 represents a cross sectional view of the lens system according to a sixth embodiment of the present invention in the shortest focal length condition.
Figure 7:
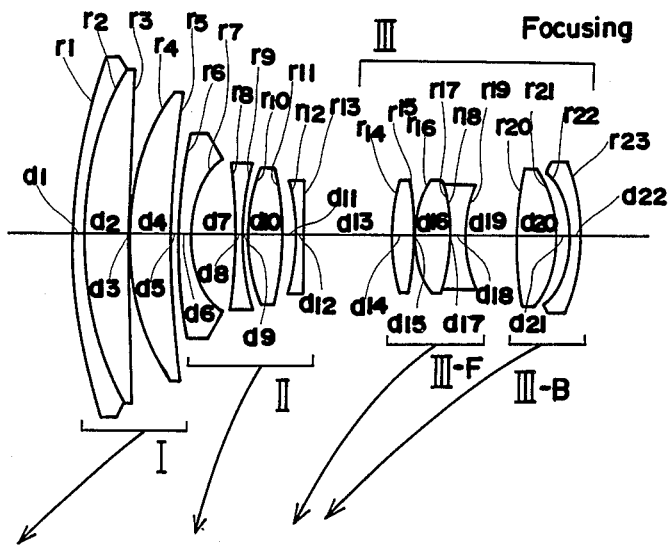
FIG. 7 represents a cross sectional view of the lens system according to a seventh embodiment of the present invention in the shortest focal length condition.
Figure 8:
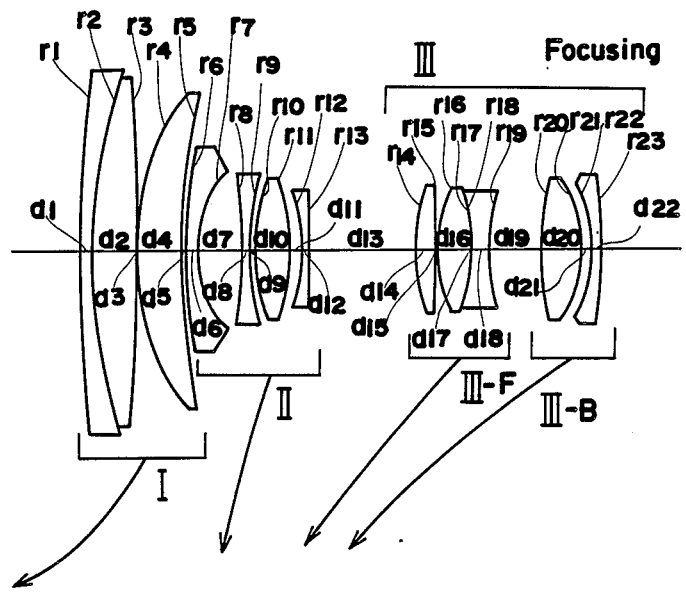
FIG. 8 represents a cross sectional view of the lens system according to an eighth embodiment of the present invention in the shortest focal length condition.
Figure 9:
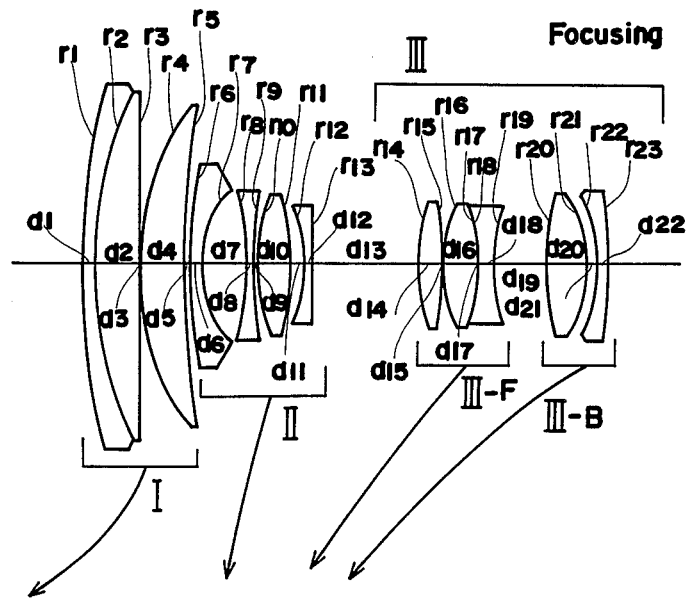
FIG. 9 represents a cross sectional view of the lens system according to a ninth embodiment of the present invention in the shortest focal length condition.
Figure 10:
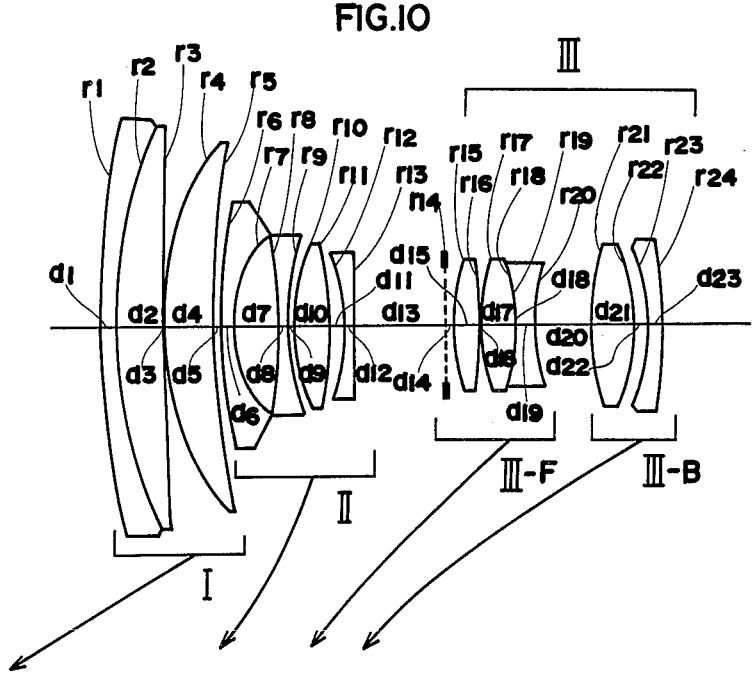
FIG. 10 represents a cross sectional view of the lens system according to a tenth embodiment of the present invention in the shortest focal length condition.
Figure 11:
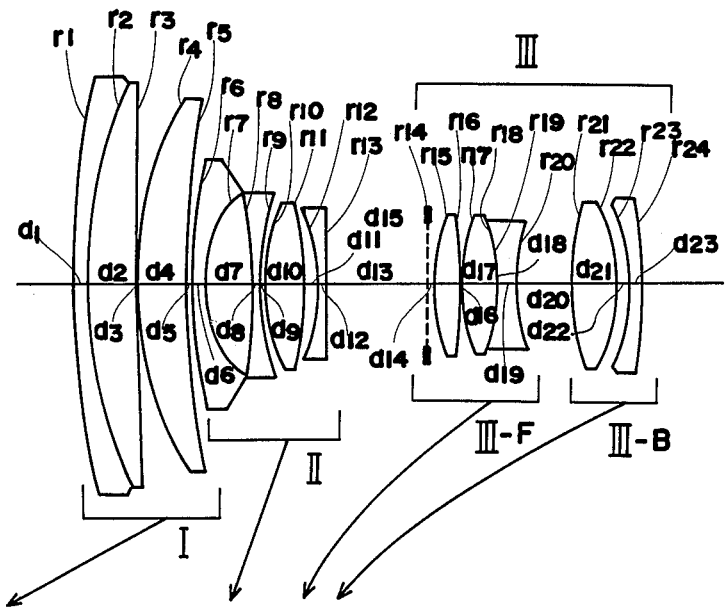
FIG. 11 represents a cross sectional view of the lens system according to an eleventh embodiment of the present invention in the shortest focal length condition.
Figure 12:
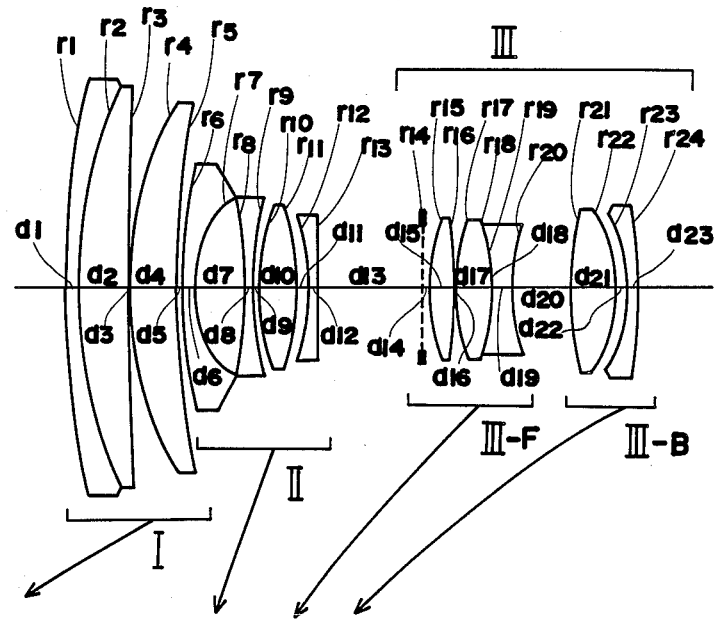
FIG. 12 represents a cross sectional view of the lens system according to a twelfth embodiment of the present invention in the shortest focal length condition.

It is certified that error appears in the above-identified patent and that said Letters Patent is hereby corrected as shown below:

Column 3,
Line 9, after "condition", delete ";", and insert -- : --.
Line 13, after "wherein", delete ";" and insert -- : --.
Line 13, delete "$T_3\_B$", and insert -- $T_{3\text{-}B}$ --.
Line 20, after "comprises", insert -- , --.
Line 21, after "side", delete ";" and insert -- , --.
Lines 41 through 43, delete "FIG. 2 represents a cross sectional view of the lens system according to a second embodiment of the present invention in the shortest focal length condition;".
Lines 48 through 50, delete "FIG. 4 represents a cross sectional view of the lens system according to a fourth embodiment of the present invention in the shortest focal length condition;".
Lines 51 through 53, delete "FIG. 5 represents a cross sectional view of the lens system according to a fifth embodiment of the present invention in the shortest focal length condition;".
Lines 54 through 56, delete "FIG. 6 represents a cross sectional view of the lens system according to a sixth embodiment of the present invention in the shortest focal length condition;".
Lines 57 through 59, delete "FIG. 7 represents a cross sectional view of the lens system according to a seventh embodiment of the present invention in the shortest focal length condition;".
Lines 60 through 62, delete "FIG. 8 represents a cross sectional view of the lens system according to an eighth embodiment of the present invention in the shortest focal length condition;".

Figure 13:
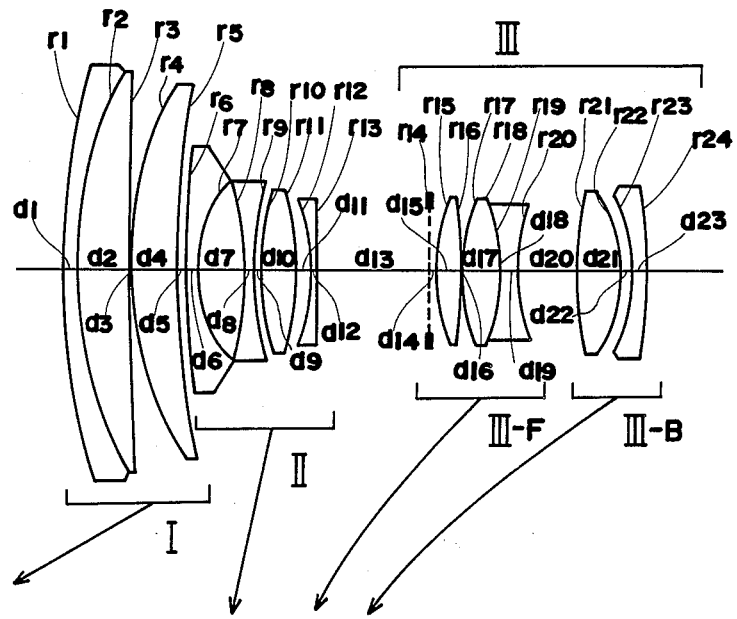
FIG. 13 represents a cross sectional view of the lens system according to a thirteenth embodiment of the present invention in the shortest focal length condition.
Figure 14:
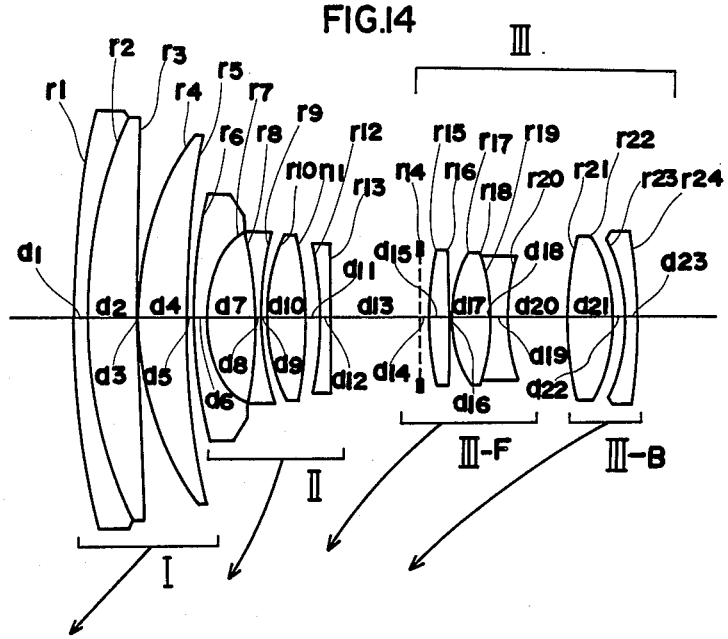
FIG. 14 represents a cross sectional view of the lens system according to a fourteenth embodiment of the present invention in the shortest focal length condition.
Figure 15:
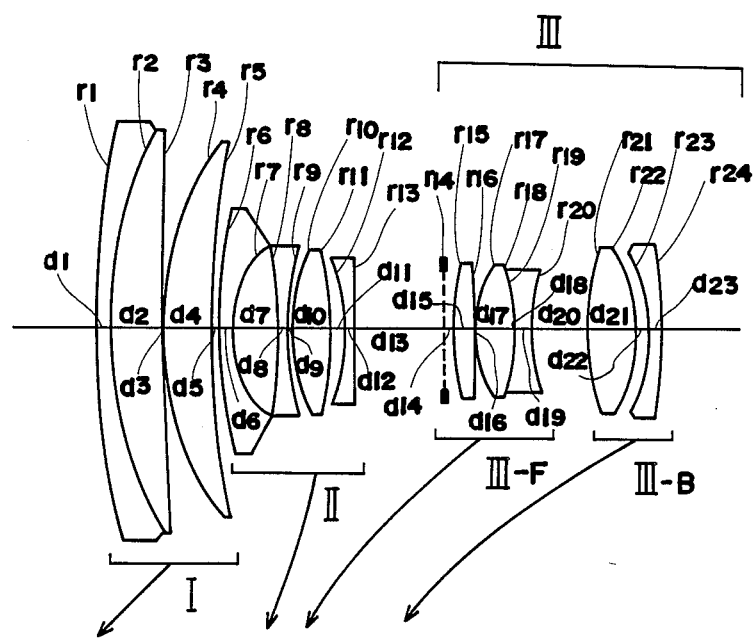
FIG. 15 represents a cross sectional view of the lens system according to a fifteenth embodiment of the present invention in the shortest focal length condition.
Figure 16:
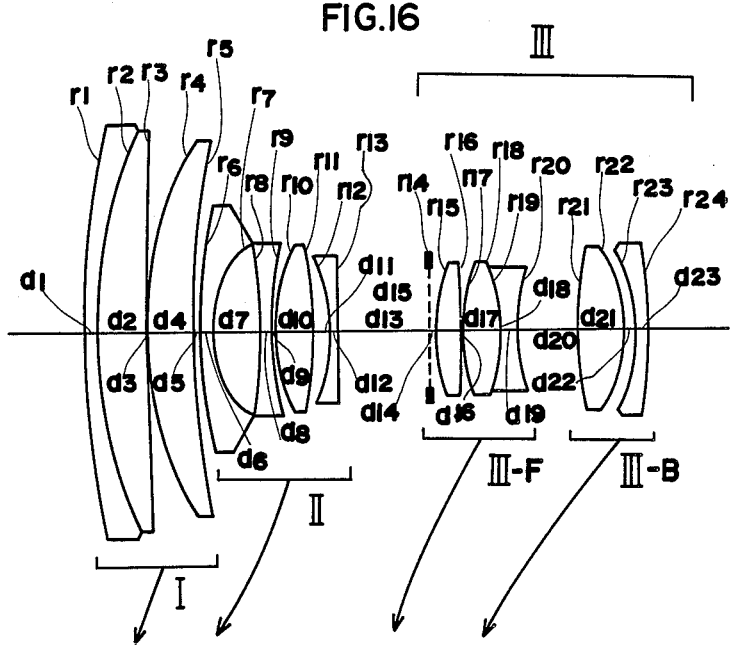
FIG. 16 represents a cross sectional view of the lens system according to a sixteenth embodiment of the present invention in the shortest focal length condition.
Figure 17:
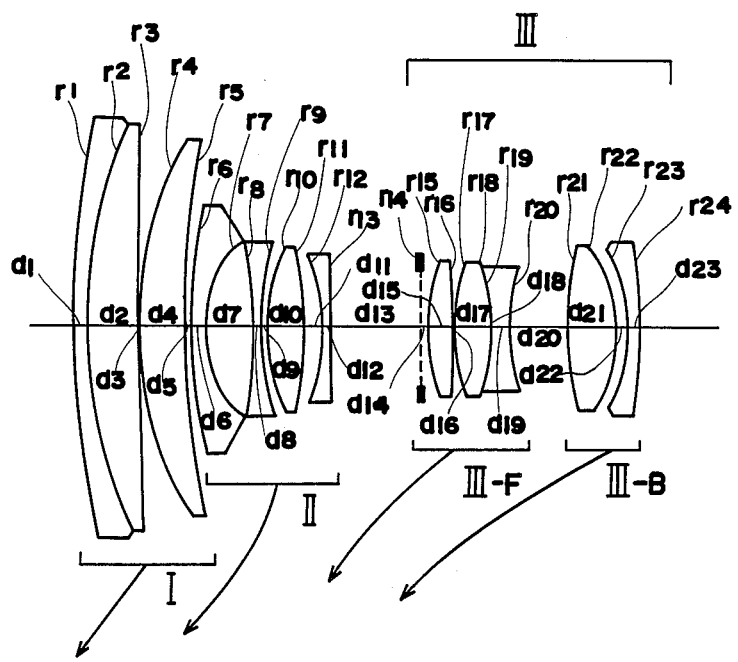
FIG. 17 represents a cross sectional view of the lens system according to a seventeenth embodiment of the present invention in the shortest focal length condition.
Figure 18:
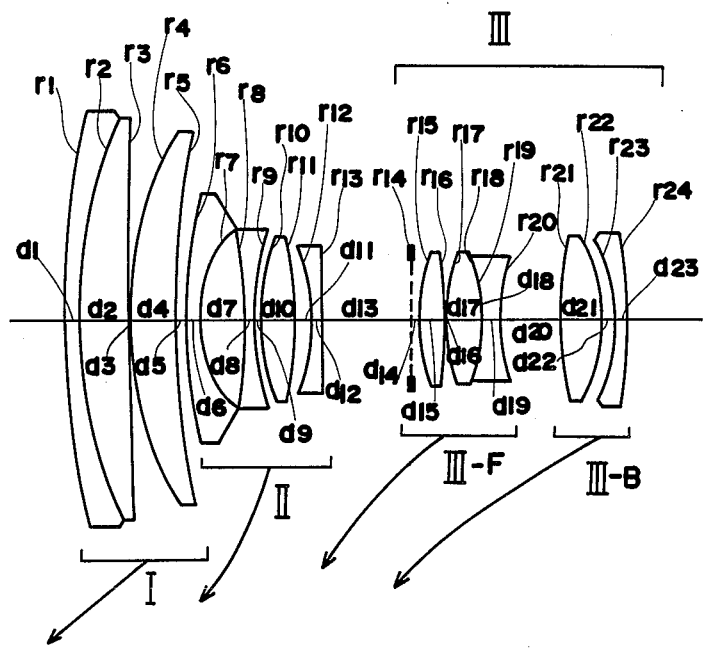
FIG. 18 represents a cross sectional view of the lens system according to an eighteenth embodiment of the present invention in the shortest focal length condition.
Figure 19:
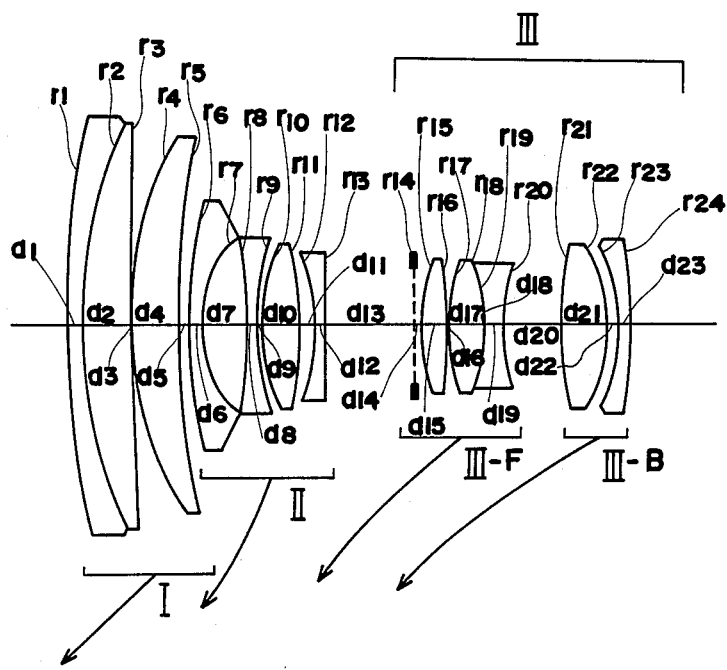
FIG. 19 represents a cross sectional view of the lens system according to a nineteenth embodiment of the present invention in the shortest focal length condition.
Figure 20:
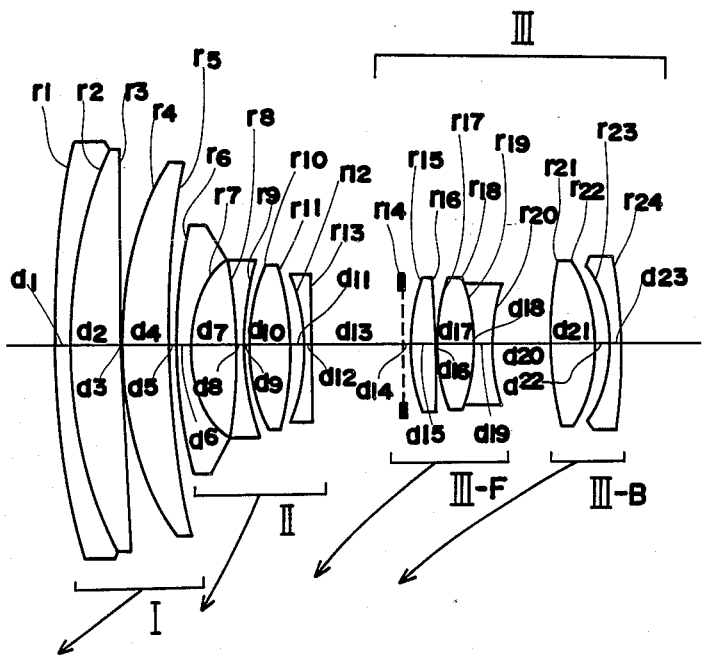
FIG. 20 represents a cross sectional view of the lens system according to a twentieth embodiment of the present invention in the shortest focal length condition.
Figure 24A:
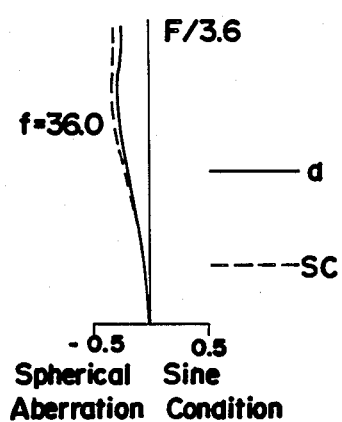
FIGS. 24a to 24c represent the aberration curves of the second embodiment for the shortest focal length in the infinity focusing condition.
Figure 24B:
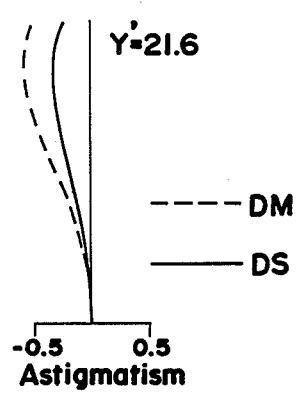
Figure 24C:
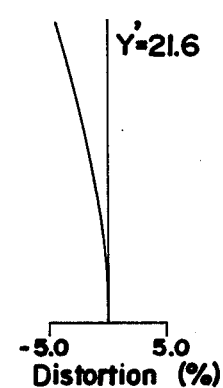

Column 4,
Lines 7 through 9, delete "FIG. 13 represents a cross sectional view of the lens system according to a thirteenth embodiment of the present invention in the shortest focal length condition;".
Lines 19 through 21, delete "FIG. 17 represents a cross sectional view of the lens system according to a seventeenth embodiment of the present invention in the shortest focal length condition;".
Lines 22 through 24, delete "FIG. 18 represents a cross sectional view of the lens system according to an eighteenth embodiment of the present invention in the shortest focal length condition;".
Lines 40 through 42, delete "FIGS. 24a to 24c represent the aberration curves of the second embodiment for the shortest focal length in the infinity focusing condition;".

UNITED STATES PATENT AND TRADEMARK OFFICE
CERTIFICATE OF CORRECTION

PATENT NO. : 4,871,239
DATED : October 3, 1989
INVENTOR(S) : Hisayuki Masumoto et al.

Figure 25A:
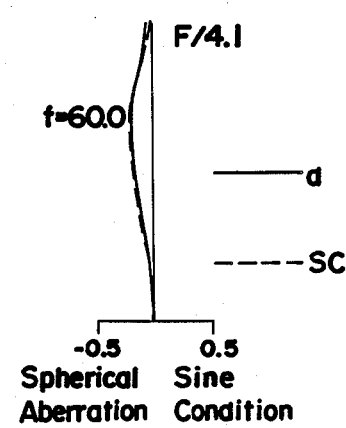
FIGS. 25a to 25c represent the aberration curves of the second embodiment for a medium focal length condition in the infinity focusing condition.
Figure 25B:
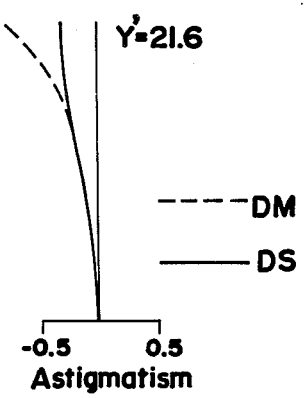
Figure 25C:
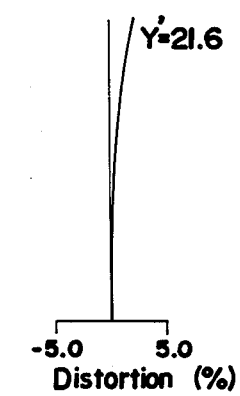
Figure 26A:
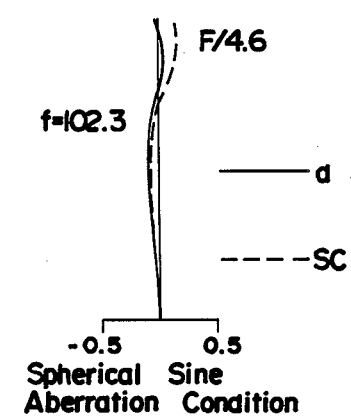
FIGS. 26a to 26c represent the aberration curves of the second embodiment for the longest focal length in the infinity focusing condition.
Figure 26B:
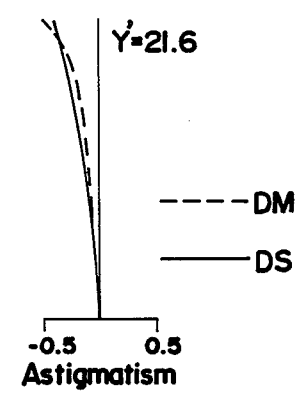
Figure 26C:
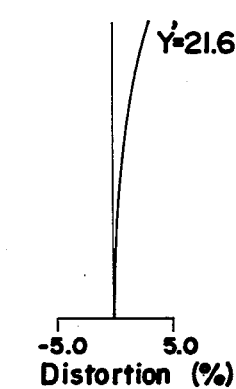
Figure 27A:
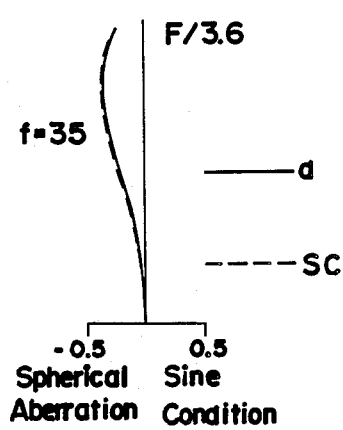
Figure 27B:
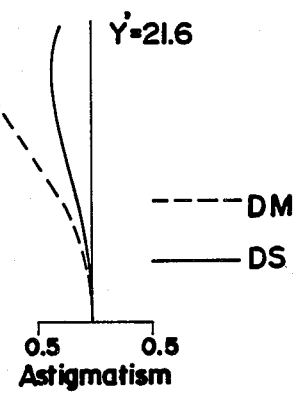
Figure 27C:
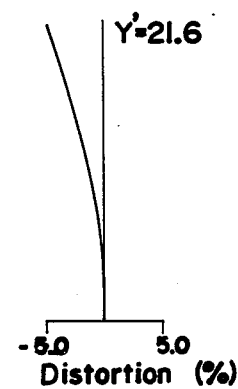
Figure 28A:
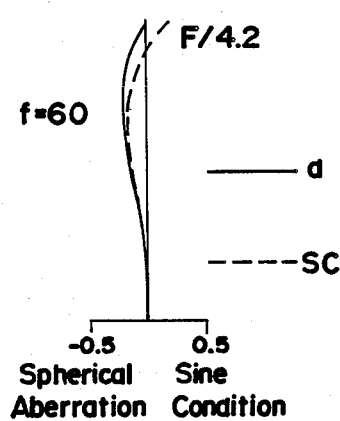
FIGS. 28a to 28c represent the aberration curves of the third embodiment for a medium focal length condition in the infinity focusing condition.
Figure 28B:
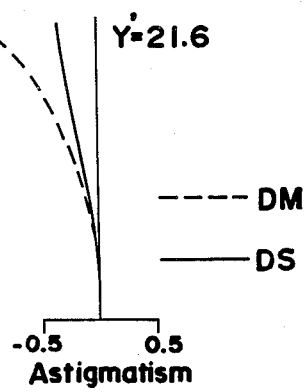
Figure 28C:
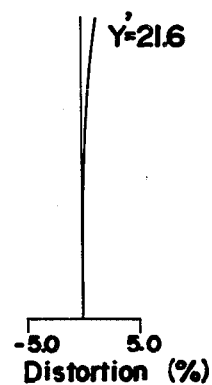
Figure 29A:
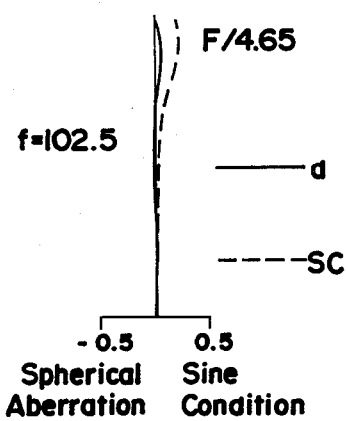
FIGS. 29a to 29c represent the aberration curves of the third embodiment for the longest focal length in the infinity focusing condition.
Figure 29B:
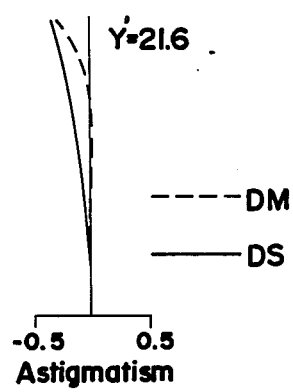
Figure 29C:
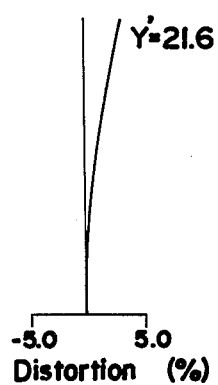
Figure 30A:
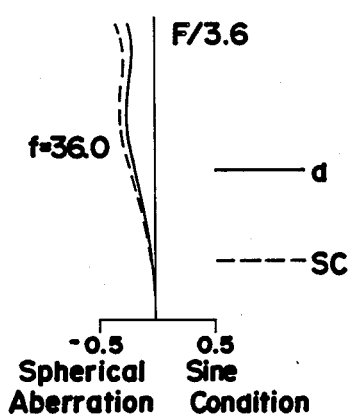
FIGS. 30a to 30c represent the aberration curves of the fourth embodiment for the shortest focal length in the infinity focusing condition.
Figure 30B:
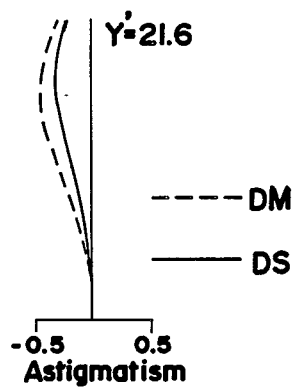
Figure 30C:
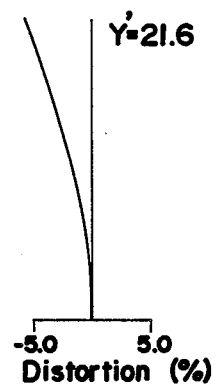
Figure 31A:
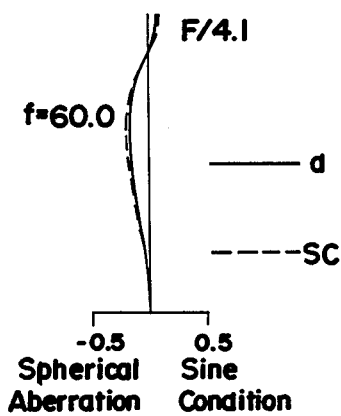
FIGS. 31a to 31c represent the aberration curves of the fourth embodiment for a medium focal length condition in the infinity focusing condition.
Figure 31B:
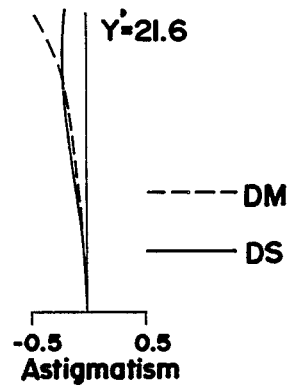
Figure 31C:
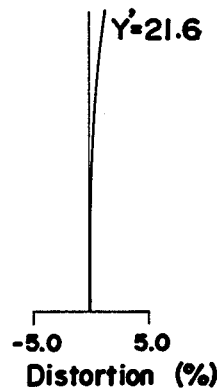
Figure 32A:
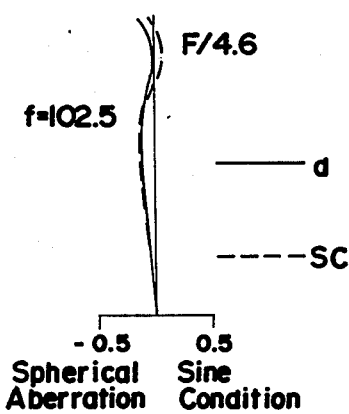
FIGS. 32a to 32c represent the aberration curves of the fourth embodiment for the longest focal length in the infinity focusing condition.
Figure 32B:
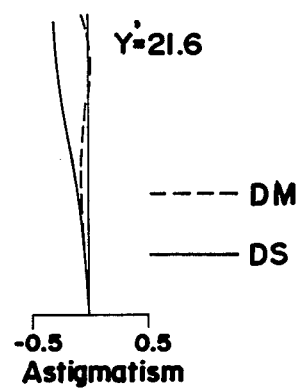
Figure 32C:
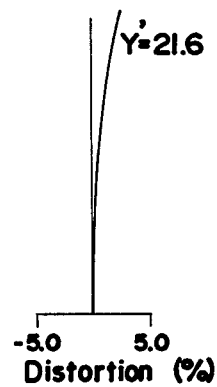

It is certified that error appears in the above-identified patent and that said Letters Patent is hereby corrected as shown below:

Column 4 cont'd,
Lines 43 through 45, delete "FIGS. 25a to 25c represent the aberration curves of the second embodiment for a medium focal length in the infinity focusing condition;".
Lines 46 through 48, delete "FIGS. 26a to 26c represent the aberration curves of the second embodiment for the longest focal length in the infinity focusing condition;".
Line 49, delete "21c", and insert -- 27c --.
Lines 58 through 60, delete "FIGS. 30a to 30c represent the aberration curves of the fourth embodiment for the shortest focal length in the infinity focusing condition;".
Lines 61 through 63, delete "FIGS. 31a to 31c represent the aberration curves of the fourth embodiment for a medium focal length in the infinity focusing condition;".
Lines 64 through 66, delete "FIGS. 32a to 32c represent the aberration curves of the fourth embodiment for the longest focal length in the infinity focusing condition;".
Lines 67 and 68, delete "FIGS. 33a to 33c represent the aberration curves of the fourth embodiment for the shortest focal length in".

Figure 39A:
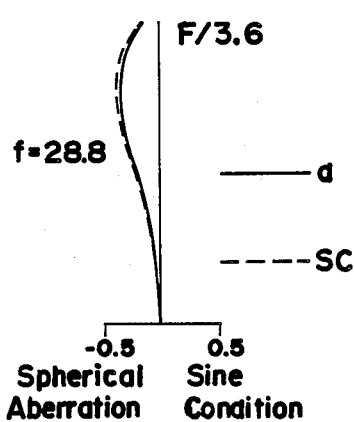
FIGS. 39a to 39c represent the aberration curves of the fifth embodiment for the shortest focal length in the focusing condition in which the lens system is focused to an object located at a distance of 35 times of the shortest focal length.
Figure 39B:
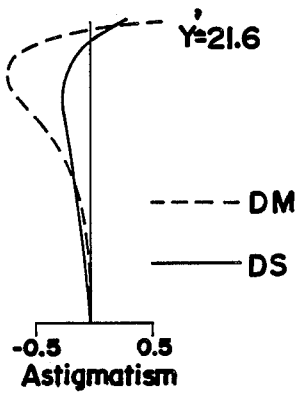
Figure 39C:
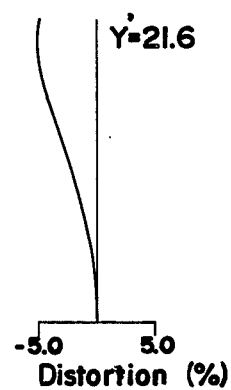

Column 5,
Lines 1 through 3, delete "the focusing condition in which the lens system is focused to an object located at a distance of 35 times of the shortest focal length;".
Lines 4 through 8, delete "FIGS. 34a to 34c represent the aberration curves of the fourth embodiment for the medium focal length in the focusing condition in which the lens system is focused to an object located at a distance of 35 times of the shortest focal length;".
Lines 9 through 13, delete "FIGS. 35a to 35c represent the aberration curves of the fourth embodiment for the longest focal length in the focusing condition in which the lens system is focused to an object located at a distance of 35 times of the shortest focal length;".
Lines 14 through 16, delete "FIGS. 36a to 36c represent the aberration curves of the fifth embodiment for the shortest focal length in the infinity focusing condition;".
Lines 17 through 19, delete "FIGS. 37a to 37c represent the aberration curves of the fifth embodiment for a medium focal length condition in the infinity focusing condition;".
Lines 20 through 22, delete "FIGS. 38a to 38c represent the aberration curves of the fifth embodiment for the longest focal length in the infinity focusing condition;".
Lines 23 through 27, delete "FIGS. 39a to 39c represent the aberration curves of the fifth embodiment for the shortest focal length in the focusing condition in which the lens system is focused to an object located at a distance of 35 times of the shortest focal length;".

UNITED STATES PATENT AND TRADEMARK OFFICE
CERTIFICATE OF CORRECTION

PATENT NO. : 4,871,239
DATED : October 3, 1989
INVENTOR(S) : Hisayuki Masumoto et al.

Figure 40A:
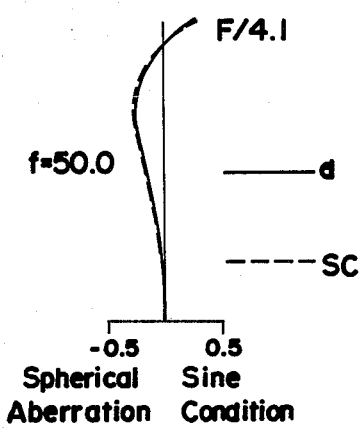
FIGS. 40a to 40c represent the aberration curves of the fifth embodiment for the medium focal length in the focusing condition in which the lens system is focused to an object located at a distance of 35 times of the shortest focal length.
Figure 40B:
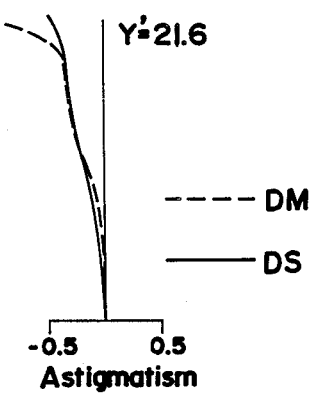
Figure 40C:
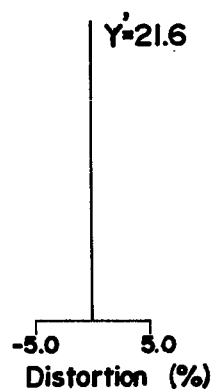
Figure 41A:
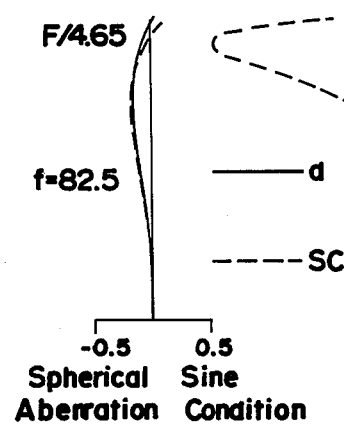
FIGS. 41a to 41c represent the aberration curves of the fifth embodiment for the longest focal length in the focusing condition in which the lens system is focused to an object located at a distance of 35 times of the shortest focal length.
Figure 41B:
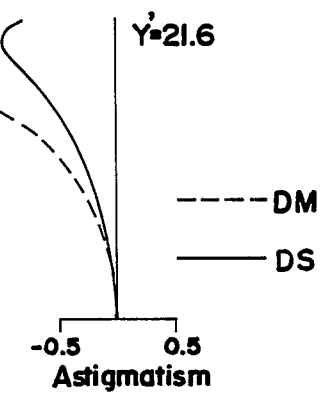
Figure 41C:
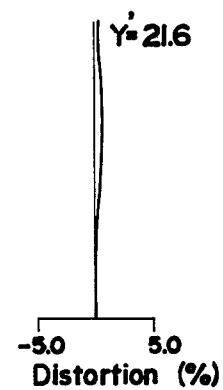
Figure 42A:
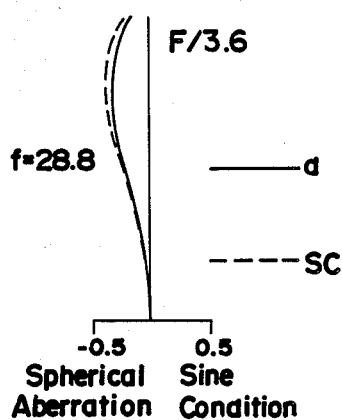
FIGS. 42a to 42c represent the aberration curves of the sixth embodiment for the shortest focal length in the infinity focusing condition.
Figure 42B:
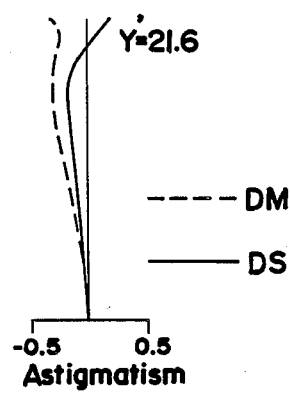
Figure 42C:
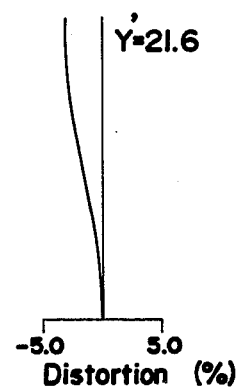
Figure 43A:
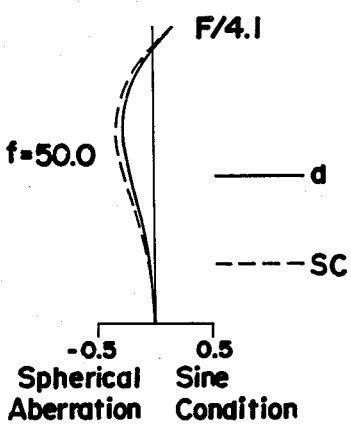
FIGS. 43a to 43c represent the aberration curves of the sixth embodiment for a medium focal length condition in the infinity focusing condition.
Figure 43B:
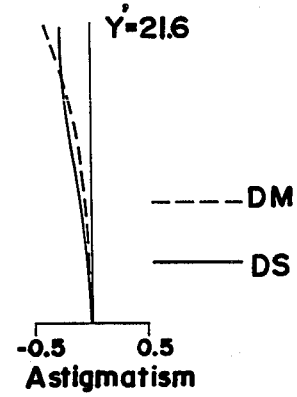
Figure 43C:
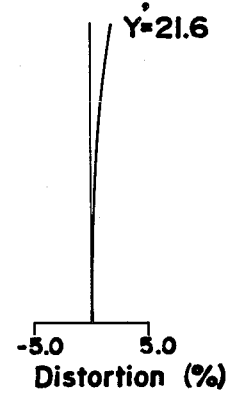
Figure 44A:
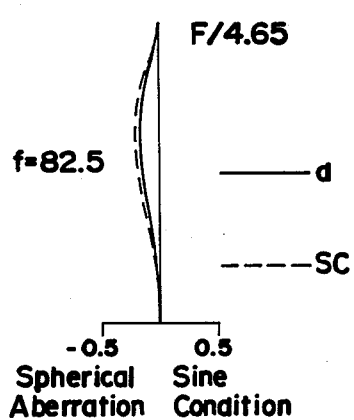
FIGS. 44a to 44c represent the aberration curves of the sixth embodiment for the longest focal length in the infinity focusing condition.
Figure 44B:
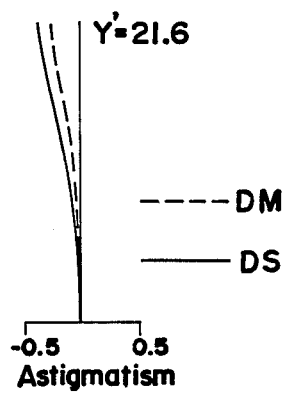
Figure 44C:
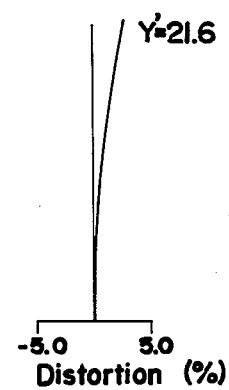
Figure 45A:
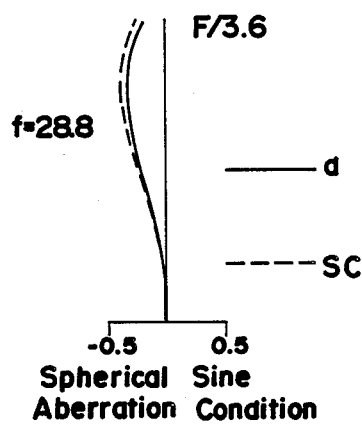
FIGS. 45a to 45c represent the aberration curves of the sixth embodiment for the shortest focal length in the focusing condition in which the lens system is focused to an object located at a distance of 35 times of the shortest focal length.
Figure 45B:
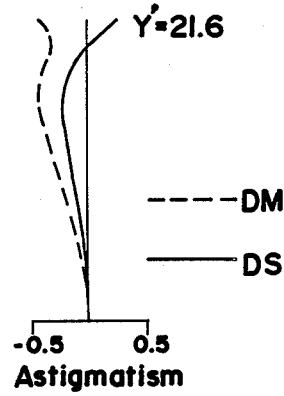
Figure 45C:
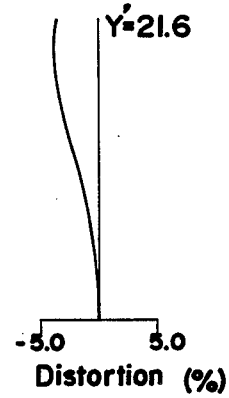
Figure 46A:
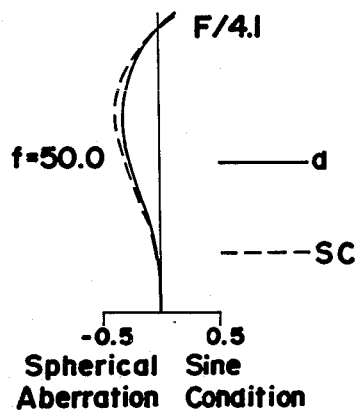
FIGS. 46a to 46c represent the aberration curves of the sixth embodiment for the medium focal length in the focusing condition in which the lens system is focused to an object located at a distance of 35 times of the shortest focal length.
Figure 46B:
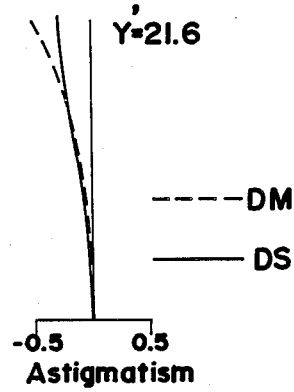
Figure 46C:
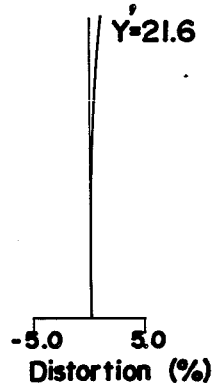
Figure 47A:
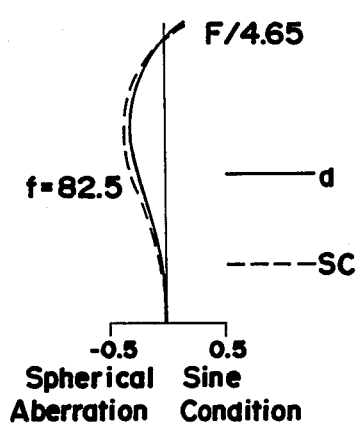
FIGS. 47a to 47c represent the aberration curves of the sixth embodiment for the longest focal length in the focusing condition in which the lens system is focused to an object located at a distance of 35 times of the shortest focal length.
Figure 47B:
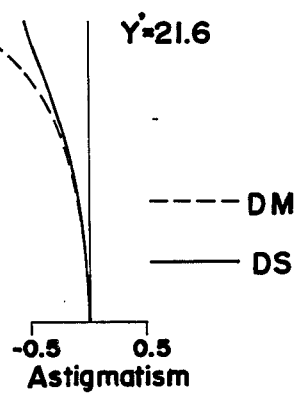
Figure 47C:
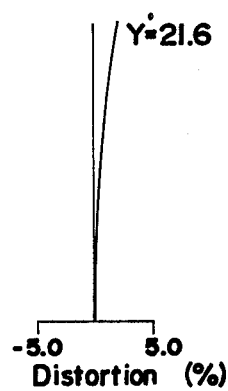
Figure 48A:
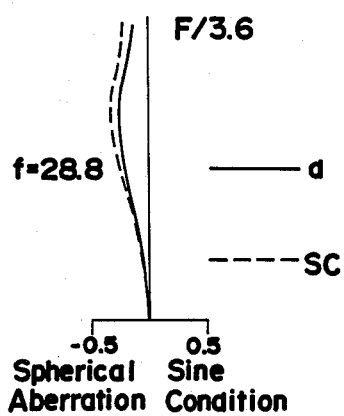
FIGS. 48a to 48c represent the aberration curves of the seventh embodiment for the shortest focal length in the infinity focusing condition.
Figure 48B:
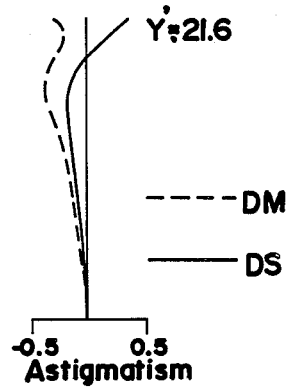
Figure 48C:
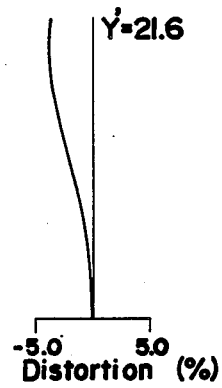
Figure 49A:
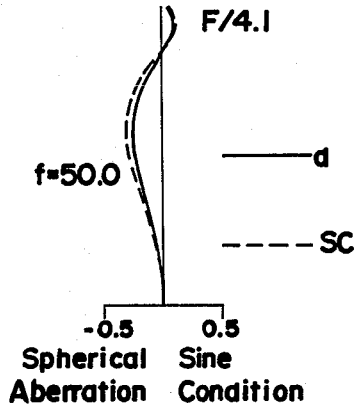
FIGS. 49a to 49c represent the aberration curves of the seventh embodiment for a medium focal length condition in the infinity focusing condition.
Figure 49B:
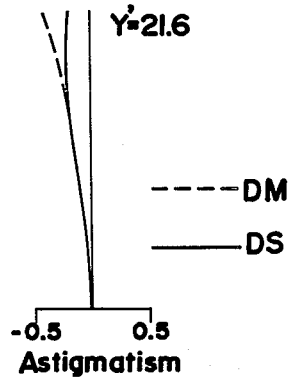
Figure 49C:
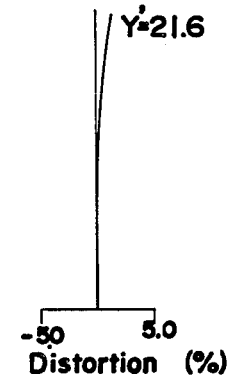

It is certified that error appears in the above-identified patent and that said Letters Patent is hereby corrected as shown below:

Column 5 cont'd,
Lines 28 through 32, delete "FIGS. 40a to 40c represent the aberration curves of the fifth embodiment for the medium focal length in the focusing condition in which the lens system in which the lens system is focused to an object located at a distance of 35 times of the shortest focal length;".
Lines 33 through 38, delete "FIGS. 41a to 41c represent the aberration curves of the fifth embodiment for the longest focal length in the focusing condition in which the lens system in which the lens system is focused to an object located at a distance of 35 times of the shortest focal length;".
Lines 39 through 41, delete "FIGS. 42a to 42c represent the aberration curves of the fifth embodiment for the shortest focal length in the infinity focusing condition;".
Lines 42 through 44, delete "FIGS. 43a to 43c represent the aberration curves of the sixth embodiment for a medium focal length condition in the infinity focusing condition;".
Lines 45 through 47, delete "FIGS. 44a to 44c represent the aberration curves of the sixth embodiment for the longest focal length in the infinity focusing condition;".
Lines 48 through 52, delete "FIGS. 45a to 45c represent the aberration curves of the sixth embodiment for the shortest focal length in the focusing condition in which the lens system is focused to an object located at a distance of 35 times of the shortest focal length;".
Lines 53 through 57, delete "FIGS. 46a to 46c represent the aberration curves of the sixth embodiment for the medium focal length in the focusing condition in which the lens system is focused to an object located at a distance of 35 times of the shortest focal length;".
Lines 58 through 62, delete "FIGS. 47a to 47c represent the aberration curves of the sixth embodiment for the longest focal length in the focusing condition in which the lens system is focused to an object located at a distance of 35 times of the shortest focal length;".
Lines 63 through 65, delete "FIGS. 48a to 48c represent the aberration curves of the seventh embodiment for the shortest focal length in the infinity focusing condition;".
Lines 66 through 68, delete FIGS. 49a to 49c represent the aberration curves of the seventh embodiment for a medium focal length in the infinity focusing condition;".

UNITED STATES PATENT AND TRADEMARK OFFICE
CERTIFICATE OF CORRECTION

PATENT NO.    : 4,871,239
DATED         : October 3, 1989
INVENTOR(S)   : Hisayuki Masumoto et al.

Figure 50A:
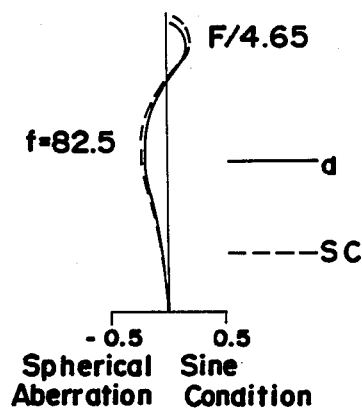
FIGS. 50a to 50c represent the aberration curves of the seventh embodiment for the longest focal length in the infinity focusing condition.
Figure 50B:
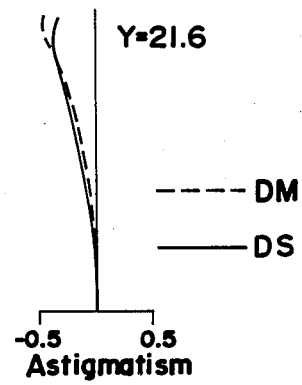
Figure 50C:
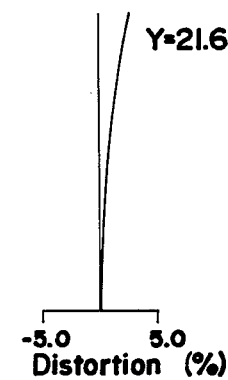
Figure 51A:
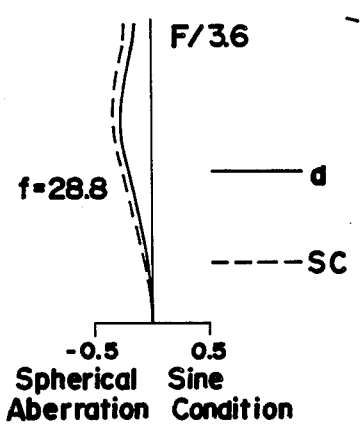
FIGS. 51a to 51c represent the aberration curves of the seventh embodiment for the shortest focal length in the focusing condition in which the lens system is focused to an object located at a distance of 35 times of the shortest focal length.
Figure 51B:
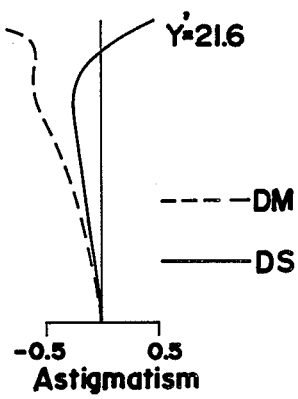
Figure 51C:
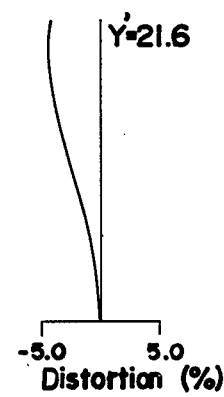
Figure 52A:
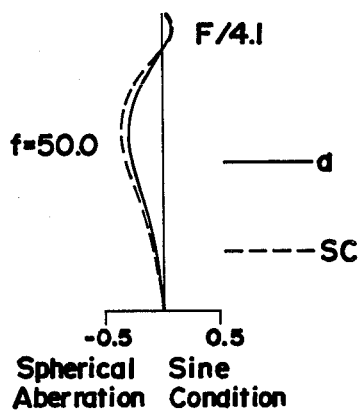
FIGS. 52a to 52c represent the aberration curves of the seventh embodiment for the medium focal length in the focusing condition in which the lens system is focused to an object located at a distance of 35 times of the shortest focal length.
Figure 52B:
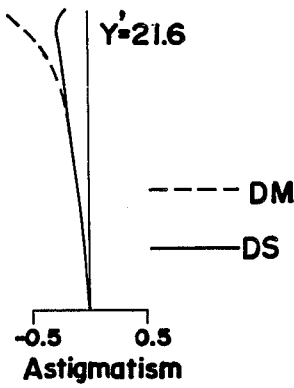
Figure 52C:
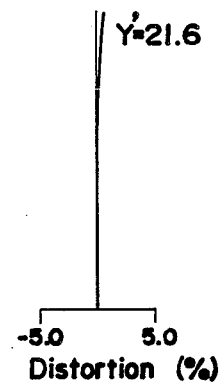
Figure 53A:
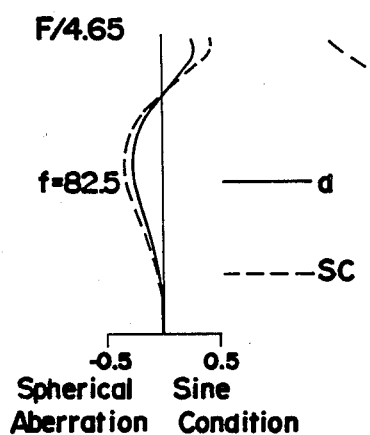
FIGS. 53a to 53c represent the aberration curves of the seventh embodiment for the longest focal length in the focusing condition in which the lens system is focused to an object located at a distance of 35 times of the shortest focal length.
Figure 53B:
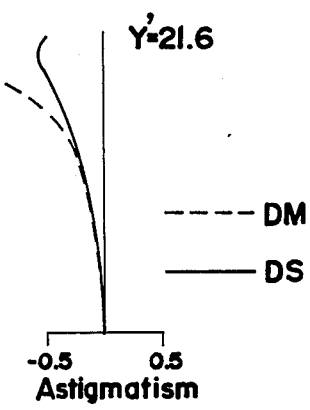
Figure 53C:
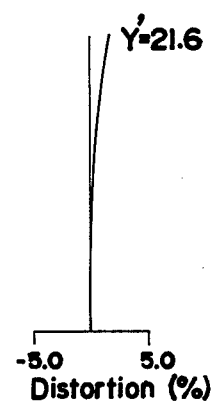
Figure 54A:
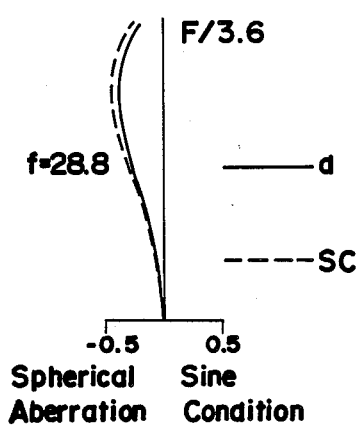
FIGS. 54a to 54c represent the aberration curves of the eighth embodiment for the shortest focal length in the infinity focusing condition.
Figure 54B:
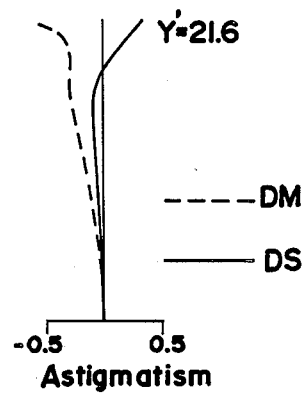
Figure 54C:
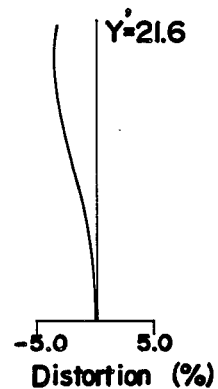
Figure 55A:
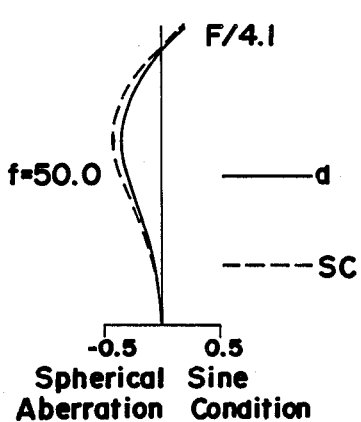
FIGS. 55a to 55c represent the aberration curves of the eighth embodiment for a medium focal length condition in the infinity focusing condition.
Figure 55B:
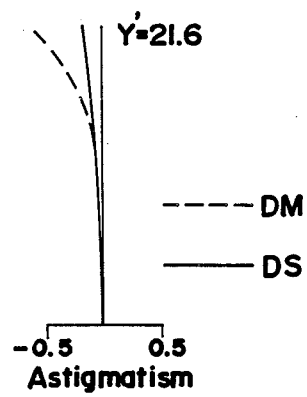
Figure 55C:
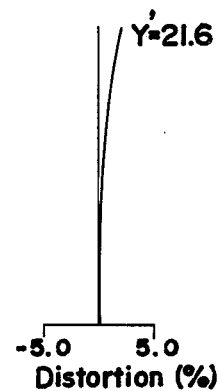
Figure 56A:
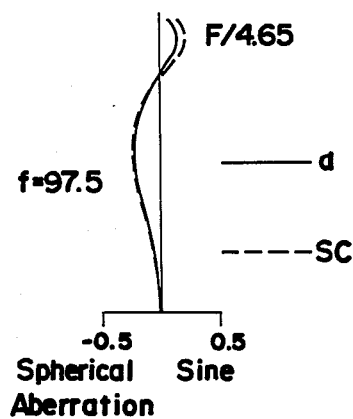
FIGS. 56a to 56c represent the aberration curvers of the eighth embodiment for the longest focal length in the infinity focusing condition.
Figure 56B:
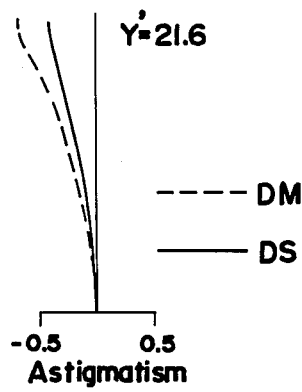
Figure 56C:
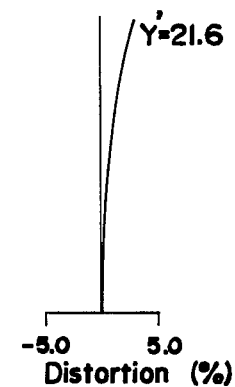
Figure 57A:
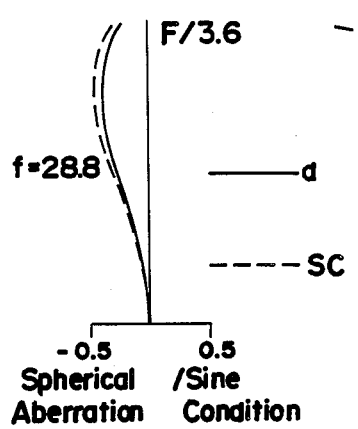
FIGS. 57a to 57c represent the aberration curves of the eighth embodiment for the shortest focal length in the focusing condition in which the lens system is focused to an object located at a distance of 35 times of the shortest focal length.
Figure 57B:
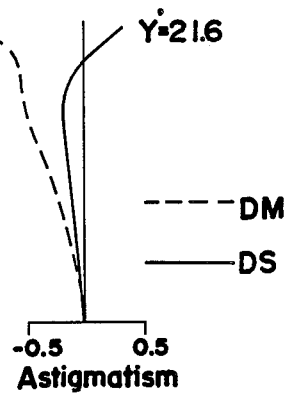
Figure 57C:
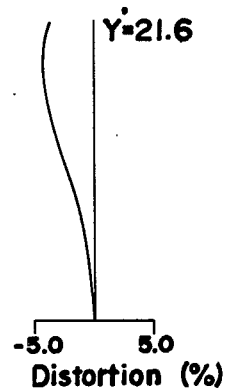
Figure 58A:
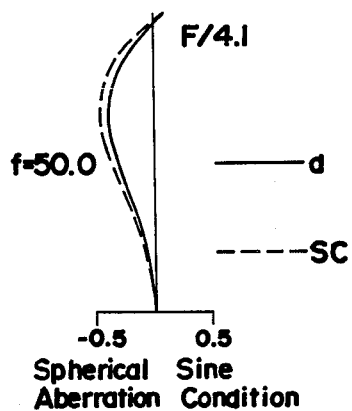
FIGS. 58a to 58c represent the aberration curves of the eighth embodiment for the medium focal length in the focusing condition in which the lens system is focused to an object located at a distance of 35 times of the shortest focal length.
Figure 58B:
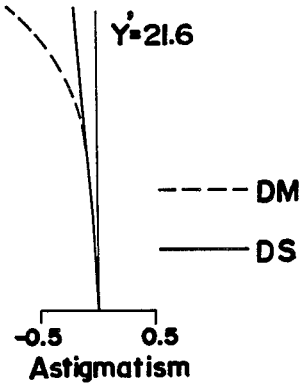
Figure 58C:
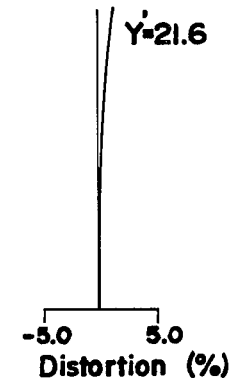
Figure 59A:
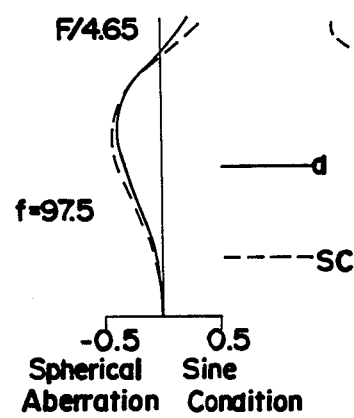
FIGS. 59a to 59c represent the aberration curves of the eighth embodiment for the longest focal length in the focusing condition in which the lens system is focused to an object located at a distance of 35 times of the shortest focal length.
Figure 59B:
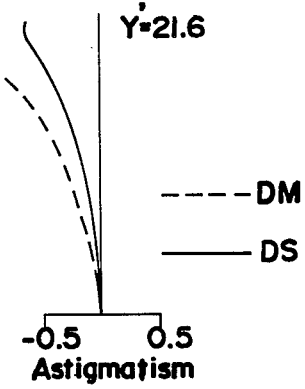
Figure 59C:
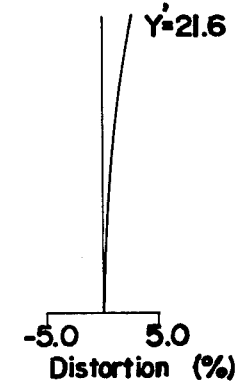
Figure 60A:
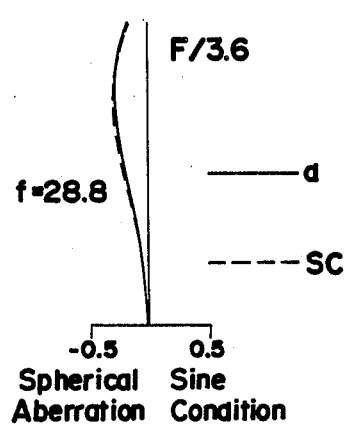
FIGS. 60a to 60c represent the aberration curves of the ninth embodiment for the shortest focal length in the infinity focusing condition.
Figure 60B:
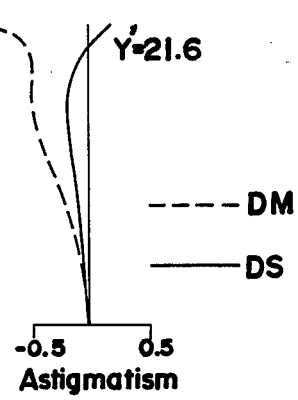
Figure 60C:
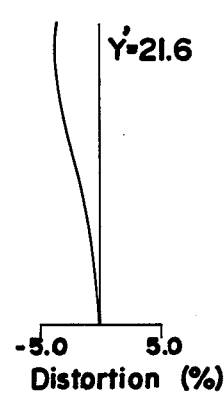
Figure 61A:
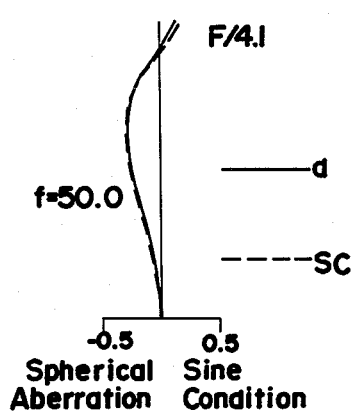
FIGS. 61a to 61c represent the aberration curves of the ninth embodiment for a medium focal length condition in the infinity focusing condition.
Figure 61B:
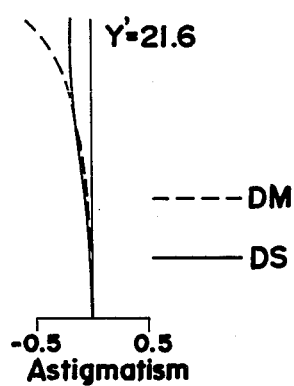
Figure 61C:
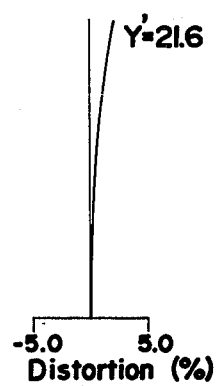
Figure 62A:
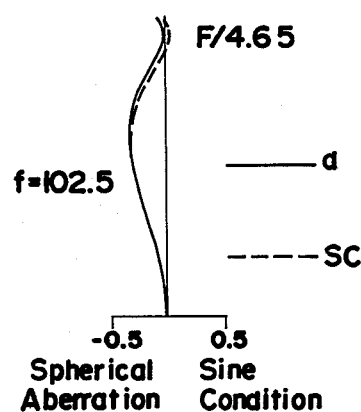
FIGS. 62a to 62c represent the aberration curves of the ninth embodiment for the longest focal length in the infinity focusing condition.
Figure 62B:
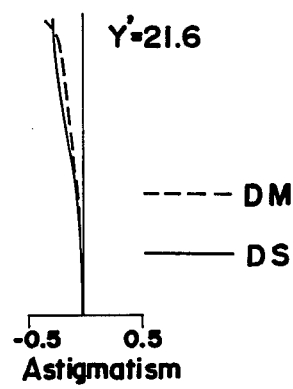
Figure 62C:
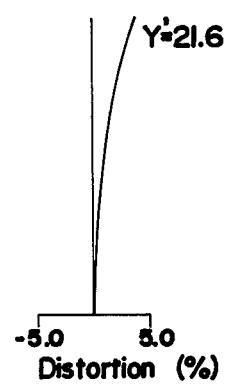
Figure 66A:
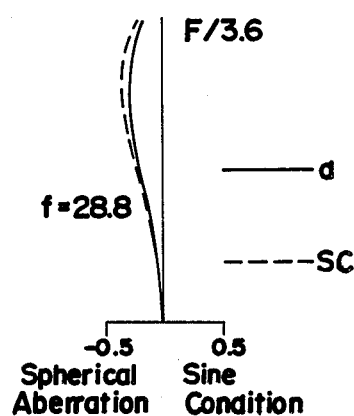
FIGS. 66a to 66c represent the aberration curves of the tenth embodiment for the shortest focal length in the infinity focusing condition.
Figure 66B:
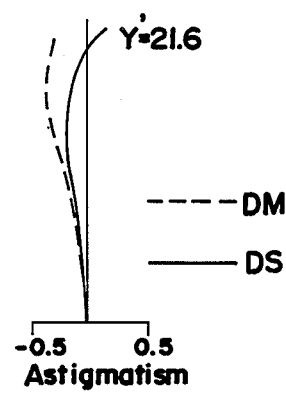
Figure 66C:
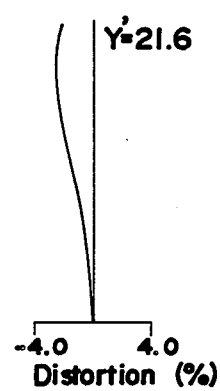
Figure 67A:
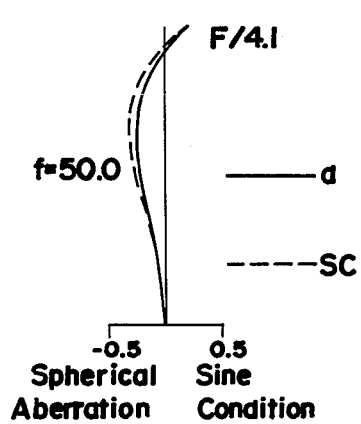
FIGS. 67a to 67c represent the aberration curves of the tenth embodiment for a medium focal length condition in the infinity focusing condition.
Figure 67B:
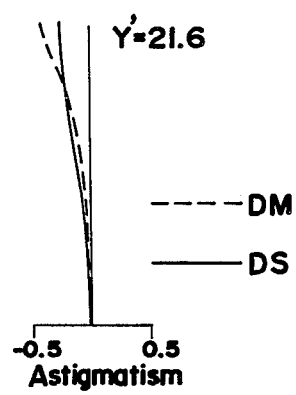
Figure 67C:
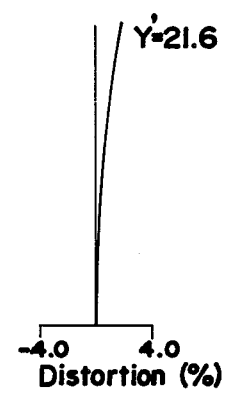
Figure 68A:
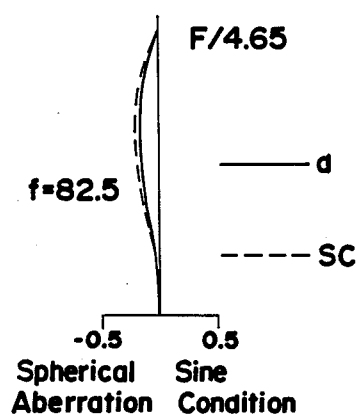
FIGS. 68a to 68c represent the aberration curves of the tenth embodiment for the longest focal length in the infinity focusing condition.
Figure 68B:
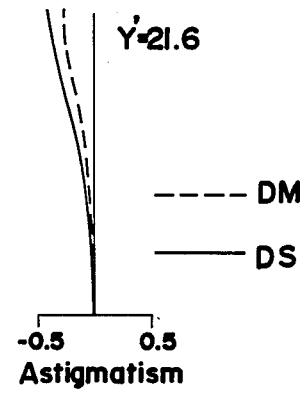
Figure 68C:
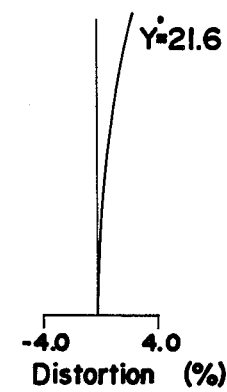
Figure 69A:
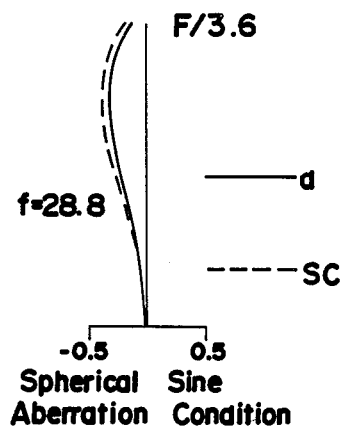
FIGS. 69a to 69c represent the aberration curves of the eleventh embodiment for the shortest focal length in the infinity focusing condition.
Figure 69B:
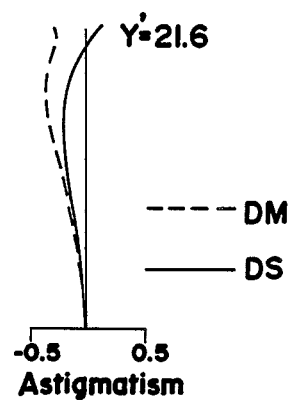
Figure 69C:
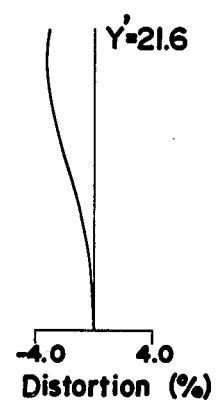
Figure 70A:
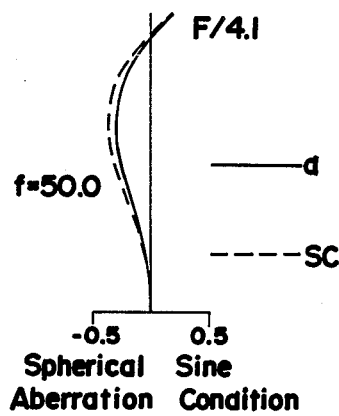
FIGS. 70a to 70c represent the aberration curves of the eleventh embodiment for a medium focal length condition in the infinity focusing condition.
Figure 70B:
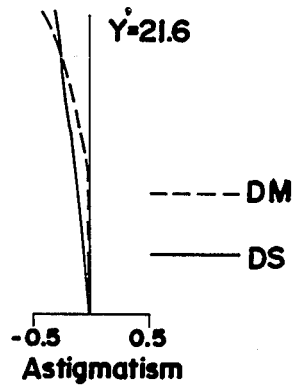
Figure 70C:
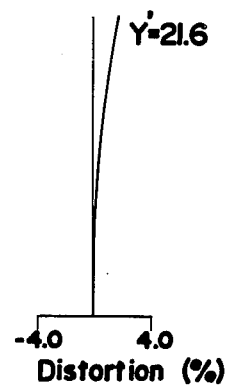
Figure 71A:
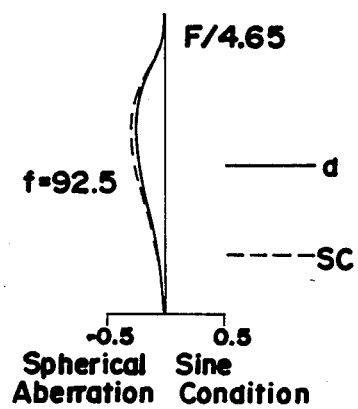
FIGS. 71a to 71c represent the aberration curves of the eleventh embodiment for the longest focal length in the infinity focusing condition.
Figure 71B:
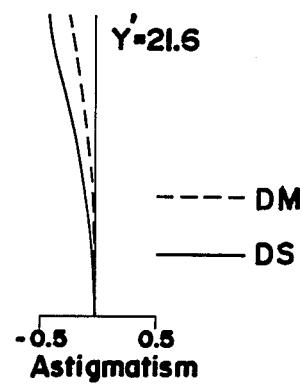
Figure 71C:
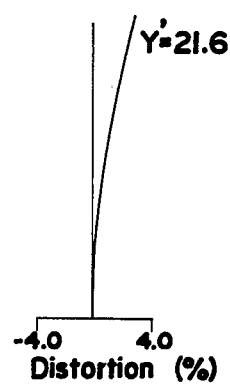

It is certified that error appears in the above-identified patent and that said Letters Patent is hereby corrected as shown below:

Column 6,
Lines 1 through 3, delete "FIGS. 50a to 50c represent the aberration curves of the seventh embodiment for the longest focal length in the infinity focusing condition;".
Lines 4 through 8, delete "FIGS. 51a to 51c represent the aberration curves of the seventh embodiment for the shortest focal length in the focusing condition in which the lens system is focused to an object located at a distance of 35 times of the shortest focal length;".
Lines 9 through 13, delete "FIGS. 52a to 52c represent the aberration curves of the seventh embodiment for the medium focal length in the focusing condition in which the lens system is focused to an object located at a distance of 35 times of the shortest focal length;".
Lines 14 through 18, delete "FIGS. 53a to 53c represent the aberration curves of the seventh embodiment for the longest focal length in the focusing condition in which the lens system is focused to an object located at a distance of 35 times of the shortest focal length;".
Lines 19 through 21, delete "FIGS. 54a to 54c represent the aberration curves of the eighth embodiment for the shortest focal length in the infinity focusing condition;".
Lines 22 through 24, delete "FIGS. 55a to 55c represent the aberration curves of the eighth embodiment for a medium focal length condition in the infinity focusing condition;".
Lines 25 through 27, delete "FIGS. 56a to 56c represent the aberration curvers of the eighth embodiment for the longest focal length in the infinity focusing condition;".
Lines 28 through 32, delete "FIGS. 57a to 57c represent the aberration curves of the eighth embodiment for the shortest focal length in the focusing condition in which in the lens system is focused to an object located at a distance of 35 times of the shortest focal length;".
Lines 33 through 37, delete "FIGS. 58a to 58c represent the aberration curves of the eighth embodiment for the medium focal length in the focusing condition in which in the lens system is focused to an object located at a distance of 35 times of the shortest focal length;".
Lines 38 through 42, delete "FIGS. 59a to 59c represent the aberration curves of the eighth embodiment for the longest focal length in the focusing condition in which in the lens system is focused to an object located at a distance of 35 times of the shortest focal length;".

UNITED STATES PATENT AND TRADEMARK OFFICE
CERTIFICATE OF CORRECTION

PATENT NO. : 4,871,239
DATED : October 3, 1989
INVENTOR(S) : Hisayuki Masumoto et al.

Figure 75A:
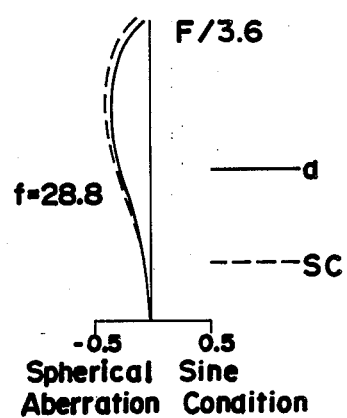
FIGS. 75a to 75c represent the aberration curves of the thirteenth embodiment for the shortest focal length in the infinity focusing condition.
Figure 75B:
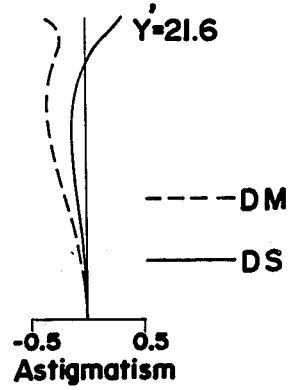
Figure 75C:
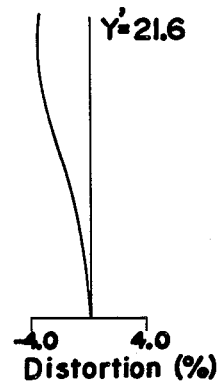
Figure 76A:
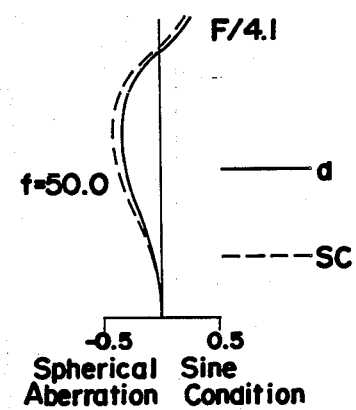
FIGS. 76a to 76c represent the aberration curves of the thirteenth embodiment for a medium focal length condition in the infinity focusing condition.
Figure 76B:
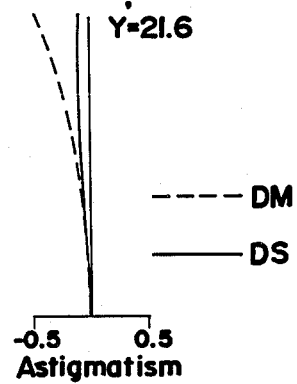
Figure 76C:
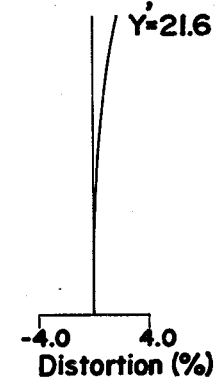
Figure 77A:
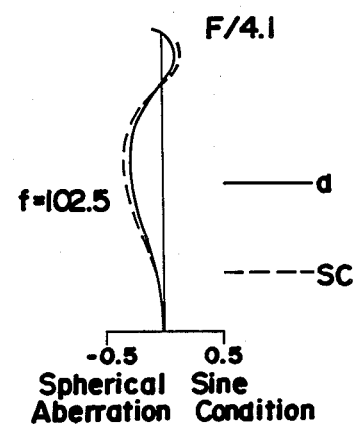
FIGS. 77a to 77c represent the aberration curves of the thirteenth embodiment for the longest focal length in the infinity focusing condition.
Figure 77B:
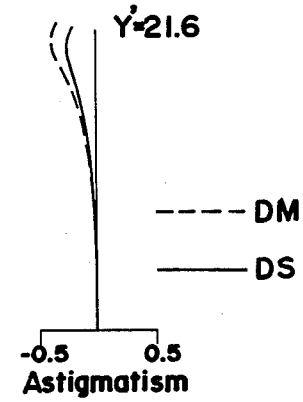
Figure 77C:
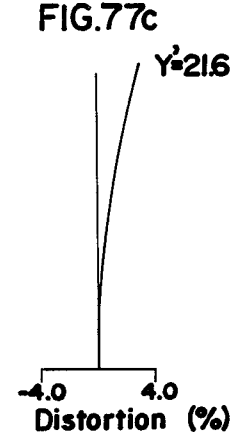
Figure 84A:
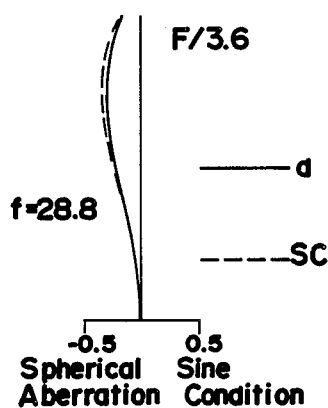
FIGS. 84a to 84c represent the aberration curves of the sixteenth embodiment for the shortest focal length in the infinity focusing condition.
Figure 84B:
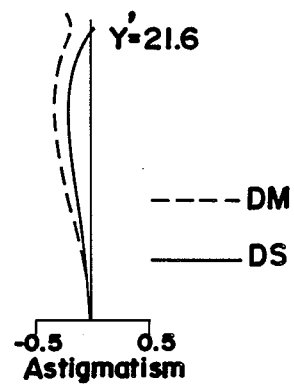
Figure 84C:
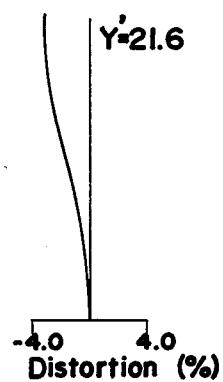
Figure 85A:
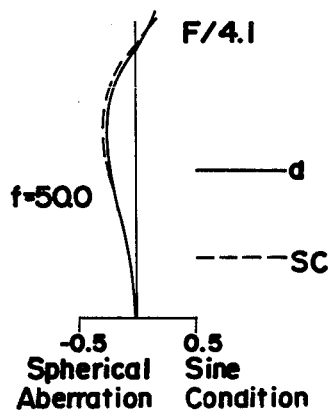
FIGS. 85a to 85c represent the aberration curves of the sixteenth embodiment for a medium focal length condition in the infinity focusing condition.
Figure 85B:
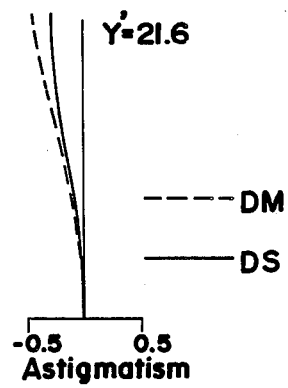
Figure 85C:
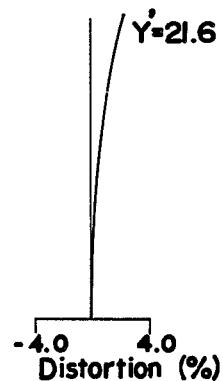
Figure 86A:
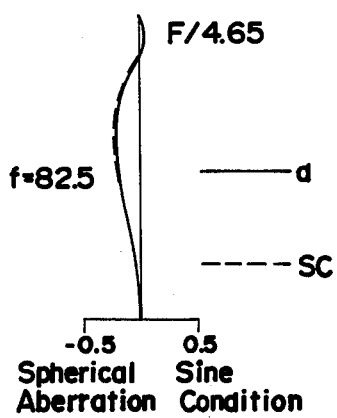
FIGS. 86a to 86c represent the aberration curves of the sixteenth embodiment for the longest focal length in the infinity focusing condition.
Figure 86B:
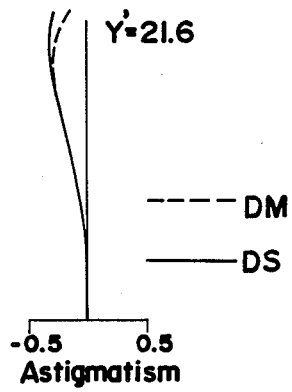
Figure 86C:
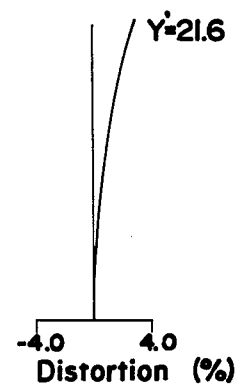
Figure 87A:
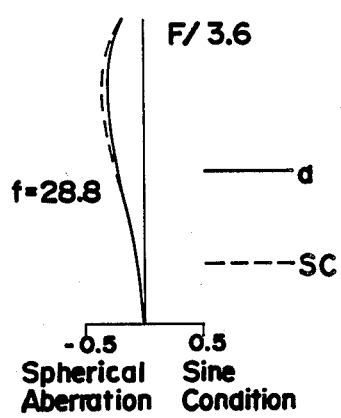
FIGS. 87a to 87c represent the aberration curves of the seventeenth embodiment for the shortest focal length in the infinity focusing condition.
Figure 87B:
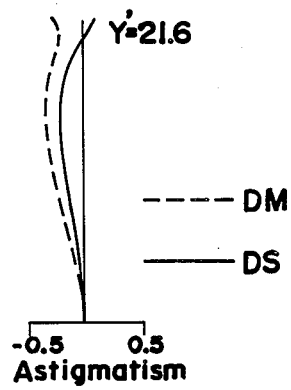
Figure 87C:
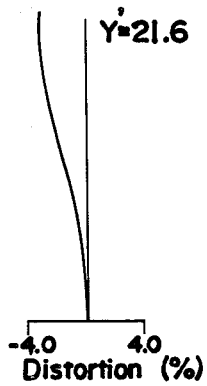

It is certified that error appears in the above-identified patent and that said Letters Patent is hereby corrected as shown below:

Column 7,
Lines 29 through 31, delete "FIGS. 75a to 75c represent the aberration curves of the thirteenth embodiment for the shortest focal length in the infinity focusing condition;".
Lines 32 through 34, delete "FIGS. 76a to 76c represent the aberration curves of the thirteenth embodiment medium focal length condition in the infinity focusing condition;".
Lines 35 through 37, delete "FIGS. 77a to 77c represent the aberration curves of the thirteenth embodiment for the longest focal length in the infinity focusing condition;".
Lines 66 through 68, delete "FIGS. 87a to 87c represent the aberration curves of the seventeenth embodiment for the shortest focal length in the infinity focusing condition;".

Figure 88A:
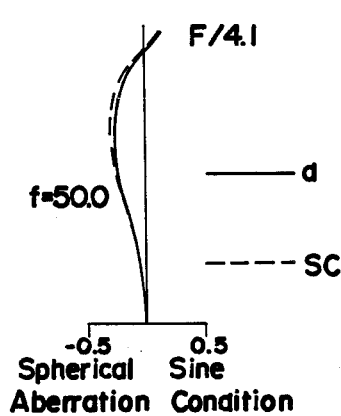
FIGS. 88a to 88c represent the aberration curves of the seventeenth embodiment for a medium focal length condition in the infinity focusing condition.
Figure 88B:
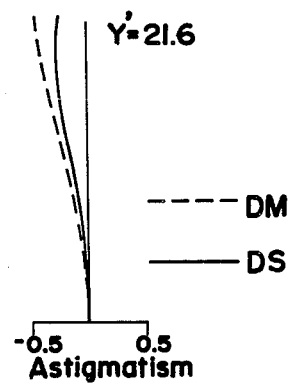
Figure 88C:
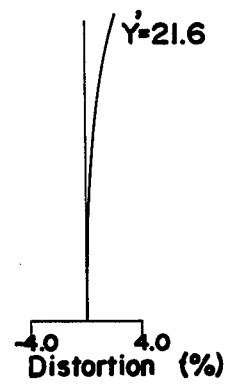
Figure 89A:
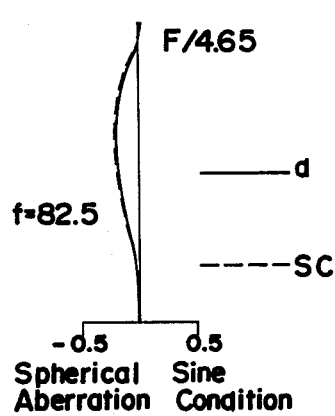
FIGS. 89a to 89c represent the aberration curves of the seventeenth embodiment for the longest focal length in the infinity focusing condition.
Figure 89B:
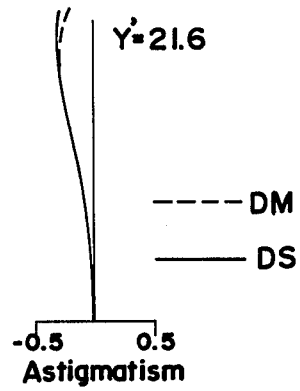
Figure 89C:
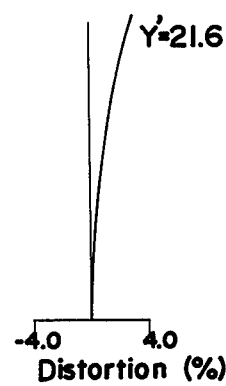
Figure 90A:
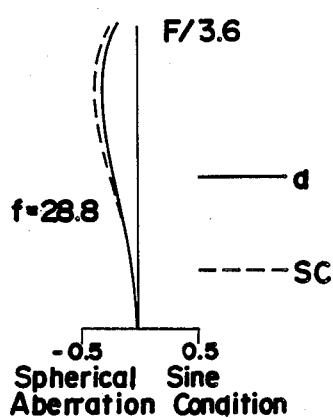
FIGS. 90a to 90c represent the aberration curves of the eighteenth embodiment for the shortest focal length in the infinity focusing condition.
Figure 90B:
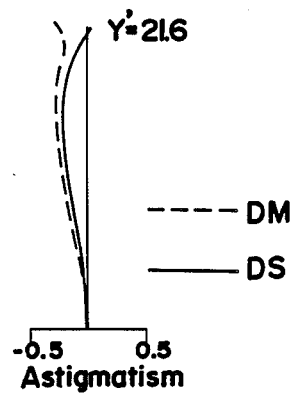
Figure 90C:
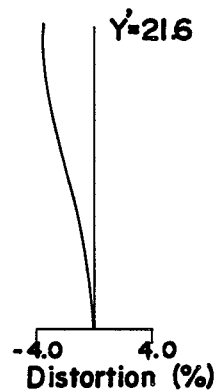
Figure 91A:
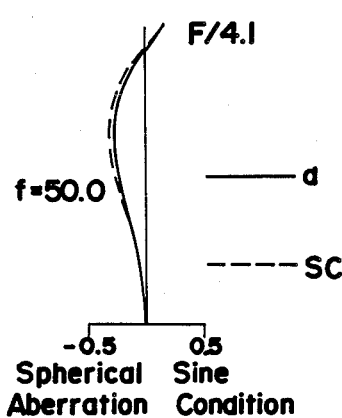
FIGS. 91a to 91c represent the aberration curves of the eighteenth embodiment for a medium focal length condition in the infinity focusing condition.
Figure 91B:
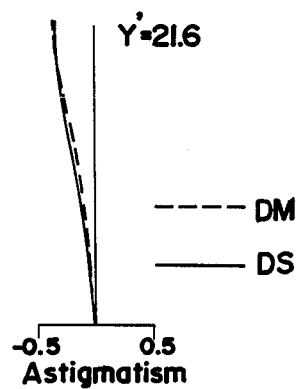
Figure 91C:
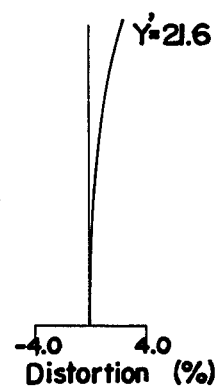
Figure 92A:
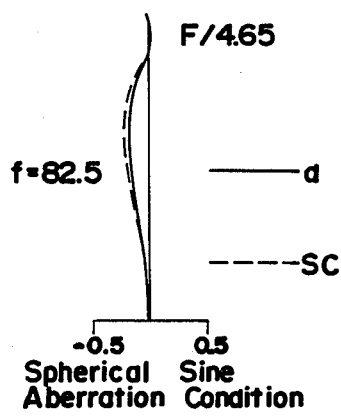
FIGS. 92a to 92c represent the aberration curves of the eighteenth embodiment for the longest focal length in the infinity focusing condition.
Figure 92B:
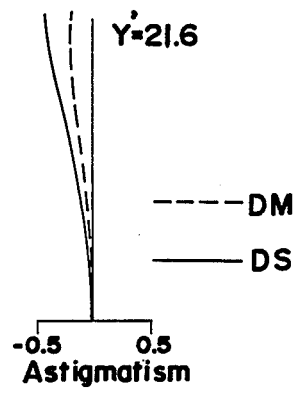
Figure 92C:
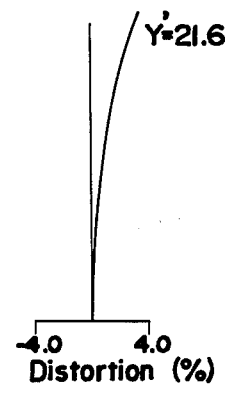
Figure 93A:
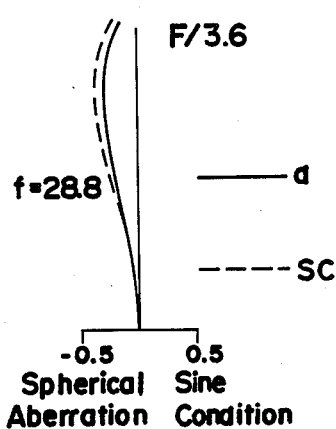
FIGS. 93a to 93c represent the aberration curves of the nineteenth embodiment for the shortest focal length in the infinity focusing condition.
Figure 93B:
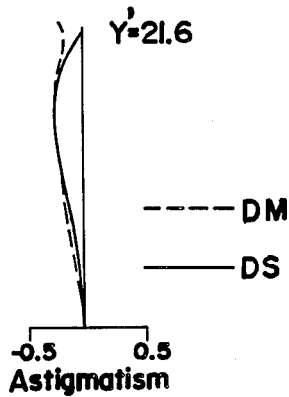
Figure 93C:
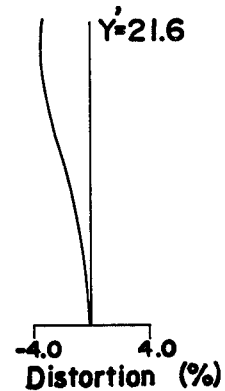
Figure 94A:
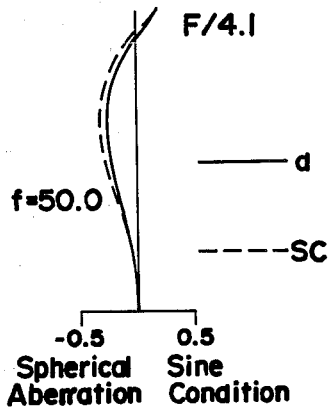
FIGS. 94a to 94c represent the aberration curves of the nineteenth embodiment for a medium focal length condition in the infinity focusing condition.
Figure 94B:
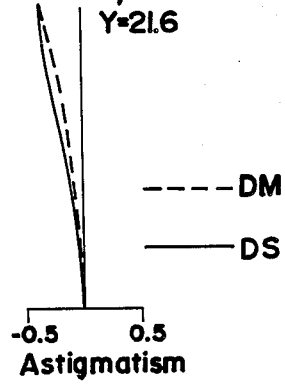
Figure 94C:
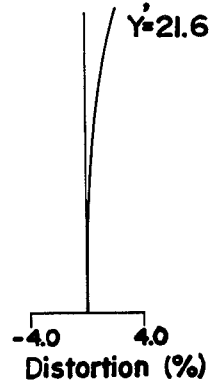
Figure 95A:
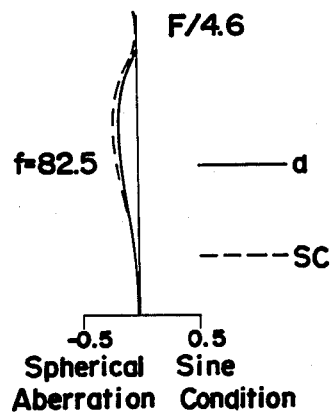
Figure 95B:
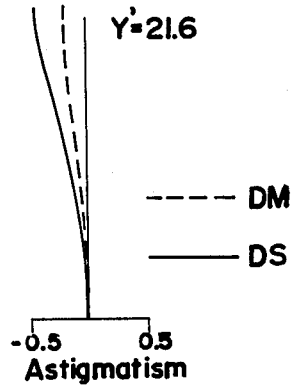
Figure 96A:
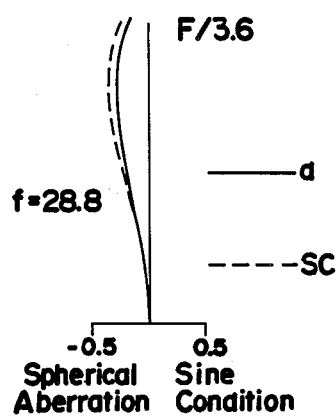
FIGS. 96a to 96c represent the aberration curves of the twentieth embodiment for the shortest focal length in the infinity focusing condition.
Figure 96B:
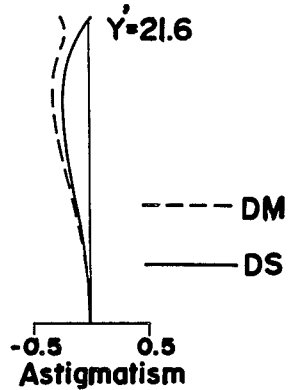
Figure 96C:
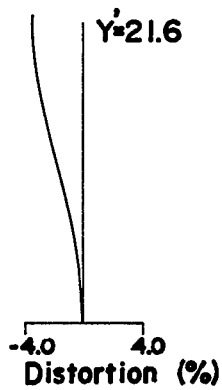
Figure 97A:
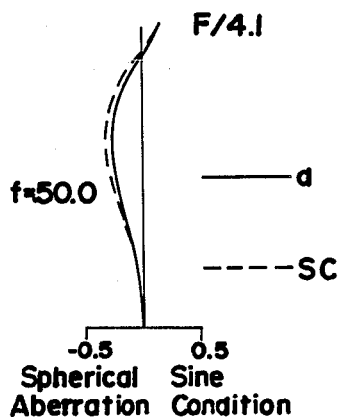
FIGS. 97a to 97c represent the aberration curves of the twentieth embodiment for a medium focal length condition in the infinity focusing condition.
Figure 97B:
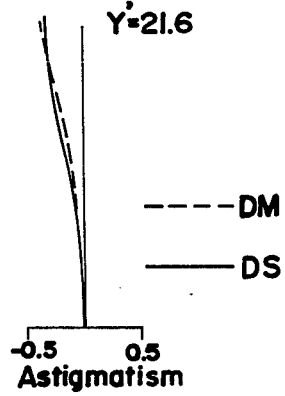
Figure 97C:
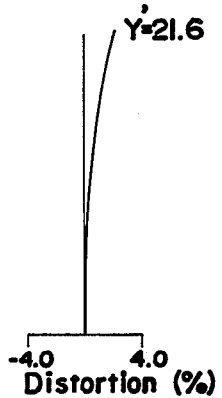
Figure 98A:
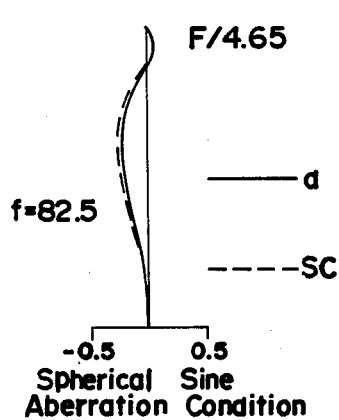
FIGS. 98a to 98c represent the aberration curves of the twentieth embodiment for the longest focal length in the infinity focusing condition.
Figure 98B:
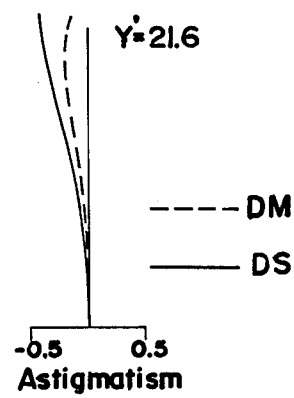
Figure 98C:
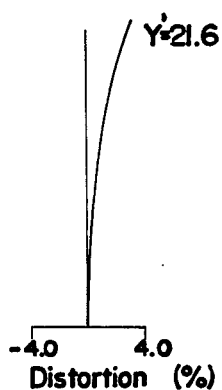

Column 8,
Lines 1 through 3, delete "FIGS. 88a to 88c represent the aberration curves of the seventeenth embodiment for a medium focal length condition in the infinity focusing condition;".
Lines 4 through 6, delete "FIGS. 89a to 89c represent the aberration curves of the seventeenth embodiment for the longest focal length in the infinity focusing condition;".
Lines 7 through 9, delete "FIGS. 90a to 90c represent the aberration curves of the eighteenth embodiment for the shortest focal length in the infinity focusing condition;".
Lines 10 through 12, delete "FIGS. 91a to 91c represent the aberration curves of the eighteenth embodiment for a medium focal length condition in the infinity focusing condition;".
Lines 13 through 15, delete "FIGS. 92a to 92c represent the aberration curves of the eighteenth embodiment for the longest focal length in the infinity focusing condition;".
Line 40, delete "inventor", and insert -- inventors --.
Line 40, delete "his", and insert -- their --.
Line 63, after "comprising", delete ",".

Column 9,
Line 14, after "condition", delete ";" and insert -- : --.
Line 17, after "wherein", delete ";" and insert -- : --.
Line 26, after "by", delete ";" and insert -- : --.
Line 31, after "wherein", delete ";" and insert -- : --.
Line 32, after "by", delete ";" and insert -- : --.
Line 35, after "and", delete ",".
Line 35, delete "represent" and insert -- represents --.

UNITED STATES PATENT AND TRADEMARK OFFICE
CERTIFICATE OF CORRECTION

PATENT NO.   : 4,871,239
DATED        : October 3, 1989
INVENTOR(S)  : Hisayuki Masumoto et al.

It is certified that error appears in the above-identified patent and that said Letters Patent is hereby corrected as shown below:

<u>Column 9, Line 68 through Column 10, Line 1,</u>
Delete "relatively", and insert -- relative --.

<u>Column 10,</u>
Line 26, after "wherein", delete ";" and insert -- : --.
Line 58, delete "above-descried" and insert -- above-described --.

<u>Column 11,</u>
Line 4, after "condition", delete ";" and insert -- : --.
Line 38, delete "with", and insert -- while --.
Line 60, after "between", delete ",".

<u>Column 12,</u>
Line 1, delete "(77)", and insert -- (7) --.
Line 9, after "condition", delete ";" and insert -- : --.
Line 29, delete "with", and insert -- while --.
Line 37, delete "unit", and insert -- units --.
Line 55, delete "direction", and insert -- directions --.
Line 65, delete "compenents", and insert -- components --.

<u>Column 13,</u>
Line 26, delete "heighty", and insert -- height y --.
Line 30, after "follows", delete ";", and insert -- : --.
Line 35, at the end of the equation (B), delete "Ay$^{yn}$", and insert -- A$_n^{yn}$ --.
Line 36, after "wherein", delete ";", and insert -- : --.
Line 36, delete "εrepresents", and insert -- ε represents --.
Line 40, after "follows", delete ";", and insert -- : --.

<u>Column 14,</u>
Line 6, delete "negaive", and insert -- negative --.
Line 24, delete "Y<0.7Y$_{max}$;", and insert -- Y<0.7Y$_{max}$: --.
Line 31, delete "lengt", and insert -- length --.
Line 46, delete "shwon", and insert -- shown --.
Line 55, delete "betweenethe", and insert -- between the --.

UNITED STATES PATENT AND TRADEMARK OFFICE
CERTIFICATE OF CORRECTION

PATENT NO. : 4,871,239
DATED : October 3, 1989
INVENTOR(S) : Hisayuki Masumoto et al.

It is certified that error appears in the above-identified patent and that said Letters Patent is hereby corrected as shown below:

Column 15
Line 12, after "as", insert -- is --.
Line 16, after "achieve", delete ",".
Line 25, after "condition", delete ";" and insert -- : --.
Line 29, after "wherein", delete ";" and insert -- : --.
Line 34, delete "can not", and insert -- cannot --.
Line 48, delete "undesirable", and insert -- undesirably --.
Line 53, after "effective", delete ",".
Line 57, delete "consisting", and insert -- consisted --.

Column 16,
Line 3, after "side", delete ";".
Line 11, delete "above-describd", and insert -- above-described --.
Line 17, delete "correcting", and insert -- correct --.
Line 25, after "$Y<0.7Y_{max}$", delete ";", and insert -- ; --.
Line 45, after "effective", delete ";" and insert -- : --.
Line 49, after "wherein", delete ";" and insert -- : --.

Column 17,
Line 12, after "conditions", delete ";", and insert -- : --.
Line 18, after "wherein", delete ";", and insert -- : --.

Column 18,
Line 2, after "equation", delete ";", and insert -- : --.
Line 13, after "of", delete ";", and insert -- : --.
Line 15, delete "$(|X|-|X_0|)/i\ C/(N'-N)$", and insert --$(|X|-|X_0|)/C/(N'-N)$--.
Line 19, after "of", delete ";", and insert -- : --.
Line 24, after "of", delete ";", and insert -- : --.

Column 19,
Lines 15 through 62, delete Table 2 and its contents entirely.

Column 20, line 50 through Column 21, line 30,
Delete Table 4 and its contents entirely.

Column 21, Line 32 through Column 22, line 15,
Delete Table 5 and its contents entirely.

UNITED STATES PATENT AND TRADEMARK OFFICE
CERTIFICATE OF CORRECTION

| | |
|---|---|
| PATENT NO. : 4,871,239 | |
| DATED : October 3, 1989 | |
| INVENTOR(S) : Hisayuki Masumoto et al. | |

It is certified that error appears in the above-identified patent and that said Letters Patent is hereby corrected as shown below:

Column 22,
Lines 17 through 68, delete Table 6 and its contents entirely.

Column 23,
Lines 1 through 50, delete Table 7 and its contents entirely.

Column 23, line 53 through Column 24, line 38,
Delete Table 8 and its contents entirely.

Column 25,
Line 23, delete "$f_{3w}/f_w=0.876$ $_{d3}/f_w=0.097$", and insert -- $f_{3w}/f_w=0.876$ $\Delta$ $_{d3}/f_w=0.097$ --.
Line 32 (Table 10, Line 11, fourth category) (under the heading "*Abbe number* (*vd*)"), delete "23.63", and insert -- 23.83 --.

Column 26,
Line 8 (Table 10, Line 64), delete "Aspheric cofficients (r22): $\varepsilon = 1.0$", and insert
-- Aspheric cofficients (r23): $\varepsilon = 1.0$ --.

Column 27, line 51 through Column 28, line 36,
Delete Table 13 and its contents entirely.

Column 30, line 63 through Column 31, line 47,
Delete Table 17 and its contents entirely.

Column 31, line 49 through Column 32, line 34,
Delete Table 18 and its contents entirely.

Column 34,
Lines 13 through 22 (Table 21, Lines 5 through 16), delete the column entitled "Emb. 2" and all the data therein entirely.
Lines 13 through 22 (Table 21, Lines 5 through 16), delete the column entitled "Emb. 4" and all the data therein entirely.
Lines 13 through 22 (Table 21, Lines 5 through 16), delete the column entitled "Emb. 5" and all the data therein entirely.
Lines 23 through 31 (Table 21, Lines 17 through 25), delete the column entitled "Emb. 6" and all the data therein entirely.

UNITED STATES PATENT AND TRADEMARK OFFICE
CERTIFICATE OF CORRECTION

| | |
|---|---|
| PATENT NO. : 4,871,239 | |
| DATED : October 3, 1989 | |
| INVENTOR(S) : Hisayuki Masumoto et al. | |

It is certified that error appears in the above-identified patent and that said Letters Patent is hereby corrected as shown below:

Column 34 cont'd,
Lines 23 through 31 (Table 21, Lines 17 through 25), delete the column entitled "Emb. 7" and all the data therein entirely.
Lines 23 through 31 (Table 21, Lines 17 through 25), delete the column entitled "Emb. 8" and all the data therein entirely.
Lines 37 through 47 (Table 22, Lines 6 through 16), delete the column entitled "Emb. 13" and all the data therein entirely.
Lines 47 through 57 (Table 22, Lines 18 through 28), delete the column entitled "Emb. 17" and all the data therein entirely.
Lines 58 through 68 (Table 22, Lines 29 through 39), delete the column entitled "Emb. 18" and all the data therein entirely.

Column 35,
Lines 5 through 17 (Table 23, Lines 5 through 17), delete the column entitled "Emb. 13" and all the data therein entirely.
Lines 18 through 29 (Table 23, Lines 18 through 29), delete the column entitled "Emb. 17" and all the data therein.
Lines 30 through 41 (Table 23, Lines 30 through 41), delete the column entitled "Emb. 18" and all the data therein entirely.
Line 39, delete "inprovements", and insert -- improvements --.
Line 66, after "condition", delete ";", and insert -- : --.

Column 36,
Line 38, after "wherein", delete ";" and insert -- : --.
Line 48, after "by", delete ";", and insert -- : --.
Line 52, after "wherein", delete ";" and insert -- : --.
Line 53, after "by", delete ";", and insert -- : --.
Line 59, after "condition", delete ";", and insert -- : --.
Line 64, after "wherein", delete ";" and insert -- : --.

Column 37,
Line 2, after "condition", delete ";", and insert -- : --.
Line 7, after "condition", delete ";", and insert -- : --.
Line 18, after "condition", delete ";", and insert -- : --.
Line 21, after "wherein", delete ";" and insert -- : --.

UNITED STATES PATENT AND TRADEMARK OFFICE
CERTIFICATE OF CORRECTION

PATENT NO.    : 4,871,239
DATED         : October 3, 1989
INVENTOR(S)   : Hisayuki Masumoto et al.

It is certified that error appears in the above-identified patent and that said Letters Patent is hereby corrected as shown below:

Column 37 cont'd,
Line 30, after "condition", delete ";", and insert -- : --.
Line 33, after "wherein", delete ";" and insert -- : --.
Line 37, after "condition", delete ";", and insert -- :" --.
Line 50, after "condition", delete ";", and insert -- : --.
Line 54, after "wherein", delete ";" and insert -- : --.
Line 68, after "$Y<0.7Y_{max}$", delete ";", and insert -- : --.

Column 38,
Line 5, after "wherein", delete ";" and insert -- : --.
Line 16, after "$Y<0.7Y_{max}$", delete ";", and insert -- : --.
Line 54, after "wherein", delete ";" and insert -- : --.

Column 39,
Line 2, after "condition", delete ";", and insert -- : --.
Line 6, after "wherein", delete ";" and insert -- : --.
Line 16, after "by", delete ";" and insert -- : --.
Line 19, after "wherein", delete ";" and insert -- : --.
Line 30, after "condition", delete ";", and insert -- : --.
Line 34, after "wherein", delete ";" and insert -- : --.
Line 40, delete "furhter", and insert -- further --.
Line 41, after "condition", delete ";", and insert -- : --.
Line 45, after "wherein", delete ";" and insert -- : --.
Line 54, after "condition", delete ";", and insert -- : --.
Line 58, after "wherein", delete ";" and insert -- : --.

Column 40,
Line 2, after "side", delete ";" and insert -- : --.
Line 5, after "power", delete "with".
Line 14, after "$0.7Y_{max}<Y1.0Y_{max}$", delete ";" and insert -- : --.
Line 19, after "wherein", delete ";" and insert -- : --.
Line 31, after "$0.7Y_{max}<Y1.0Y_{max}$", delete ";" and insert -- : --.

UNITED STATES PATENT AND TRADEMARK OFFICE
CERTIFICATE OF CORRECTION

PATENT NO. : 4,871,239
DATED : October 3, 1989
INVENTOR(S) : Hisayuki Masumoto et al.

It is certified that error appears in the above-identified patent and that said Letters Patent is hereby corrected as shown below:

Column 40 cont'd,
Line 38, after "$0.7Y_{max} < Y 1.0Y_{max}$", delete ";" and insert -- *:* --.
Line 45, after "condition", delete ";", and insert -- :" --.
Line 49, after "wherein", delete ";" and insert -- : --.
Lines 61 and 62, after "condition", delete ";", and insert -- : --.
Line 68, after "wherein", delete ";" and insert -- : --.

Column 41,
Line 11, after "parameters" delete ";" and insert -- : --.

Signed and Sealed this

Twenty-third Day of September, 2003

JAMES E. ROGAN
*Director of the United States Patent and Trademark Office*